(12) United States Patent  (10) Patent No.: US 7,117,050 B2
Sasaki et al.  (45) Date of Patent: Oct. 3, 2006

(54) MANAGEMENT SUPPORTING APPARATUS, MANAGEMENT SUPPORTING SYSTEM, MANAGEMENT SUPPORTING METHOD, MANAGEMENT SUPPORTING PROGRAM, AND A RECORDING MEDIUM WITH THE PROGRAM RECORDED THEREIN

(75) Inventors: Kiyoshi Sasaki, Mishima (JP); Hiroshi Katsuta, Gotenba (JP); Makoto Nishizawa, Numazu (JP); Yutaka Yamaguchi, Tagata-gun (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 482 days.

(21) Appl. No.: 10/703,168

(22) Filed: Nov. 7, 2003

(65) Prior Publication Data

US 2004/0148136 A1 Jul. 29, 2004

(30) Foreign Application Priority Data

| Nov. 8, 2002 | (JP) | 2002-325886 |
| Nov. 8, 2002 | (JP) | 2002-325887 |
| Nov. 8, 2002 | (JP) | 2002-325888 |
| Nov. 8, 2002 | (JP) | 2002-325889 |
| Nov. 8, 2002 | (JP) | 2002-325890 |
| Apr. 11, 2003 | (JP) | 2003-108049 |

(51) Int. Cl.
*G06N 5/00* (2006.01)

(52) U.S. Cl. .......................... 700/83; 706/20
(58) Field of Classification Search ................. 700/83; 706/20; 714/38
See application file for complete search history.

(56) References Cited

U.S. PATENT DOCUMENTS

| 5,390,325 | A | * | 2/1995 | Miller | 714/38 |
| 5,465,321 | A | * | 11/1995 | Smyth | 706/20 |
| 5,490,249 | A | * | 2/1996 | Miller | 714/38 |
| 5,652,835 | A | * | 7/1997 | Miller | 714/38 |

FOREIGN PATENT DOCUMENTS

| JP | 63-004925 A | 1/1988 |
| JP | 02-090209 A | 3/1990 |
| JP | 02-241717 A | 9/1990 |
| JP | 06-210692 A | 8/1994 |
| JP | 07-251356 A | 10/1995 |
| JP | 08-118443 A | 5/1996 |
| JP | 08-179822 A | 7/1996 |

(Continued)

*Primary Examiner*—Wilbert L. Starks, Jr.
(74) *Attorney, Agent, or Firm*—Pillsbury Winthrop Shaw Pittman LLP

(57) ABSTRACT

Operation state information for each cycle of manufacturing operations of each of injection molding machines 300 is acquired by a center management terminal device 400 via a network from a plurality of controlling terminal device 400 for controlling the injection molding machines 300. Cumulative utilization of replacement parts of each injection molding machine 300 put into practical operation is recognized by the operating condition recognizing section of the center management terminal device 400 based on the parts state information for the replacement parts of each injection molding machine 300 included in the operating state information. Based on the cumulative utilization, availability of the parts is recognized with reference to lifetime information concerning lifetime of the parts previously stored in the center storage section, and situation of the availability is displayed with a different display format on the center terminal displaying section 503.

111 Claims, 43 Drawing Sheets

FOREIGN PATENT DOCUMENTS

| | | |
|---|---|---|
| JP | 10-307618 A | 11/1998 |
| JP | 2000-238105 A | 9/2000 |
| JP | 2001-191383 | 7/2001 |
| JP | 2001-293761 A | 10/2001 |
| JP | 2002-091931 A | 3/2002 |
| JP | 2002-122079 A | 4/2002 |
| JP | 2002-229640 A | 8/2002 |
| JP | 2003-001687 A | 1/2003 |

* cited by examiner

FIG.43

Header Table Maintenance

Machine No. 1    Table  Quality Monitor Table

| Name | Item Name | Unit | Convert Unit | Format |
|---|---|---|---|---|
| Shot | SHOT | shot | 1 | 0 |
| Good Shot | OKSHOT | shot | 1 | 0 |
| Reject | NGSHOT | shot | 1 | 0 |
| Print Shot | PTRSHOT | shot | 1 | 0 |
| Fill | FILL | sec | 0.01 | 0.00 |
| Charge | CHG | sec | 0.01 | 0.00 |
| Take | TAKE | sec | 0.01 | 0 |
| Cycle | CYCL | sec | 0.01 | 0 |
| Min Cushion | MIN | mm | 0.001 | 0 |
| Cushion | CUS | mm | 0.001 | 0 |
| Shift | SHIFT | mm | 0.001 | 0.000 |
| Start | START | mm | 0.001 | 0.000 |
| Max Inject Press | INJPEAK | Mpa | 0.00098 | 0.00 |
| Hold Shift Press | FPC | Mpa | 0.00098 | 0.00 |
| Screw Rotation Speed | SCRW | rpm | 1 | 0 |
| Die Retract Limit | CLPEND | mm | 0.001 | 0.000 |
| Process Alarm | PALM | | | bit |
| Monitoring Alarm | MALM | | | bit |
| Barrel Temp/HEN | HEN | ℃ | 0.1 | 0.0 |
| Barrel Temp/HN | HN | ℃ | 0.1 | 0.0 |
| Barrel Temp/H1 | H1 | ℃ | 0.1 | 0.0 |
| Barrel Temp/H2 | H2 | ℃ | 0.1 | 0.0 |
| Barrel Temp/H3 | H3 | ℃ | 0.1 | 0.0 |
| Barrel Temp/H4 | H4 | ℃ | 0.1 | 0.0 |
| Barrel Temp/H5 | H5 | ℃ | 0.1 | 0.0 |
| Barrel Temp/OIL | OIL | ℃ | 0.1 | 0.0 |
| Barrel Temp/HOP | HOP | ℃ | 0.1 | 0.0 |

Resister    Close

MANAGEMENT SUPPORTING APPARATUS, MANAGEMENT SUPPORTING SYSTEM, MANAGEMENT SUPPORTING METHOD, MANAGEMENT SUPPORTING PROGRAM, AND A RECORDING MEDIUM WITH THE PROGRAM RECORDED THEREIN

This application relies for priority under 35 USC §119 on Japanese patent application number 2002-325886 filed on Nov. 8, 2002, Japanese patent application number 2002-325888 filed on Nov. 8, 2002, Japanese patent application number 2002-325889 filed on Nov. 8, 2002, Japanese patent application no. 2002-325890 filed on Nov. 8, 2002, and Japanese patent application number 2003-108049 filed on Apr. 11, 2003.

BACKGROUND OF THE INVENTION

1. Field of the Invention

The present invention relates to a management supporting apparatus for acquiring and processing operating state information of a machine to manage an operating state of the machine, a management supporting system, a management supporting program, and a recording medium with the program recorded therein.

2. Description of Related Art

There has been known, for instance, the control method for automatically operating state of an injection molding machine (Refer to, for instance, page 3, left column to right column, of Japanese Patent Laid-Open Publication No. 2001-191383). In this conventional technology, idling operations are performed by means of the low pressure injection molding method for acquiring reference waveforms before the operation for molding is started to sample waveforms for injection rates throughout the injection process, and injection rates at which acceptable products can be obtained are stored as the reference waveforms. With this technology, when the same product is to be molded, molding is carried out based on the reference waveform previously stored so that the needs for setting the molding conditions is eliminated even, for instance, in production of various types of product each in a small lot to improve the production efficiency.

With this technology, however, when a plurality of machines each put under automatically control by a control unit are used to produce various types of products, it is necessary to check operating state of each machine with each control unit, and the work is very complicated. To overcome this problem, the system is conceivable, for instance, in which control situations of the control units are collectively displayed in a display device by using the Intranet so that operating state of each machine can be checked at one place.

However, if information of contents of control is collectively displayed as it is, determination as to whether the operating state of each machine indicated by the information is acceptable or not is very complicated, which sometimes spoils smooth administration of the system.

Further, in a case of, for instance, an injection molding machine, when a plurality of machines are operating in different operating states respectively, it is difficult to determine the state of each component constituting each of the machines. In a case of consumables for heater or a contactor turning ON or OFF a current to a heater, a servo motor, ball screws, a temperature sensor, the reference lifetime can be determined by referring to the catalog or empirically, but it is extremely difficult to previously determine the time for replacing the consumables with new ones. Specifically, when a heater is used for a long time and the lifetime is about to expire, the insulating portions rapidly degrade to cause short-circuiting. When short circuiting occurs while a machine is running, the resin feed is solidified, and the recovery work is very complicated, so that actually, even though the consumables can sill be used, they are replaced with new ones before expiration of the lifetime. Further, it is necessary to replace the consumables with new ones as soon as possible to prevent drop of the productivity, but in a case where the consumables are produced according to an order, a quantity of consumables must be stored as stocks. To satisfy this need, it is required to determine a quantity of each stocked item according to the operating situation of each machine, and actually a large quantity of stocks is required to be stored to prevent shortage of required parts, so that the management work is very complicated, and a wide space for stocking the consumables is required, which is disadvantageous.

SUMMARY OF THE INVENTION

A main object of the present invention is to provide a management supporting apparatus enabling easy management of operating states of a plurality of machines, a management supporting system, a management supporting method, a management supporting program, and a recording medium with the program recorded therein.

The management supporting apparatus according to the present invention comprises a machine information acquiring section for acquiring, from a controlling terminal device provided for each machine and controlling the operating state of the machine by acquiring operating state information including parts state information relating to the operating state of parts constituting machine, the operating state information; a storage section for storing therein lifetime information concerning lifetime of the parts; a parts utilization recognizing section for recognizing cumulative utilization of the parts based on the parts state information; and a lifetime determining section for determining the availability in which the parts can be utilized based on the cumulative utilization with reference to lifetime information stored in the storage section.

In this invention, the cumulative utilization of parts used for operation is recognized by the parts utilization recognizing section based on the parts state information concerning the operating state of each parts constituting a machine included in the operating state information concerning the operating state of the machine, and the availability in which the parts can be utilized is recognized based on the cumulative utilization with reference to the lifetime information concerning lifetime of the parts stored in the storage section. Because of the feature, cumulative utilization of parts varying in response to the operating condition of a machine can easily be recognized, and even in a case where there are a plurality of parts requiring lifetime control, or where the operating state of the machine varies, remaining lifetime of each parts can easily be estimated, which enables efficient replacement of each parts with a new one and also makes the management easier.

In the management supporting apparatus according to the present invention, preferably the storage section stores utilizable time information concerning the utilizable time of the parts or the utilizable times concerning the utilizable times of the parts as the lifetime information; the parts utilization recognizing section recognizes cumulative utilization of the parts by computing the cumulative utilization time or cumulative utilization times of the parts in actual use; and the lifetime determining section recognizes the availability by computing a difference between the utilizable time information and the cumulative utilization time or a different between the utilizable times information and the cumulative utilization times.

In this invention, the utilizable time information concerning utilizable time of parts or utilizable times information concerning utilizable times of the parts is stored in the storage section as the lifetime information; cumulative utilization of the parts is recognized by computing cumulative utilization time or cumulative utilization times of the parts indicating time or times of the parts put into actual operation with the parts utilization recognizing section; and the availability is recognized by computing the time difference between the utilizable time information and the cumulative utilization time or a difference in times between the utilizable times information and the cumulative utilization times with the lifetime determining section. Because of this feature, availability of the parts can easily be recognized with the simple configuration.

The management supporting apparatus according to the present invention preferably comprises a display controlling section for having information displayed with various display formats on a displaying section in response to the availability recognized by the lifetime determining section.

In this invention, information concerning the availability recognized by the lifetime determining section is displayed with various display formats in response to availability of the parts. Because of this feature, the state of the parts can easily be recognized up to expiration of the lifetime.

The management supporting apparatus according to the present invention preferably comprises a purchase order controlling section for outputting a signal for purchase order of the parts based on the availability recognized by the lifetime determining section.

In this invention, a signal indicating a purchase order for each parts is outputted from the purchase order controlling section based on the availability recognized by the lifetime determining section. Because of this feature, the processing for purchasing parts can easily be performed according to the utilization until lifetime of each parts is expired.

In the management supporting apparatus according to the present invention, preferably the operating state information includes machine-specific information prepared for each machine; the parts state information includes parts information specific to each parts; the storage section is configured with a table structure in which the parts information for the parts utilized in the machine corresponding to the machine-specific information is correlated to the machine-specific information and is stored as one record.

In this invention, the storage section is built with the table structure in which the operating state information includes machine-specific information for each machine, and parts information included in the parts state information and specified to each parts is correlated to the machine-specific information corresponding to the machine which the parts constitutes and is recorded as one record. Because of this feature, the operating state of each parts is correlated to the operating state of each machine, and lifetime management of each parts and data processing for the lifetime management can easily be performed with the simple configuration.

The management supporting apparatus according to the present invention preferably comprise a parts information acquiring section for acquiring time information relating to the data and hour at which the parts is replaced with a new one and storing the time information in correlation to the parts information in the storage section, and a display controlling section for having the parts replaced with a new one at the prespecified time displayed on the displaying section based on the parts information as well as the time information stored in the storage section.

In this invention, the parts information acquiring section acquires time information concerning the data and hour at which the parts is replaced with a new one and stored the time information in correlation to the parts information for the parts. When a prespecified signal is recognized by the display controlling section, the display control section has the parts replaced with a new one at the prespecified time displayed based on the parts information and time information stored in the storage section. Because of this feature, the situation of parts replacement can easily be recognized.

The management supporting apparatus according to the present invention preferably comprises a parts information acquiring section for acquiring parts price information concerning to a unit price of the parts and storing the parts price information in correlation to the parts information in the storage section, and a display controlling section for having at least either one of the times of parts replacement and a total price of the replaced parts for each machine displayed based on the machine-specific information, parts information, and parts price information stored in the storage section.

In the present invention, the parts price information concerning a price of each parts is acquired by the parts information acquiring section and is stored in the storage section in correlation to the parts information for the parts. Then at least either one of the times of parts replacement for each machine, and a total price of the replaced parts is displayed on the displaying section by the display controlling section based on the machine-specific information, parts information and the parts price information. Because of this feature, the situation of parts replacement and cost for the parts replacement can easily be recognized.

In the management supporting apparatus according to the present invention, preferably the parts information acquiring section acquires replacement cause information concerning a cause for replacement of the parts and stores the information in the storage section in correlation to the parts information, and the display controlling section has the cause for replacement of the parts replaced at the prespecified time displayed on the display section based on the replacement cause information and the time information when a prespecified signal is recognized.

In this invention, the parts information acquiring section acquires the replacement cause information concerning a cause for replacement of each parts and stores the information in the storage section in correlation to parts information for the parts. When the display controlling section recognizes a prespecified signal, the display controlling section has the cause for replacement of the parts replaced at the prespecified time displayed on the displaying section based on the replacement cause information and the time information. Because of this feature, situation of parts replacement can easily be recognized.

In the management supporting apparatus according to the present invention, the machine is automatically driven under control by a controlling terminal device.

In the present invention, each machine is automatically driven under control by the controlling terminal device. Because of this feature, even for a machine usually driven automatically under control by the controlling terminal device, remaining lifetime of the parts can easily be recognized, and the operating state management can easily be performed.

In the management supporting apparatus according to the present invention, the machine is preferably an injection molding machine.

In this invention, an injection molding machine is used as a machine. Because of this feature, the operating state of a plurality of injection molding machines, each of which is usually driven automatically, can be recognized in the collected form, lifetime of parts of the injection molding machine generally driven automatically without requiring intervention by man can easily be recognized, and further also management of the operating state of the injection molding machine can easily be performed, which makes it possible to easily manufacture injection-molded products.

The management supporting apparatus according to the present invention preferably comprises a reporting section for alerting the necessity of replacement of the parts by recognizing that the availability of the parts recognized by the lifetime determining section has reached the prespecified limit.

In this invention, when the lifetime determining section recognizes that the availability of the parts has reached the prespecified limit, the reporting section alerts the necessity of replacement of the parts. Because of this feature, even in a machine usually driven automatically, the necessity of replacement of each parts can easily be recognized, and also a quick response is possible, which insures improved management of the operating state.

In the management supporting apparatus according to the present invention, the reporting section preferably alerts the necessity of replacement of the parts by distributing the information indicating the necessity by means of an electronic mail.

In the present invention, the reporting section alerts the necessity of parts replacement by distributing electronic mails. Because of this feature, for instance by distributing an electronic mail to a mobile communication terminal such as a mobile telephone carried by a manager responsible for management of a machine, the necessity of replacement of the parts can easily be recognized, which insures improvement management of the operating state of each machine.

The management supporting apparatus according to the present invention comprises a machine information acquiring section for acquiring the operating state information from the controlling terminal device provided for each machine for controlling the operating state of the machine by acquiring operating state information concerning the operating state of the machine; a displaying section capable of displaying the operating state information acquired by this machine information acquiring section; an operating condition recognizing section for determining an operating condition of the machine based on the operating state information; and a display controlling section having a display area in which the operating condition determined by the operating condition recognizing section is displayed with a different display format for each operating condition for providing controls so that a plurality of sections each corresponding to each machine are displayed in a list form on the displaying section.

In this invention, the machine information acquiring section acquires the operating state information from the controlling terminal device provided for each machine and controlling the operating state of the machine by acquiring the operating state information concerning the operating state of the machine, and the operating condition recognizing section determines the operating condition of the machine based on the operating state information. Then the display controlling section provides the controls so that the operating condition of the machine is displayed on the displaying section, namely so that sections each having a display area in which the operating condition is displayed with a different format for each type of operating condition and corresponding to the machines respectively are displayed thereon in the list form. Because of this feature, the operating conditions of a plurality of machines can be checked in batch, which insured easy management of the operating state.

In the management supporting apparatus according to the present invention, the display controlling section preferably provides controls so that each type of operating condition is displayed with a different color on a display area of the corresponding section.

In this invention, controls by the display controlling section for having each type of operating condition displayed with a different color in a display area of the section is performed with a different color. Because of this feature, the operating conditions of a plurality of machines can visually be checked in batch, which insures easy management of the operating state with the simple configuration.

In the management supporting apparatus according to the present invention, the display controlling section preferably provides controls so that the plurality of sections classified according to at least either one of each operating state of the machine or characteristics thereof are displayed for each classification in the list form.

In this invention, the display controlling section provides controls so that a plurality of sections are displayed for each of the categories classified according to at least one of the operating state of the machine or the characteristics of the machine. Because of this feature, the operating state of a machine is managed according to a classification by the operating state of the machine or by the characteristics thereof, so that systematic controls are provided, and the efficiency of operating state management can easily be improved.

In the management supporting apparatus according to the present invention, preferably the machine is a manufacturing machine for manufacturing products from the feed stock, and the display controlling section provides controls so that the plurality of sections are displayed for each of the categories classified according to at least one of a type of the feedstock or a type of the product.

In this invention, the machine is a manufacturing machine for manufacturing products from the feed stock, and the display controlling section provides controls so that the plurality of sections are displayed in the list form for each of the categories classified according to at least one of a type of the feedstock or a type of the product. Because of this feature, the operating state of a machine is managed according to a type of a feed stock fed to a manufacturing machine or a type of product manufactured by the machine, which enables systematic management and improvement of efficiency in the operating state management.

The management supporting apparatus according to the present invention preferably comprises an input section capable of selecting the section to be displayed on the displaying section in response to an input operation, and the display controlling section provides controls so that contents of the operating state information for the machine corresponding to the selected section by the input section in response to the input operation are displayed.

In this invention, the display controlling section provides controls so that contents of the operating state information for the machine corresponding to the selected section by the input section in response to the input operation is displayed. Because of this feature, detailed contents of the operating state information for each machine is displayed from a section for each machine displayed in the list form, so that also the operating state of the machine can be recognized in detail, which insures improved management of the operating state of the machine.

In the management supporting apparatus according to the present invention, the display controlling section preferably provides controls so that the sections are displayed according to an arrangement in which the machines are installed.

In this invention, the display controlling section provides controls so that the sections are displayed in correspondence to the arrangement of the machines. Because of the feature, the actual arrangement of the machines corresponds to the arrangement of displayed sections, so that management of the operating state of the machines can easily be carried out with the simple configuration.

In the management supporting apparatus according to the present invention, preferably the display controlling section sets the size of a display of the section on the displaying section according to the necessity, and provides controls so that all of the sections to be displayed are placed within a display area of the displaying section.

In this invention, the display controlling section sets the size of each section to be displayed on the displaying section according to the necessity, and provides controls so that all of the sections to be displayed are placed within the display area of the displaying section. Because of this feature, all of the sections are displayed with the size varied respectively according to the display area of the displaying section, so that the operating state of the machines can easily and visually be checked, which insures improved management of the operating state of the machines.

In the management supporting apparatus according to the present invention, the display controlling section preferably provides controls so that the display format for each operating condition varies according to elapse of time during the operation.

In this invention, the display controlling section provides controls so that a display format for each operating condition varies according to elapse of time during the operation. Because of this feature, shift of the operating state of each machine can easily be recognized, which insures improvement in management of the operating state with the simple configuration.

In the management supporting apparatus according to the present invention, the machine preferably runs automatically under controls by the controlling terminal device.

In this invention, the machine automatically runs under controls by the controlling terminal device. Because of this feature, even a machine which usually runs automatically under controls by the controlling terminal device can easily be managed.

In the management supporting apparatus according to the present invention, the machine is preferably an injection molding machine.

In this invention, an injection molding machine is used as the machine. Because of this feature, the operating state of a plurality of injection molding machines each generally running automatically can be recognized collectively, so that management of the operating states of the injection molding machines each generally running automatically is easy, and manufacture of accurate injected molding products can easily be carried out.

The management supporting apparatus according to the present invention preferably comprises an abnormality reporting section for reporting, when the operating condition recognizing section recognizes occurrence of any abnormality in the operating condition of the machine, either one of the fact that the abnormality has occurred or contents of the abnormality.

In this invention, when the operating condition recognizing section recognizes occurrence of any abnormality in the operating condition of a machine, the abnormality reporting section reports at least either one of the fact concerning occurrence of the abnormality or contents of the abnormality. Because of this feature, occurrence of any abnormality even in a machine usually running automatically can easily be recognized, which allows a quick response to the abnormality and insures improved management of the operating condition.

In the management supporting apparatus according to the present invention, the abnormality reporting section preferably reports at least either one of the fact concerning occurrence of the abnormality or contents of the abnormality by displaying the information.

In this invention, the abnormality reporting section displays, for reporting, at least either one of the fact concerning occurrence of the abnormality or contents of the abnormality with the display controlling section of the displaying section. Because of this feature, occurrence of any abnormality can be reported with the simple configuration, and a quick response to the abnormality can be made with the simple configuration.

In the management supporting apparatus according to the invention according to claim 27, the abnormality reporting section preferably transmits, for reporting, at least either one of the fact concerning occurrence of the abnormality or contents of the abnormality by making use of an electronic mail.

In this invention, the abnormality reporting section reports at least either one of the fact concerning occurrence of the abnormality or contents of the abnormality by transmitting the information by means of an electronic mail. Because of this feature, occurrence of any abnormality can be recognized by transmitting an electronic mail to a mobile communication terminal such as, for instance, a mobile telephone of a manager managing the operating condition of the machine without the need of visually recognizing a display on the display section, which insures improved management of the operating state of the machine.

The management supporting apparatus according to the present invention comprises a controlling terminal device having a controlling terminal displaying section provided for each machine for acquiring operating state information concerning the operating state of the machine to control the operating state of the machine, and a display controlling section which is a management supporting device connectable to a network for information transaction and receives and processes the operating state information, and also which acquires image data displayed on the controlling terminal displaying section using the Internet protocol (IP) to have the image data displayed on the displaying section.

In this invention, image data displayed on the controlling terminal displaying section displaying the control situation of the controlling terminal device provided for each machine for acquiring the operating state information concerning the operating state of the machine to control the operating state of the machine is acquired via a network by using the Internet protocol (IP), and is displayed by the display controlling section on the displaying section. Because of this feature, the same display as that displayed on the controlling terminal displaying section can visually be checked without the need of directly checking the controlling terminal displaying section of the controlling terminal device with a simple configuration, and this configuration is especially effective when checking the operating state of a plurality of controlling terminal devices, which insures easy management of the operating state.

The management supporting apparatus according to the present invention preferably comprises a message information preparing section for preparing message information, and a communicating section for transmitting the prepared message information via the network to the prespecified controlling terminal device so that the message information is displayed on the controlling terminal displaying section of the controlling terminal device.

In this invention, the message information prepared by the message information preparing section is transmitted via the network by the communicating section so that the message information can be displayed on the controlling terminal displaying section of a prespecified controlling terminal device. Because of this feature, as a message is transmitted to the controlling terminal device, for instance, the message can easily be transmitted, for instance, to an operator responsible for maintenance of the controlling terminal device by making use of a network for acquiring image data, which enables quick communications and improved management of the operating state.

The management supporting apparatus according to the present invention preferably comprises a controlling terminal device having a controlling terminal displaying section provided for each machine for acquiring the operating state information of the machine to control the operating state of the machine and also displaying the control situation thereon; a message information preparing section which is a management supporting device connectable via a network for information transaction, receives and processes the operating state information, and also which prepares message information; and a communicating section for transmitting the prepared message information via the network to a prespecified controlling terminal device so that the message information is displayed on a controlling terminal displaying section of this controlling terminal device.

In this invention, the message information prepared by the message information preparing section is transmitted by the communicating section via a network to a prespecified controlling terminal device so that the message information is displayed on the controlling terminal displaying section. Because of this feature, as a message is transmitted to the controlling terminal device, namely as a message is transmitted, for instance, to an operator responsible for maintenance of the controlling terminal device, which enables a quick response and insures improved management of the operating state.

The management supporting apparatus according to the present invention preferably comprises a machine information acquiring section for acquiring the operating state information from the controlling terminal device, and a computing section for transmitting the operating state information acquired by the machine information acquiring section via the network to the communication terminal.

In this invention, the operating state information acquired by the machine information acquiring section is transmitted by the computing section via a network to a communicating terminal. Because of this feature, for instance, by transmitting the operating state information to a communicating terminal such as a mobile telephone or PDA (Personal Digital Assistant) carried by an manager responsible for management of the operating state of the machine, it becomes possible for the manager to recognize the operating state of the machine without the need of directly checking a display on the displaying section, which insures improved management of the operating state of each machine.

In the management supporting apparatus according to the present invention, the computing section preferably transmits the operating state information to the communicating terminal by recognizing the operating state of the machine based on the operating state information and also by recognizing at least either start or stop of running of the machine.

In this invention, when the computing section recognizes the operating state of a machine based on the operating state information and also recognizes at least either start or stop of running of the machine, the computing section has the operating state information transmitted to the communicating terminal. Because of this feature, starting of operation at which the operating state is unstable, occurrence of an abnormality, an end of a manufacturing process, or the like can easily be recognized which eliminates the need of always monitoring the operating state information and insures the higher efficiency in management of the operating state.

The management supporting apparatus according to the present invention comprises a machine information acquiring section for acquiring the operating state information from a controlling terminal device provided for each machine producing a product for acquiring the operating state information concerning the operating state of the machine to control the operating state of the machine; a computing section for computing a histogram based on the operating state information acquired by this machine information acquiring section; and an acceptability determining section for determining acceptability of the products by determining a distribution state in the histogram acquired by the computing section.

In this invention, the operating state information is acquired from the controlling terminal device provided for each machine producing a product for acquiring the operating state information concerning the operating state of the machine to control the operating state of the machine, and a histogram is computed by the computing section based on the operating state information. Acceptability of the product is then determined by the acceptability determining section in which a distribution in the histogram is determined. Because of this feature, the state of the products produced by a plurality of machines can visually be checked in batch, which insures improved management of the operating state of even a plurality of machines.

The management supporting apparatus according to the present invention comprises preferably comprises a distribution range setting section for setting a distribution range for the operating state information, and the acceptability determining section determines that the product is acceptable when the operating state information within the distribution range set by the distribution range setting section is generated in the machine.

In this invention, a product produced while the operating state information within the distribution range for the operating state information set by the distribution range setting section is generated in the machine is determined as acceptable. Because of this feature, acceptability of each product can easily be determined based on the operating state information.

The management supporting apparatus according to the present invention preferably comprises a display controlling section for having the histogram computed by the computing section displayed with a graphic form on the displaying section.

In this invention, the display controlling section has a histogram computed by the computing section displayed on the displaying section in a graphic form. Because of this function, a result of determination concerning acceptability of each product can easily be recognized from the graphic display of the histogram, which insures easier management of the operating state.

In the management supporting apparatus according to the present invention, the display controlling section preferably provides controls so that a result of determination by the acceptability determining is displayed with a different display formant for each determination result.

In this invention, a result of determination for acceptability of determination by the acceptability determining section is displayed with a different display format respectively on the displaying section. Because of this feature, a result of determination concerning acceptability of a manufactured product can visually be checked in batch, and management of the operating state can easily be carried out with the simple configuration.

In the management supporting apparatus according to the present invention, the machine information acquiring section preferably acquires the operating state information together with the time information concerning the date and hour when the operating state information is generated from the machine, and the computing section can compute a histogram for a prespecified period of time based on the time information.

In this invention, the machine information acquiring section acquires the operating state information together with the time information concerning the date and time when the operating state information is generated from the machine, and the computing section computes a histogram for a specific period of time based on the time information. Because of this feature, for instance in a case where a trial running is performed to set control conditions for a controlling terminal device when a product to be manufactured or a feed stock is changed, acceptability of the product can easily be recognized within a prespecified period of time, which makes it easier to set control conditions for the controlling terminal device and also insures easy management of the operating state of each machine.

In the management supporting apparatus according to the present invention, the machine information acquiring section preferably acquires the operating state information together with the time information concerning the data and hour when the operating state information is generated from the machine, and the display controlling section can provide controls for having a histogram within a prespecified period of time displayed in the graphic display based on the time information.

In this invention, the operating state information is acquired by the machine information acquiring section together with the time information concerning the date and hour when the operating state information is generated from a machine, and the display controlling section has the histogram within a prespecified period of time displayed in the graphic display. Because of this feature, fluctuation of the operating state within a prespecified period of time such as that occurring when a product to be manufactured or the feed stock is changed can easily be recognized, which insures easy management of the operating state.

The management supporting apparatus according to the present invention preferably comprises a storage section for storing therein the information concerning the fact that contents of the controls provided by the controlling terminal device has been changed and set anew based on a result of determination by the acceptability determining section as historical data.

In this invention, the information concerning the fact that contents of controls by the controlling terminal device has been changed and set anew based on a result of determination by the acceptability determining section is stored as historical data in the storage section. Because of this feature, data on changes of contents of controls by the controlling terminal device are accumulated together with information concerning the operating state, and the information can be used as reference data, for instance, when contents of the controls of the controlling terminal device is changed, which insures easier management of the operating state.

The management supporting apparatus according to the present invention comprises a display controlling section for having the historical data displayed on the displaying section with a display format different from that for the operating state information concerning the operating state of the machine.

In the present invention, the historical data is displayed by the display controlling section with a display format different from that for the operating state of the machine of the displaying section. Because of this feature, the historical data can visually be checked in batch, which makes it possible to make use of the historical data for setting contents of controls by the controlling terminal device for manufacturing acceptable products, which insures improvement management of the operating state.

In the management supporting apparatus according to the present invention, the machine repeats a process for manufacturing the product as one cycle, and the machine information acquiring section preferably acquires operating state information once for every cycle of the machine.

In this invention, the machine repeats a process for manufacturing a product as a cycle, and the machine information acquiring section acquires the operating state information once for every cycle. Because of this feature, the operating state information for each product is acquired, which enables easy determination on acceptability of each product.

The management supporting apparatus according to the present invention preferably comprises a production scheduling section for setting a quantity of products to be manufactured, and a computing section for generating a achieving ratio by computing a percentage of a quantity of products determined as acceptable based on the latest operating state information acquired from the controlling terminal device against the quantity of products to be produced.

In this invention, the computing section generates an achieving ratio by computing a percentage of the quantity of products determined as acceptable based on the latest operating state information acquired from the controlling terminal device against the quantity of products to be manufactures set by the production scheduling section. Because of this feature, the current situation of production can easily be identified.

In the management supporting apparatus according to the present invention, the production scheduling section preferably comprises a clocking section for clocking the date and hour capable of setting the scheduled production completion date based on the date clocked by the clocking section, and a display controlling section for having the achieving ratio generated by the computing section barcode-displayed on the displaying section as a percentage of the production in the period of time from the production start date to the scheduled production completion date.

In this invention, the display controlling section for having the achieving ratio generated by the computing section barcode-displayed on the displaying section by computing a percentage of the production in the period of time from the production date to the scheduled production completion date. Because of this feature, the production state at the moment can visually be checked in batch, which insures easier management of the operating state.

In the management supporting apparatus according to the present invention, the machine is preferably an injection molding machine.

In this invention, an injection molding machine is used as the machine. Because of this feature, the operating state of a plurality of injection molding machines each generally running automatically can be recognized collectively, so that acceptability of the products manufactured by the injection molding machines each generally running automatically can be easily determined, the management of the operating state is easy, and manufacture of accurate injected molding products can easily be carried out.

The management supporting apparatus according to the present invention comprises a machine information acquiring section for acquiring a plurality of the operating state information with an operation of manufacturing a product as one cycle from the controlling terminal device provided for each machine manufacturing the product and acquiring a plurality of operating state information concerning the operating state of the machine to control the operating state of the machine, and a correlation coefficient computing section for computing a correlation coefficient of the operating state information acquired by this machine information acquiring section; and is characterized in that the correlation coefficient computing section can compute a correlation coefficient between a cycle in one piece of operating state information and a cycle one or more prior to the former cycle in another piece of operating state information.

In this invention, the machine information acquiring section acquires a plurality of the operating state information from the controlling terminal device provided for each machine manufacturing the product with an operation of manufacturing the product as one cycle and acquiring a plurality of the operating state information concerning the operating state of the machine to control the operating state of the machine, and the correlation coefficient computing section can compute a correlation coefficient of the acquired operating state information by computing a correlation coefficient between a cycle in one piece of operating state information and a cycle one or more prior to the former cycle in another piece of operating state information. Because of this feature, in a case of, for example, an injection molding machine repeating the feedstock measuring process, injection process, cooling process, opening process, removing process, and closing process, if the removing process for acquiring a product is specified as the starting point of a cycle, one cycle consists of the closing process, measuring process, injection process, cooling process, and opening process. Because of this feature, in an actual production cycle for the product, each of the measuring process, which is one cycle prior to the closing process, injection process, cooling process, and opening process is the cycle for the product actually produced, so that more suitable correlation coefficient can be obtained by computing with the operating state information of a cycle one or more cycles prior to the corresponding one, which insures improved management of operating state of the machine.

In the management supporting apparatus according to the present invention, the machine is preferably an injection molding machine.

In this invention, an injection molding machine is used as the machine. Because of this feature, the operating state of the injection molding machines repeating the operation of manufacturing a product as one cycle and generally running automatically is recognized, so that especially good correlation can be obtained, good management of the operating state can be acquired, and management of accurate injection molding operations can easily be carried out even with an automatically-run injection molding machine.

The management supporting apparatus according to the present invention preferably comprises a display controlling section for providing controls to have the result computed by the correlation coefficient computing section switching in a numerical/graphic form displayed on the displaying section.

In this invention, the display controlling section has the result computed by the computing section switching in a numerical/graphic form displayed on the displaying section according to the necessity. Because of this feature, the state of the acquired correlation coefficient can easily be recognized, which insures easier management of the operating state of the machine.

In the management supporting apparatus according to the present invention, the display controlling section preferably provides controls so that correlation coefficient is displayed with a different display format corresponding to the strength of correlation on the displaying section.

In this invention, correlation coefficient is displayed by the display controlling section with a different display format corresponding to the strength of correlation on the displaying section. Because of this feature, the correlation based on the correlation coefficient can easily be recognized, which insures easier management of the operating state of the machine.

The management supporting apparatus according to the present invention preferably comprises a storage section for storing therein the information concerning the fact that contents of the controls provided by the controlling terminal device has been changed and set anew based on the correlation coefficient computed by the correlation coefficient computing section as historical data.

In this invention, the information concerning the fact that contents of controls by the controlling terminal device has been changed and set anew based on the correlation coefficient computed by the correlation coefficient computing section is stored as historical data in the storage section. Because of this feature, data on the changed and set state of contents of controls provided by the controlling terminal device are accumulated, and the information can be used as historical data, for instance, when contents of the controls of the controlling terminal device is set, which insures easier management of the operating state.

The management supporting apparatus according to the present invention preferably comprises a display controlling section for having the historical information displayed on the displaying section with a display format different from that for the operating state of the machine.

In the present invention, the historical information is displayed by the display controlling section with a display format different from that for the operating state of the machine. Because of this feature, the historical information can visually be checked in batch, which makes it possible to make use of the historical information for setting contents of controls of the controlling terminal device for acquiring a manufacturing operation of good products, which insures the improved management of the operating state.

A management supporting system according to the present invention preferably comprises the management supporting apparatus according to the present invention described above, and a controlling terminal device connected via a network to the management supporting apparatus with which two-way transmission is available therebetween, and provided for each machine manufacturing the product with an operation of manufacturing the product as one cycle to acquire a plurality of operating state information concerning the operating state of the machine and to control the operating state of the machine.

The controlling terminal device herein is preferably provided for each machine manufacturing the product with an operation of manufacturing the product as one cycle.

In this invention, the controlling terminal device provided for each machine to acquire a plurality of operating state information of the machine and to control the operating state of the machine is connected via a network to the management supporting apparatus according to the present invention with which two-way transmission is available therebetween. Because of this feature, integrated management of the operating state for even a plurality of machines can easily be carried out with the simple configuration.

The management supporting system according to the present invention preferably comprises a server equipment connected via a network to the management supporting apparatus with which two-way transmission is available therebetween, and setting the operation of the management supporting apparatus.

In this invention, the server equipment for setting the operation of the management supporting apparatus is connected via a network to the management supporting apparatus. Because of this feature, the server equipment provides integrated management for setting the system to control the operating state of the machine, and with a system configuration, for example, where a plurality of management supporting apparatus is connected to a network in order to control the operating state in each division for the operational process, the system management can easily be carried out.

The management supporting system according to the present invention comprises the management supporting apparatus according to the present invention described above, and the server equipment connected via a network to the management supporting apparatus with which two-way transmission is available therebetween and setting the operation of the management supporting apparatus.

In this invention, the server equipment for setting the operation of the management supporting apparatus is connected via a network to the management supporting apparatus. Because of this feature, the server equipment provides integrated management for setting the system to control the operating state of the machine, and with a system configuration, for example, where a plurality of management supporting apparatus is connected to a network in order to control the operating state in each division for the operation process, the system management can easily be carried out.

In the management supporting system according to the present invention, the server equipment preferably comprises a clocking section for clocking the date and hour and executes process for adjusting the time with that clocked at least either in the controlling terminal device or in the management supporting apparatus.

In this invention, the server equipment executes process for adjusting the time with that clocked at least either in the controlling terminal device or in the management supporting apparatus. Because of this feature, the process of time for the operating state information processed in the system is integrated, which allows excellent process of the operating state information and insures improved management of the operating state.

The management supporting method according to the present invention is a method of management supporting developed from the management supporting apparatus according to the present invention.

The management supporting method according to the present invention is characterized in that controls are provided in which the operating state information is acquired by the computing section from the controlling terminal device provided for each machine and acquiring operating state information concerning the operating state of the machine to control the operating state of the machine, the operating state of the machine is determined based on this acquired operating state information, and a plurality of sections having a display area displayed with a different display format for each operating state of this determined operating state and corresponding to each machine is displayed in a list form on the displaying section.

The management supporting method according to the present invention is characterized in that the operating state information is acquired by the computing section from the controlling terminal device provided for each machine and acquiring the operating state information including parts state information relating to the operating state of the parts constituting the machine concerning the operating state of the machine, cumulative utilization information used for the operation of the parts based on the parts state information included in this acquired operating state information is recognized, and availability of the parts based on the recognized cumulative utilization with reference to the pre-acquired lifetime information concerning lifetime of the parts is recognized.

The management supporting method according to the present invention is characterized in that image data displayed by the controlling terminal displaying section is displayed by the computing section from the controlling terminal device having the controlling terminal displaying section provided for each machine and acquiring the operating state information concerning the operating state of the machine to control the operating state of the machine as well as displaying the controlling state, the image date being acquired making use of the Internet Protocol (IP).

The management supporting method according to the present invention is a method of management supporting in which the operating state information is received and processed via a network by the computing section from the controlling terminal device having the controlling terminal displaying section provided for each machine and acquiring the operating state information concerning the operating state of the machine to control the operating state of the machine as well as displaying the controlling state; and is characterized in that the prepared message information is transmitted via the network to the controlling terminal displaying section in the prespecified controlling terminal device so that the display can be carried out.

The management supporting method according to the present invention is characterized in that the operating state information is acquired by the computing section from the controlling terminal device provided for each machine manufacturing a product and acquiring the operating state information concerning the operating state of the machine to control the operating state of the machine, a histogram is computed based on this acquired operating state information, and the distribution of the histogram acquired by this computing is evaluated to determine acceptability of the product.

The management supporting method according to the present invention is characterized in that the operating state information is acquired by the computing section from the controlling terminal device provided for each machine manufacturing the product with an operation of producing the product as one cycle and acquiring a plurality of the operating state information concerning the operating state of the machine to control the operating state of the machine, and a correlation coefficient of this acquired operating state information is computed so that the correlation coefficient can be computed between a cycle in one piece of operating state information and a cycle one or more prior to the former cycle in another piece of operating state information. Because of this feature, the management supporting method can enjoy the same functional effect as the management supporting apparatus according to the present invention described above.

The present invention included in those described above can enjoy the same functional effect as the management supporting apparatus according to the present invention described above.

The management supporting program according to the present invention is characterized in that the management supporting method according to the present invention described above is executed by the computing section.

In this invention, the management supporting method according to the present invention described above can be executed by the computing section by using and installing, for example, a general-purpose computer as the computing section, which can greatly encourage the utilization of the present invention.

The management supporting program according to the present invention is a recording medium with the management supporting program recorded therein characterized in that the management supporting program according to the present invention described above is readably recorded by the computing section.

In this invention, the management supporting program to execute the management supporting method according to the present invention described above is recorded in the recording medium, so that the management supporting program can be easily handled, which can greatly encourage the utilization of the present invention.

It is to be noted that in the management supporting program and the recording medium according to the present invention, the computing section includes, for example, a personal computer, a configuration networked a plurality of computers, an elemental device such as a microcomputer, a circuit board equipped with a plurality of electronic parts and the like.

BRIEF DESCRIPTION OF THE DRAWINGS

FIG. 43 is a conceptual diagram showing a term setting display screen image displayed on the screen by means of the Web browser according to the embodiment.

DETAILED DESCRIPTION OF PREFERRED EMBODIMENT(S)

An embodiment of a production management supporting system in a management system according to the present invention is described below with reference to the related drawings.

In the description of the embodiment of the present invention below, a production machine is an injection molding machine, and configuration for managing the production situation as the operating state of this injection molding machine is described as an example. The production machine used in this invention is not limited to the injection molding machine, and this invention is applicable to various types of machines including various types of molding machines such as a press molding machine, processing machines for cutting or heating, and assembling machines such as an assembly robot used for assembling various components, and further the machines to which this invention is applicable are not limited to manufacturing machines, and the invention is applicable to any type of machines.

[Configuration of the Production Management Supporting System]

Figure 1:
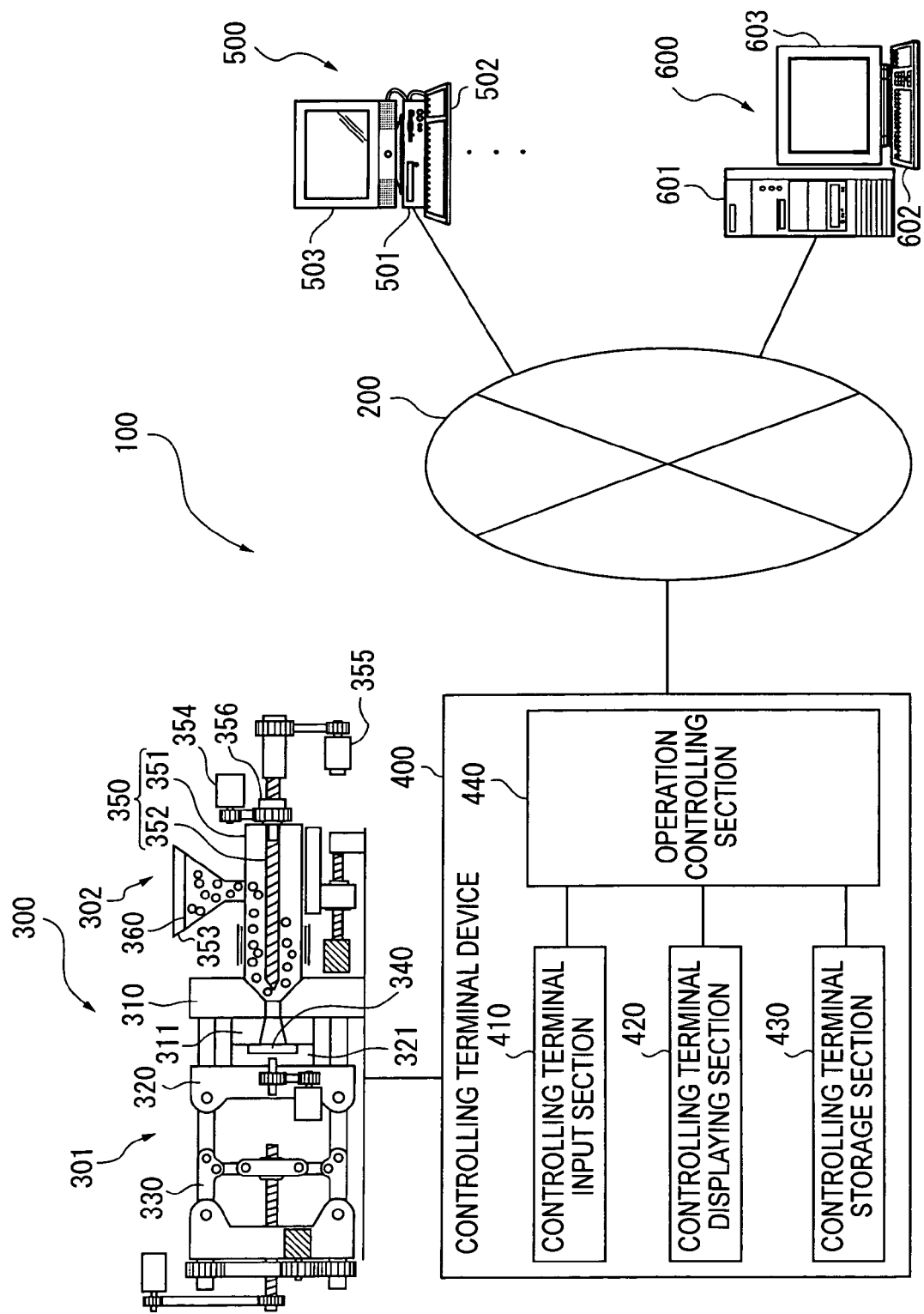
FIG. 1 is a schematic block diagram showing a manufacture management supporting system according to an embodiment of the present invention.

In FIG. 1, a production management supporting system 100 is a system for collecting data concerning contents of production controls for a manufacturing machine, processing the data, and supporting the production management. This production management supporting system 100 comprises a network 200, a controlling terminal device 400 (Refer to FIG. 1) provided as a control unit in an injection molding machine 300, a center management terminal device 500 (Refer to FIG. 2), and a server device 600 (Refer to FIG. 4). The management supporting device according to the present invention comprises the center management terminal device 500 and the server device 600.

The network 200 is a computer network based on a general-purpose protocol, for instance, like the TCP/IP (Transmission Control Protocol/Internet Protocol) such as the Internet, or a LAN (Local Area Network) such as the Intranet, and is built as, for instance, the so-called Ethernet (trademark). The network 200 also functions as a communication network for transmitting and receiving information via a base station not shown, for instance, with a radio medium. Further connected to the network 200 are the controlling terminal device 400, the center management terminal device 500 and the server device 600.

The injection molding machine 300 manufactures a molded product, which is a product, by injection-molding a feed stock such as synthetic resin. This injection molding machine 300 is driven, for instance, by an electric motor, and comprises a molding section 301 and an injection section 302.

The molding section 301 comprises a fixed plate 310 to which a fixed die 311 is attached, a moving plate 320 to which a moving die 321 is attached, and a toggle mechanism section 330 for moving the moving plate 320 and the fixed plate 310 so that they get closer to or further from each other. When the fixed die 311 and the moving die 321 are jointed to each other, a cavity 340 as a molding space is formed therein. Further provided in the molding section 301 are various types of sensors not shown such as a sensor for detecting linkage between the fixed die 311 and the molding die 321. The toggle mechanism section 330 and the various types of sensors are connected to each other so that a signal can be transmitted to or received from the controlling terminal device 400.

The injecting section 302 has an injecting body section 350 for injecting a feed stock 360 into the cavity 340, and the injecting body section 350 has a screw body 352 provided inside a body section 351 having a substantially cylindrical form so that it can rotate concentrically. The injecting body section 350 comprises a hopper 353 to which the feed stock 360 is injected, a heater not shown for melting the feed stock 360 injected into the body section 351, a weight control motor 354 for weighing the feed stock 360 melted in the body section 351 by rotating the screw body 352, an injection control motor 355 for injecting and filling the melted feed stock 360 into the cavity 340, and a pressure detecting section 356 for detecting a pressure for filling. Further provided in the injecting section 302 are various types of sensors not shown. The heater, various types of sensors, weight control motor 354, injection control motor 355 are connected to each other so that a signal can be transmitted to or received from the controlling terminal device 400.

The controlling terminal device 400 is provided in the injection molding machine 300, and controls the operating condition indicating the operating state of the injection molding machine 300. This controlling terminal device 400 comprises a controlling terminal input section 410, a controlling terminal displaying section 420, a controlling terminal storage section 430, and an operation controlling section 440.

The controlling terminal input section 410 is used to set and input operating conditions of the injection molding machine 300 through manual operations. This controlling terminal input section 410 is connected to the operation controlling section 440, and outputs the information for set and inputted conditions for injection molding to the operating controlling section 440. This controlling terminal input section 410 may be a touch panel as that described hereinafter, or may be that allowing voice input.

The controlling terminal displaying section 420 is connected to the operation controlling section 440, and displays image data outputted from the operation controlling section 440. For this controlling terminal displaying section 420, for instance, a liquid crystal panel, an organic EL (electroluminescence) panel, a PDP (Plasma Display Panel), a CRT (Cathode-Ray Tube), or the like may be used. Further the configuration is allowable in which, the controlling terminal displaying section 420 is a touch panel and the touch panel also functions as the controlling terminal input section 410.

The controlling terminal storage section 430 is connected to the operation controlling section 440, and stores various types of information in the readable state under controls by the operation controlling section 440. This controlling terminal storage section 430 stores therein, in addition to the information concerning various injection molding conditions, various programs developed on the OS (Operating System) for controlling operations of the entire controlling terminal device 400.

The operation controlling section 440 acquires information concerning the conditions for injection molding set and inputted in the controlling terminal input section 410 or various types of signals outputted from the injection molding machine 300 as operating state information, and recognizes the operating state such as the operating condition or manufacturing conditions of the injection molding machine 300. The recognized operating state is displayed by controlling the controlling terminal displaying section 420 according to the necessity. Further the operation controlling section 440 outputs signals to the injection molding machine 300 according to the necessity, and controls the operating conditions of the molding section 301 or the injecting section 302. Further the operation controlling section 440 acquires the operating state information together with the time information concerning the date and hour when the operating state information is acquired from the injection molding section 300. Namely the operation controlling section 440 has a clocking section not shown for time clocking.

The operation controlling section 440 is connected via the network 200 to the center management terminal device 500 or the server device 600 so that information can be transmitted to or received from the devices. Namely the controlling terminal device 400 has a communicating function to transact information view the network 200 with the center management terminal device 500 or the server device 600.

Figure 2:
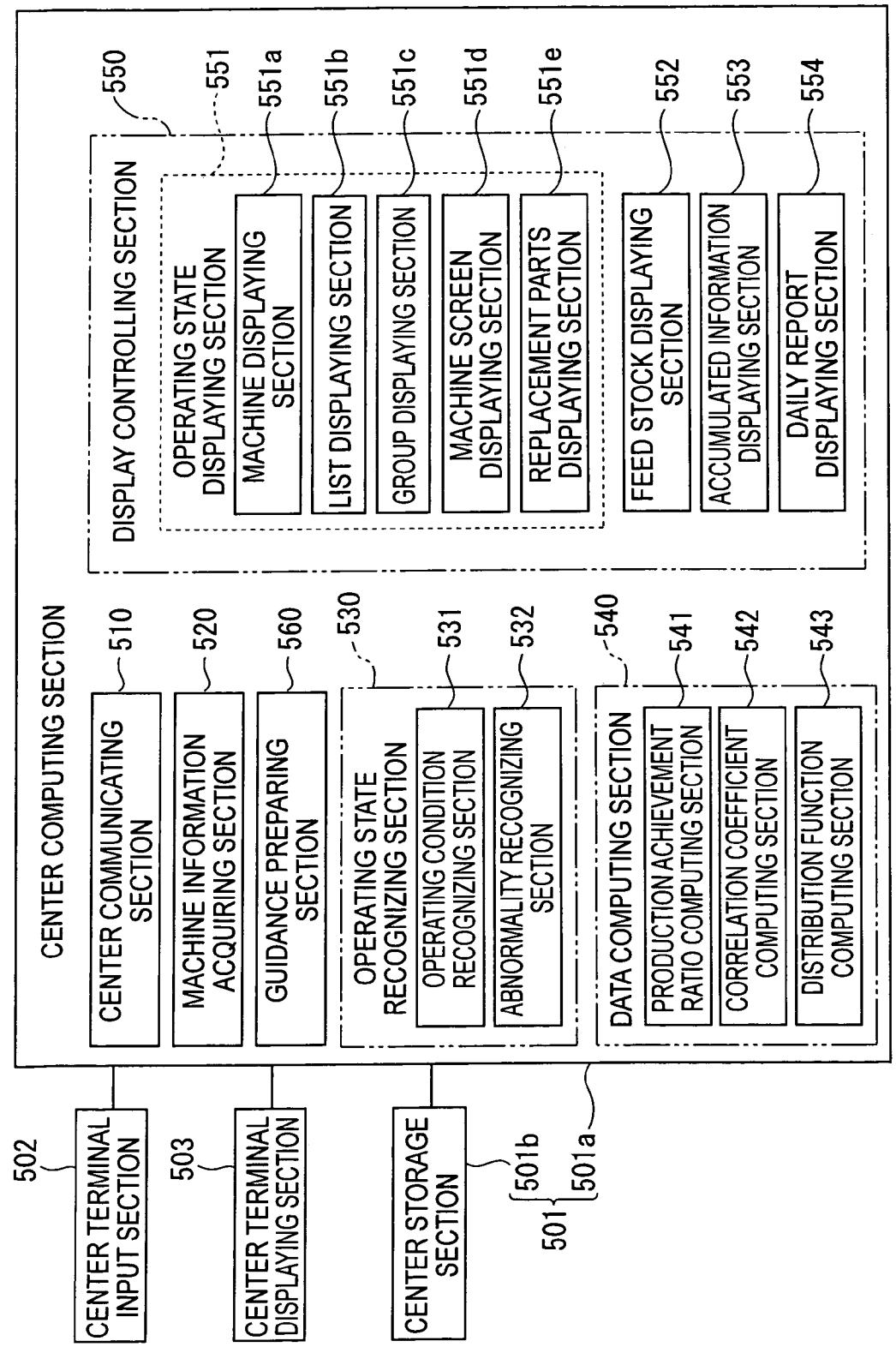
FIG. 2 is a block diagram showing a center controlling terminal device according to the embodiment.

The center management terminal device 500 is, for instance, a general-purpose computer having a center terminal body 501, a center terminal input section 502, and a center terminal displaying section 503 as shown in FIG. 1 and FIG. 2. The center terminal input section 502 is connected to the center terminal body 501 such as a keyboard or a mouse, and is used for setting and inputting various types of information through manual operation and outputs the information to the center terminal body 501. For setting and inputting the information as defined above, in addition to use of a keyboard or the like, a touch panel may be used, or voice input may be performed. This center terminal displaying section 503 is connected to the center terminal body 501, and displays image data from the center terminal body 501 according to the necessity. Various types of display devices may be used for this center terminal displaying section 503 as described above.

The center terminal body 501 comprises, as shown, for instance, in FIG. 2, a center computing section 501a functioning as a display controlling section, and a center storage section 501b. The center computing section 501a has application software installed therein for making use of the production management supporting system 100, and comprises a center communicating section 510, a machine information acquiring section 520 also functioning as a parts information acquiring section, an operating state recognizing section 530, a data computing section 540, a display controlling section 550, and a guidance preparing section 560 also functioning as a purchase order controlling section.

The center communicating section 510 is connected to the network 200 to transmit or receive various types of information.

The machine information acquiring section 520 acquires, of the information acquired by the center communicating section 510, signals outputted from the controlling terminal device 400, namely the operating state information which is information relating the operating state of the injection molding machine 300. This operating state information includes parts state information concerning parts used in the injection molding machine 300, especially exchangeable parts which is consumable. Especially, this operating state information also includes information concerning a period of time when an electric current for a heater is ON, times of contactor ON/OFF switching, a period of time when a servo motor is driving, a period of time when a ball screw is operating, a period of time when the parts to be exchanged is used, or times when the parts to be exchanged is used. The acquired information is outputted to the center storage section 501b and is stored therein.

The injection molding machine 300 described above sequentially, executes a step of weighing, a step of injecting, a step of cooling, a step of the so-called die-opening in which the fixed die 311 and the moving die 321 are separated from each other with the cavity 340 released and the product taken out, and a step of the so-called die closing in which the fixed die 311 and the moving die 321 are jointed to each other for forming the cavity 340, and the these steps form one cycle to injection-mold a product. The operating state information indicates the conditions for or states in each step, and is acquired once for each molding cycle of the injection molding machine 300. Although the details are described later, the information includes, for instance, the data concerning a period of time of one cycle, a period of time required for filling the feed stock 360, a period of time required for weighing the feed stock 360, a period of time required for taking out the product, a dwell pressure switching position which is a position of the screw body 352 for maintaining an injection pressure for the feed stock 360, a dwell pressure switching pressure at the time point, an injection start position indicating a position of the screw body 352 at the point of time when injection of the feed stock 360 is started, the MAX injection pressure which is the maximum pressure during injection, a minimum cushion position indicating the most advanced position of the screw body 352 in the injection process, a cushion position of the screw body 352 when the injection is complete, a number of screw rotation indicating a rotation number of the screw body 352, temperature at various positions of the body section 351, and temperatures of the fixed die 311 or moving die 321 at various positions.

The operating state recognizing section 530 recognizes the operating state of the injection molding machine 300 based on the operating state information acquired by the machine information acquiring section 520. This operating state recognizing section 530 comprises an operating condition recognizing section 531 also functioning as a parts utilization recognizing section and a lifetime determining section, and an abnormality recognizing section 532.

The operating condition recognizing section 531 recognizes the operating condition of the injection molding machine 300 based on the operating state information. The operating condition includes the information concerning how the product was produced, or whether the production machine is still running or down. Further the operating condition recognizing section 531, based on the parts state information in the operating state information, recognizes a period of time or times when each parts, especially parts to be placed, of the injection molding machine 300 is used. Further, the operating state recognizing section 531 computes a cumulative period of time indicating a total time of each replaced parts or cumulative times indicating total times of utilization.

The abnormality recognizing section 532 recognizes, based on the operating state information, for instance, an abnormal state, namely occurrence of an error, operation down of the injection molding machine 300, or contents of the error. Contents of an error is recognized, for instance, when the controlling terminal device 400 recognizes an error based on the operating state of the injection molding machine 300, based on the contents of the error displayed on the controlling terminal displaying section 420, more specifically based on error information comprising characters such as an error message or the like. The abnormality recognizing section 532 forms an abnormality reporting section together with the center communicating section 510 for reporting an abnormality via the center communicating section 510.

The data computing section 540 executes various types of computing for operation of the injection molding machine 300 based on the operating state information acquired by the machine information acquiring section 520 and also by making use of various data included in the operating state information. This data computing section 540 comprises a production achievement ratio computing section 541, a relative coefficient computing section 542, and a distribution function computing section 543.

The production achievement ratio computing section 541 computes a production achievement ratio based on the operating state information. The production achievement ratio is computed, for instance, as a percentage of a quantity of products actually manufactured against a quantity of products to be produced when the injection molding machine 300 operates to its full capacity, or a percentage of products manufactured up to the current date against a quantity of products to be produced until the prespecified date. Further the production achievement ratio computing section 541 also computes a percent defective. This percent defective is computed, for instance, as a percentage of defective products against a total quantity of products manufactured up to the current date.

The relative coefficient computing section 542 computes, based on the operating state information, a relative coefficient in each data for the operating state which is an individual item of the operating state information. For instance, a relative coefficient between data in the operating state information is computed. The relative coefficient [r] is computed by using an equation for computing the general coefficient, and a correlation between data is expressed with a value of r, which is equal to or larger than −1 and equal to or smaller than 1(−1≦r≦1). Namely, when r is equal to 1, it indicates a completely positive correlation, and when r is equal to −1, it indicates a completely negative correlation, and it is generally considered that, as an absolute value of r is larger, the correlation is stronger as a criteria for determination of the strength of the correlation as shown in Table 1.

This relative coefficient computing section 542 can compute not only a relative coefficient between data obtained in one shot (injection molding cycle), but also a relative coefficient between data obtained in other shots (cycles). Namely a relative coefficient between data obtained in one cycle and those obtained in any other previous cycle.

TABLE 1

| Relative coefficient (r) | Interpretation for the strength |
| --- | --- |
| 0–0.2 | Little correlated |
| 0.2–0.4 | A little correlated |
| 0.4–0.7 | Substantially correlated |
| 0.7–1.0 | Strongly correlated |

The distribution function computing section 543 computes distribution in each data for the operating state based on the operating state information. For instance, a sample statistic which indicates distribution of each data in the operating state information within a prespecified range is computed. This distribution function computes, for instance, a number of samples for each data obtained in each molding cycle carried out by the injection molding machine, an average value for data computed through the operational expression (1) below, a standard deviation computed by the operational expression (2) below, a mode indicating a value most frequently expressed in data, dispersion computed by the operational expression (3) below, a distortion degree indicating distortion in distribution in data computed by the operational expression (4) below, a kurtosis indicating a degree of steepness in distribution of data computed by the operational expression (5), a range of data value, a minimum value indicating the smallest value in the data, a QI value indicating a value smaller than 25% of the data value range and larger than 75% of the data value range, a median indicating a central value when data is ordered, a Q3 value indicating a value smaller than 75% of the data value range and larger than 25% of the data value, and a maximum value indicating the largest value in the data.

$$\mu = \frac{1}{n}\sum_{i=1}^{n} x_i \quad (1)$$

$$s = \sqrt{\frac{\sum_{i=1}^{n}(x_i - \mu)^2}{n-1}} \quad (2)$$

$$v = \frac{\sum (x_i - \bar{x})^2}{n} \quad (3)$$

$$Skew = \frac{n}{(n-1)(n-2)}\sum_{i=1}^{n}\left(\frac{x_i - \mu}{s}\right)^3 \quad (4)$$

$$Kurt = \left\{\frac{n(n+1)}{(n-1)(n-2)(n-3)}\sum_{i=1}^{n}\left(\frac{x_i - \mu}{s}\right)^4\right\} - \frac{3(n-1)^2}{(n-2)(n-3)} \quad (5)$$

The display controlling section 550 controls the center terminal displaying section 503 according to the necessity, and has various types of information concerning production such as information concerning the operating state of the injection molding machine 300 or the feed stock 360 displayed on the center terminal displaying section 503 based on the various types of information acquired by the center communicating section 510 such as the operating state. This display controlling section 550 comprises an operating state displaying section 551, a feed stock displaying section 552, a cumulative information displaying section, and a daily report displaying section 554.

The operating state displaying section 551 provides controls to display information concerning the operating state of the injection molding machine 300. This operating state displaying section 551 comprises a machine displaying section 551a, a list displaying section 551b, a group displaying section 551c, a machine screen displaying section 551d, and a replacement parts displaying section 551e. The machine displaying section 551a displays the operating state of each injection molding machine 300. The list displaying section 551b displays the operating state of the injection molding machine 300 in the list form. The group displaying section 551c displays the operating state of injection molding machines 300 group by group. The machine screen displaying section 551d displays a screen displayed on the control terminal displaying section 420 of the controlling terminal device 400. The replacement parts displaying section 551e displays situation of replacement parts based on the operating state.

Detailed displays for each injection molding machine 300 include, for instance, a quality monitor table display showing various types of operating state information for each cycle, a trend chart display showing each operating state information in the quality monitor table in the graphic form, a relative coefficient display showing a relative coefficient between various types of operating state information, a distribution function display showing a distribution function for each operating state information, a machine screen display showing a screen displayed on the controlling terminal displaying section 420 of the controlling terminal device 400, a log display showing the accumulated operating state information, a daily report display showing operating state information concerning products manufactured on a specified day, a message display showing various types of messages concerning the operating state, products, or injection molding of feed stock 360, and additional data showing information for items set separately as the operating state information.

Displays concerning management of the replacement parts include display showing lifetime of each replacement parts in the list form, an order ledger display showing orders for replacement parts, an ordering record display showing records of orders for each replacement parts, a replacement record display concerning records of replacement of each replacement parts.

The feed stock displaying section 552 provides controls to display information concerning feed stocks 360 used for injection molding as described in detail below. The cumulative information displaying section 553 provides controls, as described in detail below, to display record information which is operating state information for each injection molding machine 300 and parts state information for each replacement parts accumulated up to the current date. The daily report information 554 provides controls, as described in detail below, to display a daily report showing the operating state information concerning products manufactured on a specified date.

Figure 3:
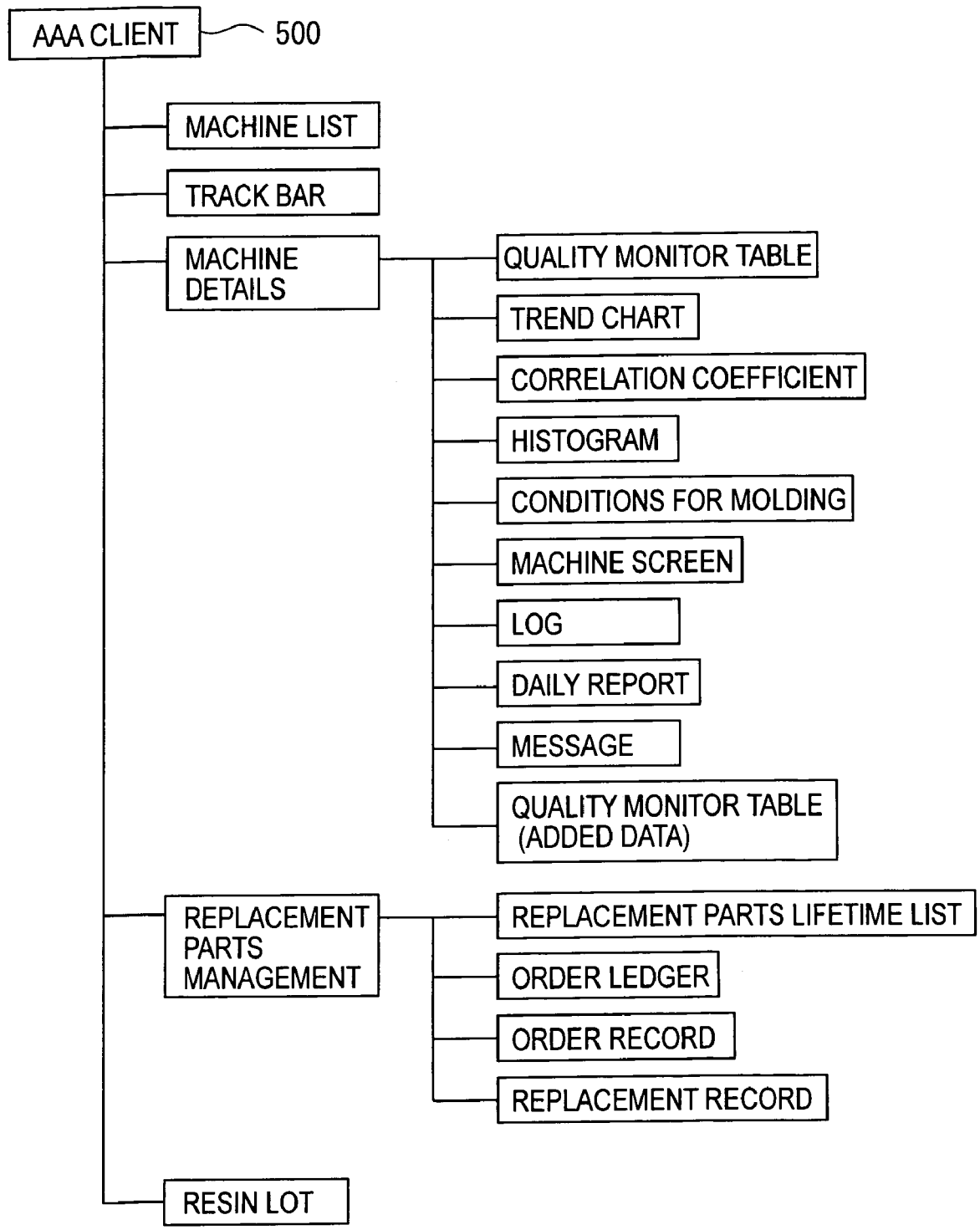
FIG. 3 is a hierarchy diagram showing information processed in the center controlling terminal device according to the embodiment.

Examples of specific displays include, as described in detail below, a display of a list for all injection molding machines 300, a track bar display showing a bar for the operating condition of each injection molding machine 300, a detailed display for each discrete injection molding machine 300, a display for management of the replacement parts, and a resin lot display for the feed stock 360 to be injection-molded, as shown in FIG. 3.

The guidance preparing section 560 prepares message information such as that to be notified from a user to another user by processing data inputted in a text form in response to an input operation in the center terminal input section 502 to the message information. Further the guidance preparing section 560 prepares data or a message indicating ordering replacement parts, for instance, from a terminal device of the parts manufacturer in response to a prespecified input operation in the center terminal input section 502, and transmits the prepared message information with the center communication section 510 according to the necessity.

The center computing section 501a comprises a clocking section for clocking not shown. The processing for date and time of the operating state information as described later is carried out by making use of the time information included in the operating state information acquired from the computing control section 400 based on the date and time clocked by this clocking section.

Figure 4:
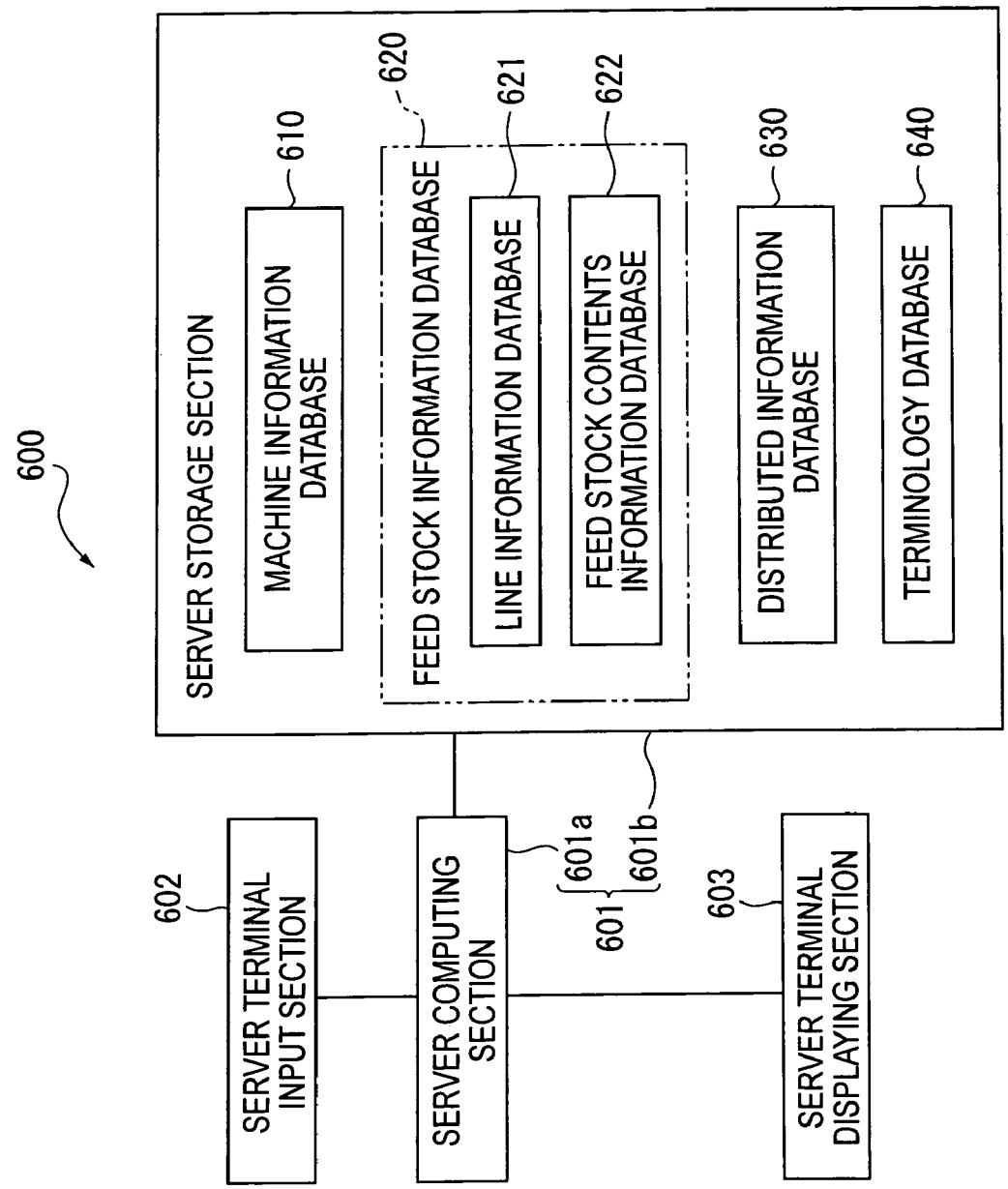
FIG. 4 is a block diagram showing a server equipment according to the embodiment.

The server device 600 comprises a server 601, a server input section 602, and a server displaying section 603 as shown in FIG. 1 and in FIG. 4. The server input section 602 such as a keyboard and a mouse is connected to the sensor 601, receives various types of information set and inputted in response to an input operation and outputs the information to the server 601. The setting and input operation may be performed, in addition to entry from a keyboard, with a touch panel, or by means of audio input. The server 603 is connected to the server 601, and displays image data sent from the server 601. Various types of display devices may be used for this server displaying section 603 as described above.

The server 601 comprises a server computing section 601*a* and a server storing section 601*b*. The server 601 has application software for managing the production management supporting system 100 installed therein, and sets and processes the information controlled in the production management supporting system 100 according to the necessity. The server computing section 601*a* comprises a clocking section not shown for clocking date and time. The clocking section, for example, can clock the time according to the Universal Time. The server computing section 601*a* further executes process for adjusting the time thereof with that clocked with the controlling terminal device 400 or in the center management supporting device 500 according to the necessity.

The server storing section 601*b* comprises a machine information database 610, a feedstock information database 620, a delivering information database 630, and a term database 640. The feedstock information database 620 comprises a line information database 621 and a feedstock contents information database 622.

Figure 5:
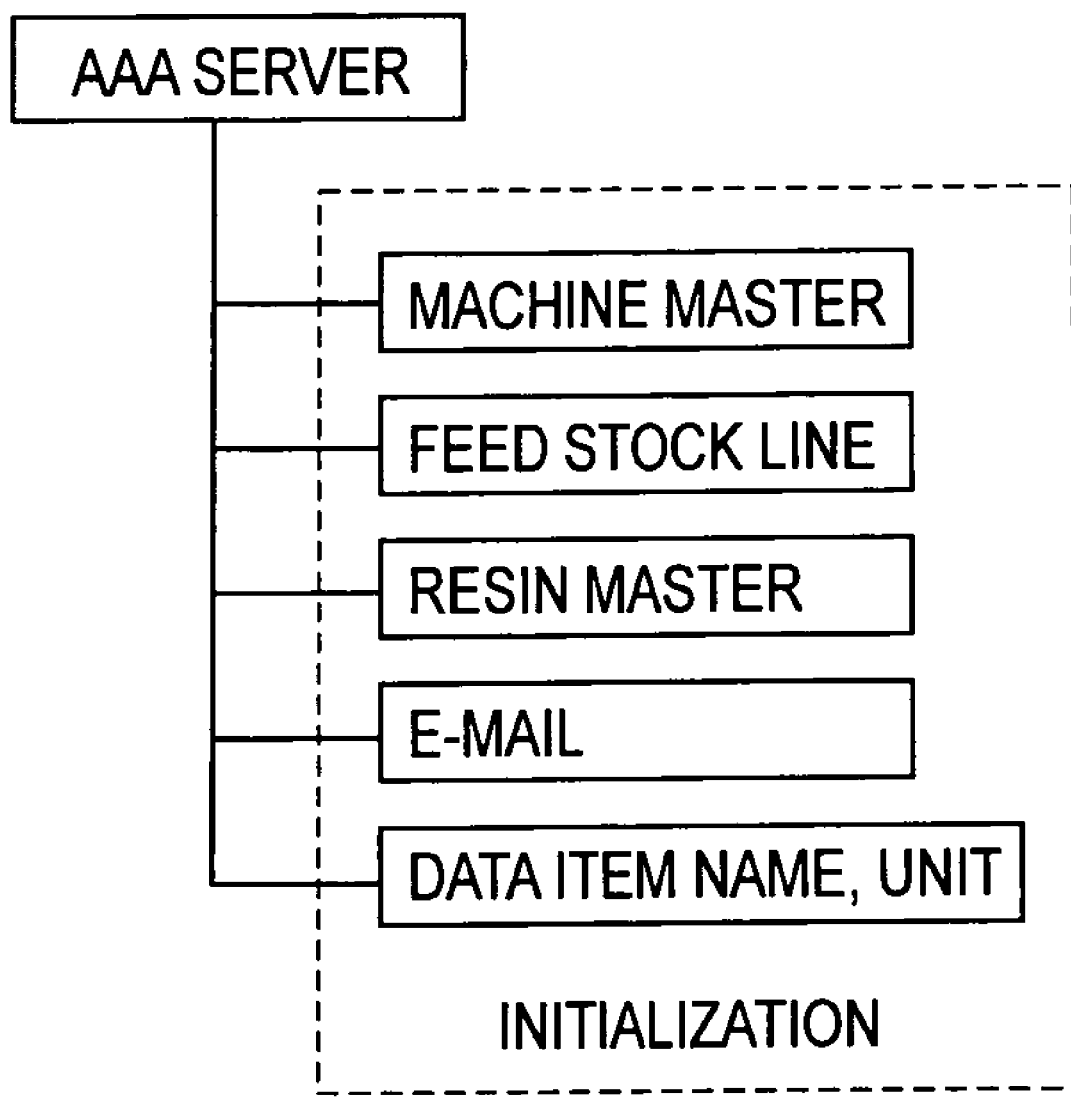
FIG. 5 is a hierarchy diagram showing information processed in the server equipment according to the embodiment.

The machine information database 610 indicates, as described in detail below, for instance, as shown in FIG. 5, a table structure database to set information concerning the injection-molding machine 300 such as the operating state information processed in the center controlling terminal device 500 according to the necessity, record the information as one record therein, and store the information as machine master information therein. The line information database 621 in the feedstock information database 620 is, as described in detail below, a table-structure database for recording the setting information in which the injection-molding machine 300 utilizing the feedstock 360 used for injection molding is set to constitute a line as one record and for storing the record as the feedstock line information therein. The feedstock contents information database 622 in the feedstock information database 620 is, as described in detail below, a table-structure database for recording the information concerning the feed stock 360 used for injection molding as one record and for storing the record as resin master information therein. The delivering information database 630 is, as described in detail below, a table-structure database for storing the setting to transmit various information as one record and storing the record as the e-mail information therein. The term database 640 is, as described in detail below, a table-structure database for setting various types of terms such as the name of the item or unit used in the production management supporting system 100, for recording each of the terms as one record, and for storing the records as term information therein.

(Specific Configuration of the Center Controlling Terminal Device)

A configuration of the center management terminal device 500 is described below making use of specific processing form with reference to the related drawings.

The display controlling section 550 in the center computing section 501*a* of the center management terminal device 500 comprises, as described above, the operating state display section 551, feedstock information display section 552, cumulative information display section 553, and daily report display section 554. The operating state display section 551 further comprises the machine display section 551*a*, list display section 551*b*, group display section 551*c*, machine screen display section 551*d*, and replacement parts display section 551*e*. The display by each display section is made in the form of screen display by means of Web browser.

Figure 6:
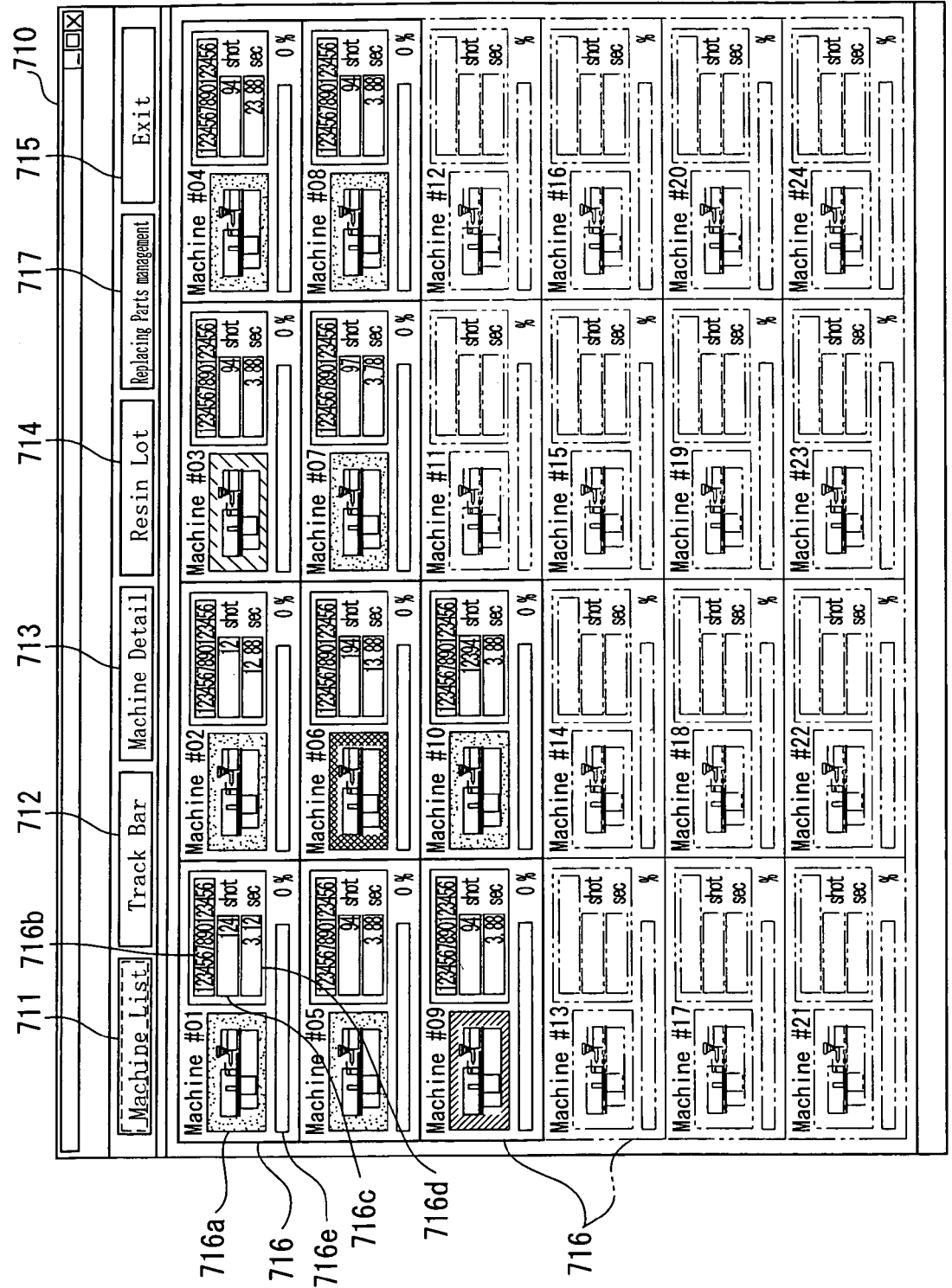
FIG. 6 is a conceptual diagram showing a machine list display screen image displayed on the screen by means of the Web browser according to the embodiment.

The list display of the operating state of the injection-molding machine 300 by the list display section 551*b* is, for example, a machine list display screen 710 as shown in FIG. 6.

Figure 7:
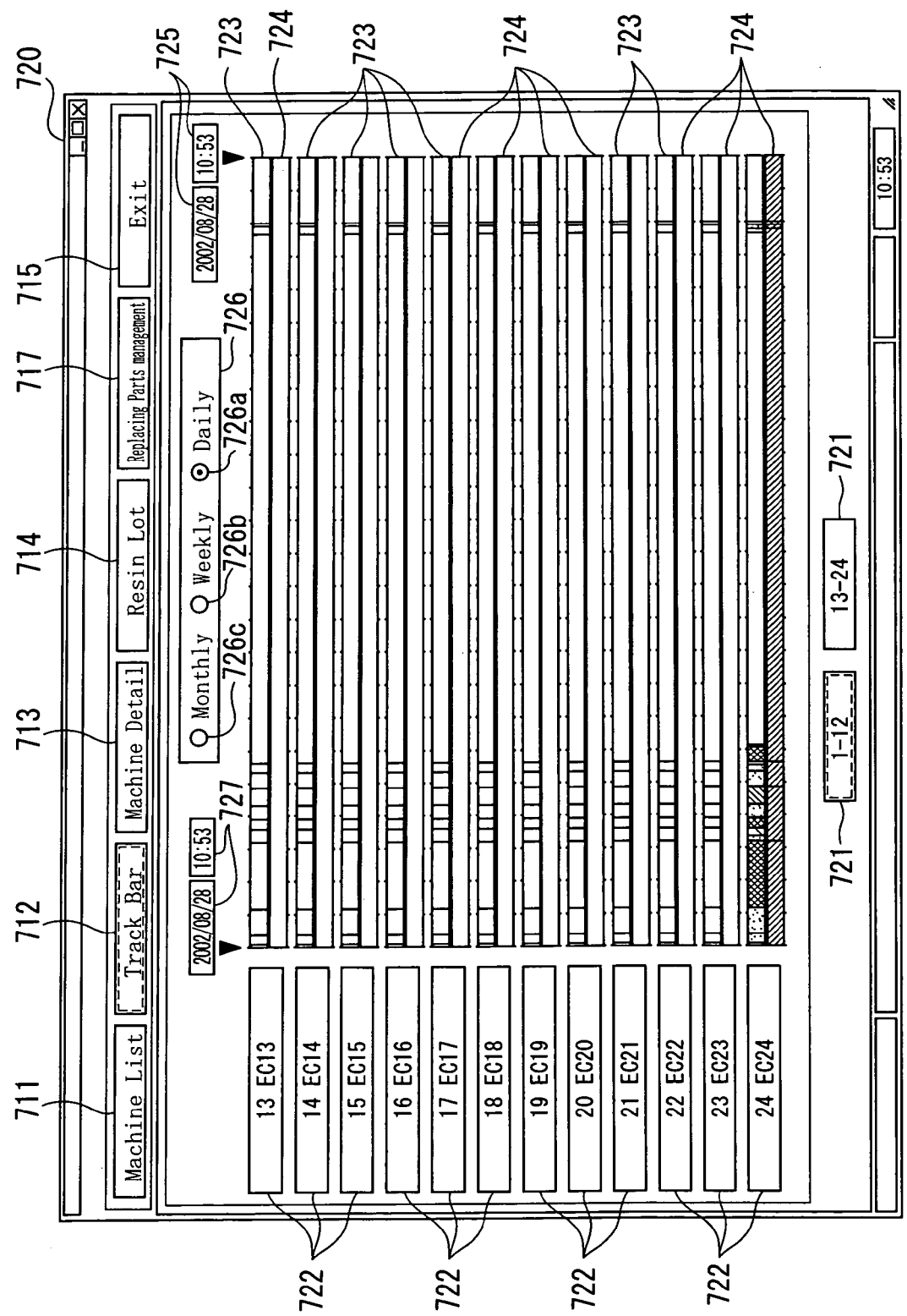
FIG. 7 is a conceptual diagram showing a group display screen image displayed on the screen by means of the Web browser according to the embodiment.

The display of the operating state of each injection-molding machine 300 grouped by the group display section 551*c* is, for example, a group display screen 720 as shown in FIG. 7.

Figure 8:
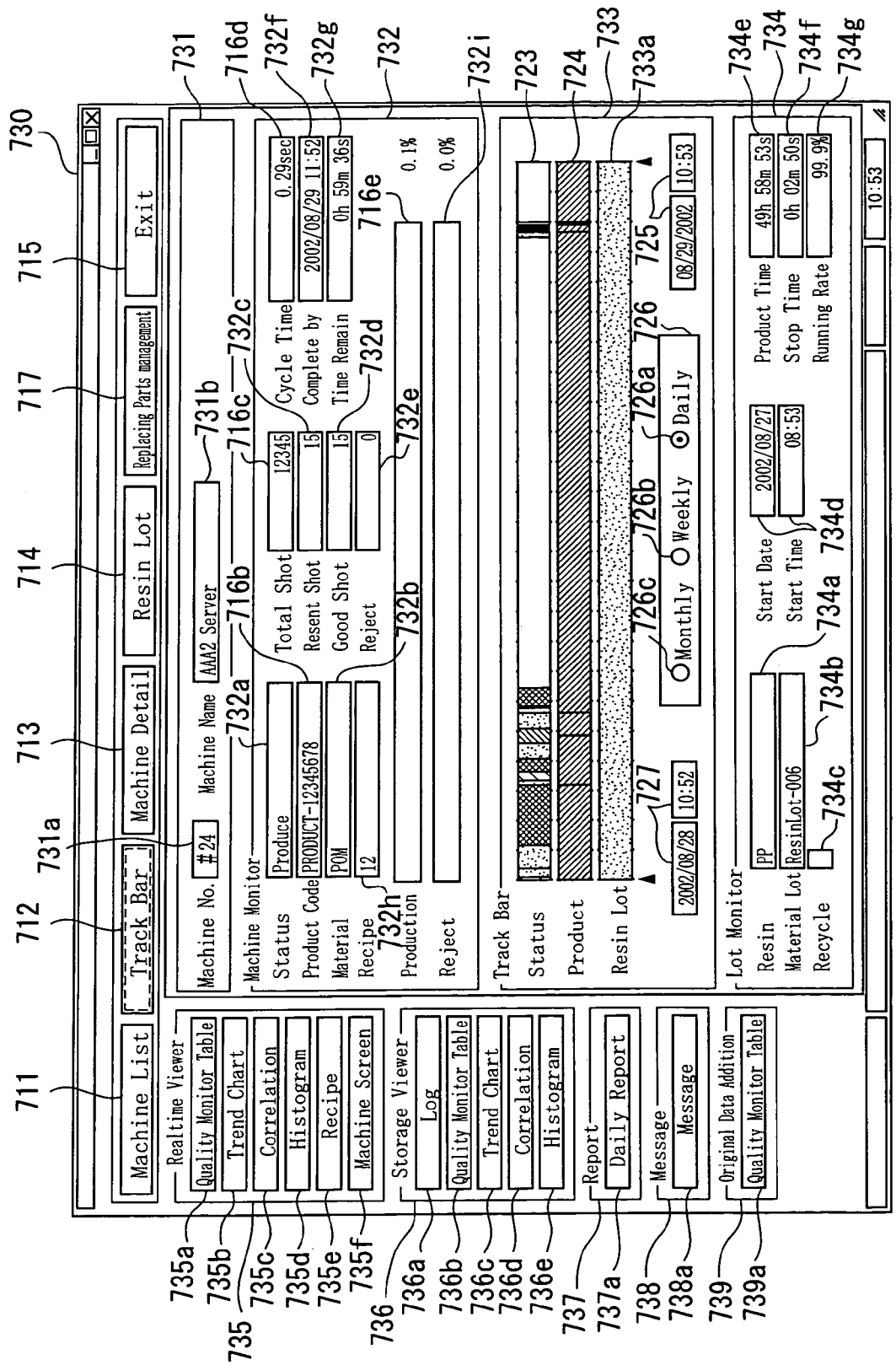
FIG. 8 is a conceptual diagram showing a machine details display screen image displayed on the screen by means of the Web browser according to the embodiment.

The display of the operating state of each injection-molding machine 300 by the machine display section 551*a* is, for example, a machine details display screen 730, as shown in FIG. 8.

Figure 24:
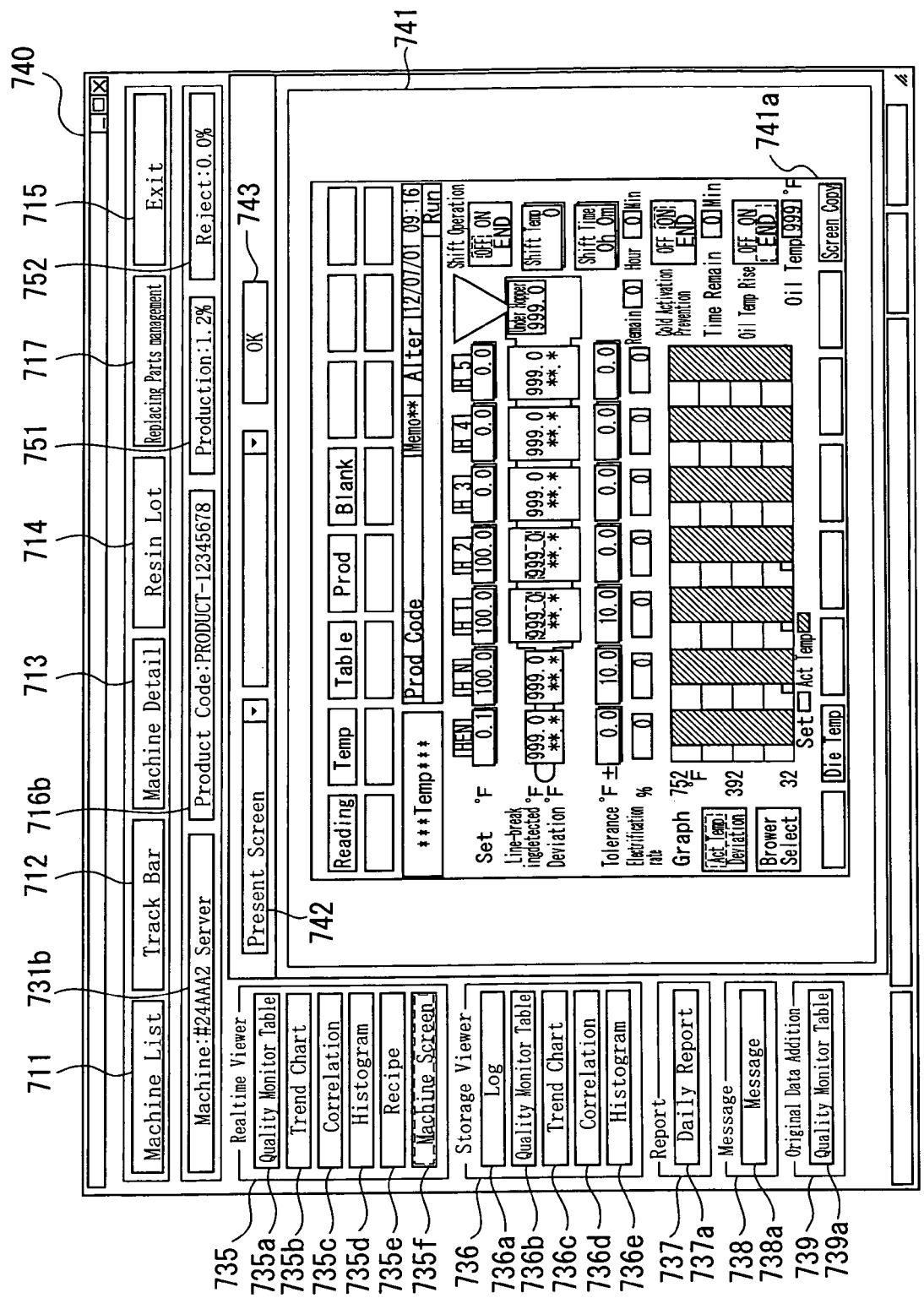
FIG. 24 is a conceptual diagram showing a machine screen display screen image displayed on the screen by means of the Web browser according to the embodiment.

The display displayed on the controlling terminal displaying section 420 of the controlling terminal device 400 by the machine screen display section 551*d* is, for example, a machine screen display screen 740 as shown in FIG. 24.

Figure 25:
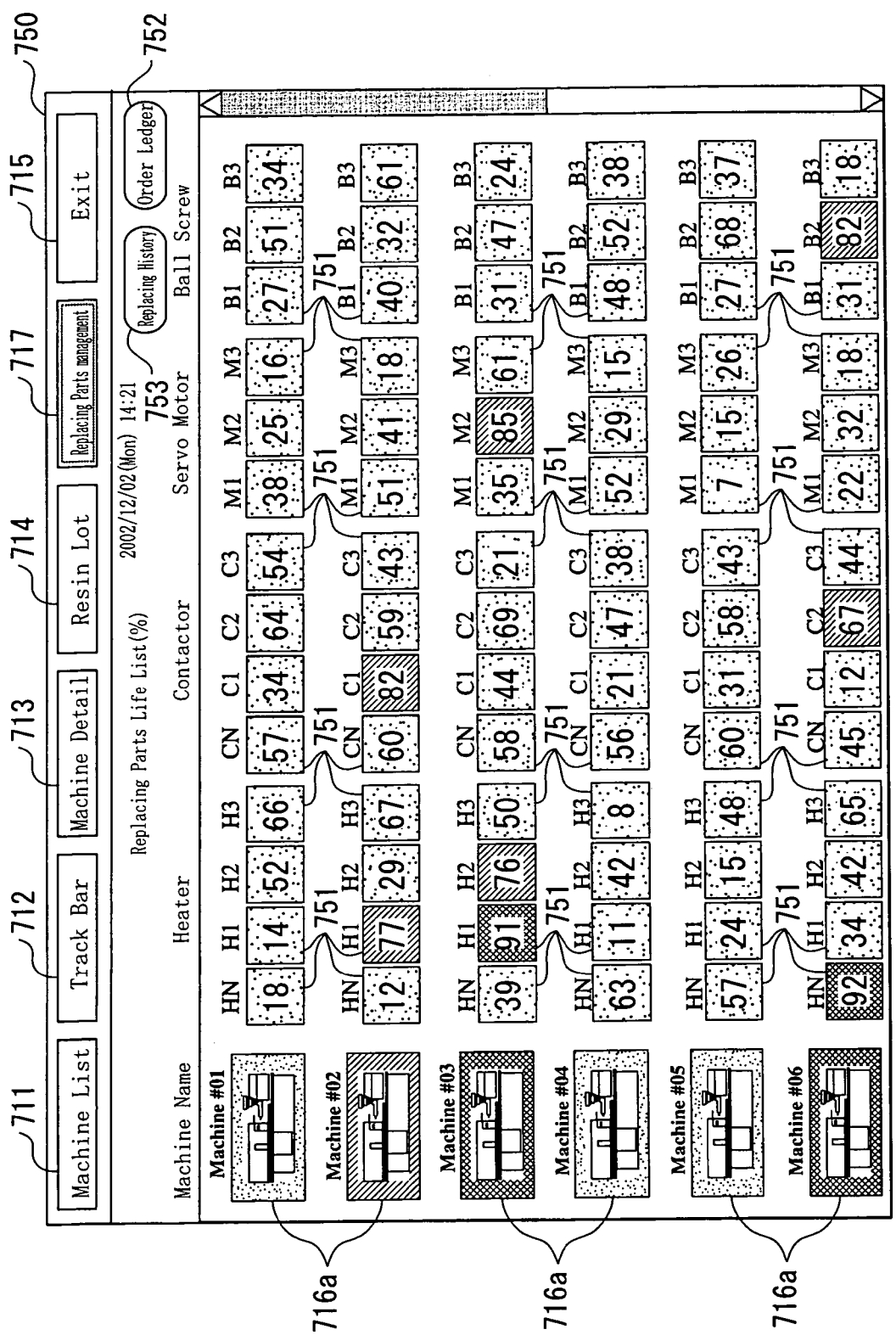
FIG. 25 is a conceptual diagram showing a lifetime list display screen image displayed on the screen by means of the Web browser according to the embodiment.

The display concerning the management of replacement parts by the replacement parts display section 551*e* is, for example, a lifetime list display screen of replacement parts as shown in FIG. 25.

(Machine List Display Screen)

On the machine list display 710 shown in FIG. 6 are provided command buttons 711, 712, 713, 714, 715, 717, to open a screen for displaying the operating state of the injection-molding machine 300 in each displaying form.

With the command button 711 through manual operation the list display section 551*b* displays the machine list display 710. With the command button 712 through manual operation the group display section 551*c* displays the machine display screen 720 as described below and shown in FIG. 7. With the command button 713 through manual operation the machine display section 551*a* displays the machine details list display screen 730 for displaying the operating state of each injection-molding machine 300 as described below and shown in FIG. 8. With the command button 714 through manual operation the feedstock information display section 552 displays the resin lot display screen 870 for displaying information concerning the feedstock 360 as described below and shown in FIG. 37. With the command button 715 through manual operation the process by the production management supporting system 100 is terminated. With the command button 717 through manual operation the replacement parts display section 551*e* displays the lifetime list display screen 750 for displaying the situation based on the operating state of replacement parts as described below and shown in FIG. 25.

On the machine list display 710 is provided a plurality of sections 716 for displaying the operating state of each injection-molding machine 300. On these sections 716 are displayed serial numbers indicating the machine-specific information for displaying each injection-molding machine 300, for example, "Machine #01" or the like. On the section 716 are displayed image data symbolizing the injection-molding machine 300 and is provided a screen 716*a* displaying the background thereof in different colors. The background color displayed on this screen 716*a* indicates the operating state of the injection-molding machine 300. More specifically, normal automatic operation is indicated by green, operation stop by blue, abnormality occurring by red, production completion by orange, replacing the fixed die 311 or the moving die 321 by black, operation stop after a plurality of alarms is continuously set off by yellow, power supply OFF by gray (shown with a partially chain doubled-dashed line in FIG. 6), or the like.

In the section 716 of the machine list display screen 710 are provided a text box 716b for displaying the product code which is a number corresponding to the name of the set and manufactured product or to the product such as a code number; a text box 716c for displaying the number of shot, namely, the number of the manufactured products as the number of a total shot indicating the number of a molding cycle; a text box 716d for displaying the cycle time per cycle; and a progress bar 716e for displaying the production achievement ratio. In the proximity of the progress bar 716e is displayed the production achievement ratio in the form of a numeric value.

With each section 716 through manual operation, namely, click operation of a mouth which is an input device for selection by moving a cursor displayed on the screen to the prespecified section 716, the operating state displaying section 551 processes data for displaying the machine details displaying screen 730 as described below and shown in FIG. 8.

As described above, the list display section 551b recognizes the manual operation with the center terminal input section 502 and processes data in various types of information used in the production management supporting system 100 for displaying in the list form.

(Group Display Screen)

On the group display section 720 shown in FIG. 7 are provided command buttons 711, 712, 713, 714, 715, 717, as with the machine list display screen 710 described above. On the machine list display screen 720 is further provided a command button 721 for displaying each injection-molding machine 300 group by group. In this FIG. 7 is illustrated an example grouped into "Machine #1"~"Machine #12" and "Machine #13"~"Machine #24" of the machine list display screen, and the group "Machine #1"~"Machine #12" is shown therein. On the machine display screen 720 is further provided a command button 722 for displaying the machine details display screen 730 described below, shown in FIG. 8, and for displaying the detailed operating state of each injection-molding machine 300.

On the machine display screen 720 are provided a bar display 723 for displaying the operating state of the injection-molding machine 300 as the status according to time in different colors, and a bar display 724 for displaying the state of switchover of the manufactured products in different colors, each bar display being adjacent to each command button 722. The color displayed on the bar display 723 is linked with the background color on the screen 716a in the section 716 of the machine list display screen 710 described above and the same color is used for the same operating state. The color displayed on the bar display 724 indicates, for instance, a product now being produced by green or a product having been produced in the past by blue.

On the group display section 720 are provided a text box 725 for displaying the current date and time; an option group 726 comprised of a plurality of option buttons 726a~726c for selecting a display condition to display the bar displays 723~724 described above, for example, over a period of days, weeks, or months; and a text box 727 for displaying the starting date and time in the bar displays 723~724 described above in the display form selected in the option group 726.

As described above, the group display section 551c recognizes the manual operation with the center terminal input section 502 and processes date for displaying various types of information used in the production management supporting system by grouping each injection-molding machine 300.

(Machine Screen Display Screen)

The machine details display screen 730 and other operation screens related to this screen are described below.

On the machine details display screen 730 shown in FIG. 8 are provided the command buttons 711, 712, 713, 714, 715, 717 as with the machine list display screen 710 and the group display screen 720 described above. On the machine details display screen 730 are further provided a specific information area 731 for displaying the machine-specific information specific to each injection-molding machine 300; a production condition area 732 for displaying the production condition of a product manufactured by the injection-molding machine 300 based on the operating state information; an operation condition area 733 for displaying the production condition of the injection-molding machine 300; a feedstock information area 734 for displaying information concerning the feedstock 360; a real-time display area 735 for displaying information concerning the current operating state; a storage display area 736 for displaying the accumulated information concerning the operating state; a report display area 737 for displaying the operating state information concerning a product manufactured on a prespecified date; a message display area 738 for displaying various types of messages concerning injection molding including the operating state, products, and the feedstock 360; an original data display area 739 for displaying the items set separately as the operating state information.

In the specific information area 731 are provided a text box 731a for displaying, for example, the machine number and a text box 731b for displaying the name of a machine such as the model type. The display in the text box 731a is a serial number displayed in the section 716 on the machine list display screen 710.

In the production condition area 732 is provided a plurality of text boxes 732a, 732b, 716b, 716c, 716d, 732c, 732d, 732f, 732g, 732h. The text box 732a displays a status indicating whether the production is in progress or not. The text box 732b displays a feedstock code including the name or the code number corresponding to the feedstock 360. The text box 716b displays the same product code as that displayed on the machine list display screen 710. The text box 716c displays the same number of a total shot as that displayed on the machine list display screen 710. The text box 716d displays the same cycle time as that displayed on the machine list display screen 710. The text box 732c displays the number of the current shot indicating the number of shot at the present moment. The text box 732d displays the non-defective shot indicating the number of times when injection is good to produce a non-defective product. The text box 732e displays the defective shot indicating the number of times when injection is not good to produce a defective product. The text box 732f displays the scheduled date for production completion. The text box 732g displays remaining hours by the scheduled date for production completion. The text box 732h displays which condition of a pattern is on, for example, among 30 patterns of injection molding conditions.

In the operation condition area 732 are provided a progress bar 716e for displaying the same production achievement ratio as that displayed on the machine list display screen 710 and a progress bar 732i for displaying a defective ratio. In the proximity of these progress bars 716e, 732*i*, are displayed the production achievement ratio and the defective ratio in the form of a numerical value respectively.

In the operation condition area 733 are provided a bar display 723 for showing the operating state of the injection-molding machine 300 displaying the same status as that displayed on the group display screen 720 in relation to time: a bar display 724 for displaying the same state of switchover as that displayed on the group display screen 720; and a bar display 733*a* for displaying the state of switchover of the feedstock 360 which is a resin lot in different colors as with that displayed on the bar display 724. The display on the bar display 733*a* in different colors displays, for instance, resin now in use by green and resin having been used in the past by blue. In the operation condition area 733 are further provided, as with the group display screen 720, a text box 725 for displaying the current date and time; a bar display 723*a*, an option group 726 for switching the period of displaying time of the bar displays 723, 724, 733*a*, and a text box 727 for displaying the starting date and time in the bar displays 723, 724, 733*a*.

In the feedstock information area 734 are provided a text box 734*a* for displaying the type of the feedstock 360 used, a text box 734*b* for displaying the lot of the feedstock 360, a text box 734*c* for displaying whether the reclaimed feedstock is used or not, a text box 734*d* for displaying the starting date and time of injection molding, a text box 734*e* for displaying the production time, a text box 734*f* for displaying the stop time, a text box 734*g* for displaying the operation ratio indicating a percentage of the production time against a total period of time, and the like.

In the real-time display area 735 are provided, for instance, as described in detail below, a command button 735*a* for displaying the quality monitor table display screen 150 shown in FIG. 9 and displaying various types of the operating state information in every one cycle described above; a command button 735*b* for displaying the trend chart display screen 160 shown in FIG. 10 and displaying various types of the operating state information in the graphic form displayed on the quality monitor table display screen 150; a command button 735*c* for displaying the relative coefficient display screen 170 shown in FIG. 11 and displaying the relative coefficient of each operating state information; a command button 735*d* for displaying the distribution function display screen 180 shown in FIG. 12 and displaying a histogram indicating a distribution function of each operating state information; a command button 735*e* for displaying the injection-molding condition display screen 190A shown in FIG. 13 and displaying the injection condition in the molding condition information; and a command button 735*f* for displaying the machine screen display screen 740 shown in FIG. 24 and displaying a screen displayed in the controlling terminal display section 420 of the controlling terminal device 400 by the machine screen display section 551*d* described above.

In the storage display area 736 are provided, for instance, as described in detail below, a command button 736*a* for displaying in a list form the accumulated operating state information; a command button 736*b* for displaying in a list form the date in the quality monitor table similar to that on the quality monitor table display screen 150 in the accumulated operating state information for a prespecified period of time; a command button 736*c* for displaying a trend chart similar to that on the trend chart display screen 160 of the accumulated operating state information for a prespecified period of time; a command button 736*d* for displaying a relative coefficient similar to that on the relative coefficient display screen 170 in the accumulated operating state information for a prespecified period of time; and a command button 736*e* for displaying a distribution function similar to that on the distribution function display screen 180 in the accumulated operating state information for a prespecified period of time. With the command button 736*a* through manual operation, for example, the operation of selecting and setting by moving a cursor displayed on the screen with the center terminal input section 502, for instance, the log display screen 210 is displayed in a form of screen display by means of Web browser shown in FIG. 14.

In the report display area 737 is provided, for instance, as described in detail below, a command button 737*a* for displaying the operating state information concerning the product manufactured on a prespecified date. More specifically, as described in detail below, with the command button 737*a* through manual operation as described above, for example, the daily display screen 220 is displayed in the form of screen display by means of Web browser shown in FIG. 15.

In the message display area 738 is provided, for instance, as described in detail below, a command button 738 for preparing a message displayed in the controlling terminal display section 420 of the controlling terminal device 400 by delivery, the message being various types of messages concerning injection molding such as the operating state, products, the feedstock 360 or the like. More specifically, as described in detail below, with the command button 738*a* through manual operation as described above, for example, the message display screen 230 is displayed in the form of screen display by means of Web browser shown in FIG. 16.

In the original data display area 739 are provided, for instance, as described in detail below, a command button 739*a* for displaying the items set separately as the operating state information. More specifically, as described in detail below, with the command button 739*a* through manual operation as described above, for example, the original data display screen 240 is displayed in the form of screen display by means of Web browser shown in FIG. 17.

Figure 9:
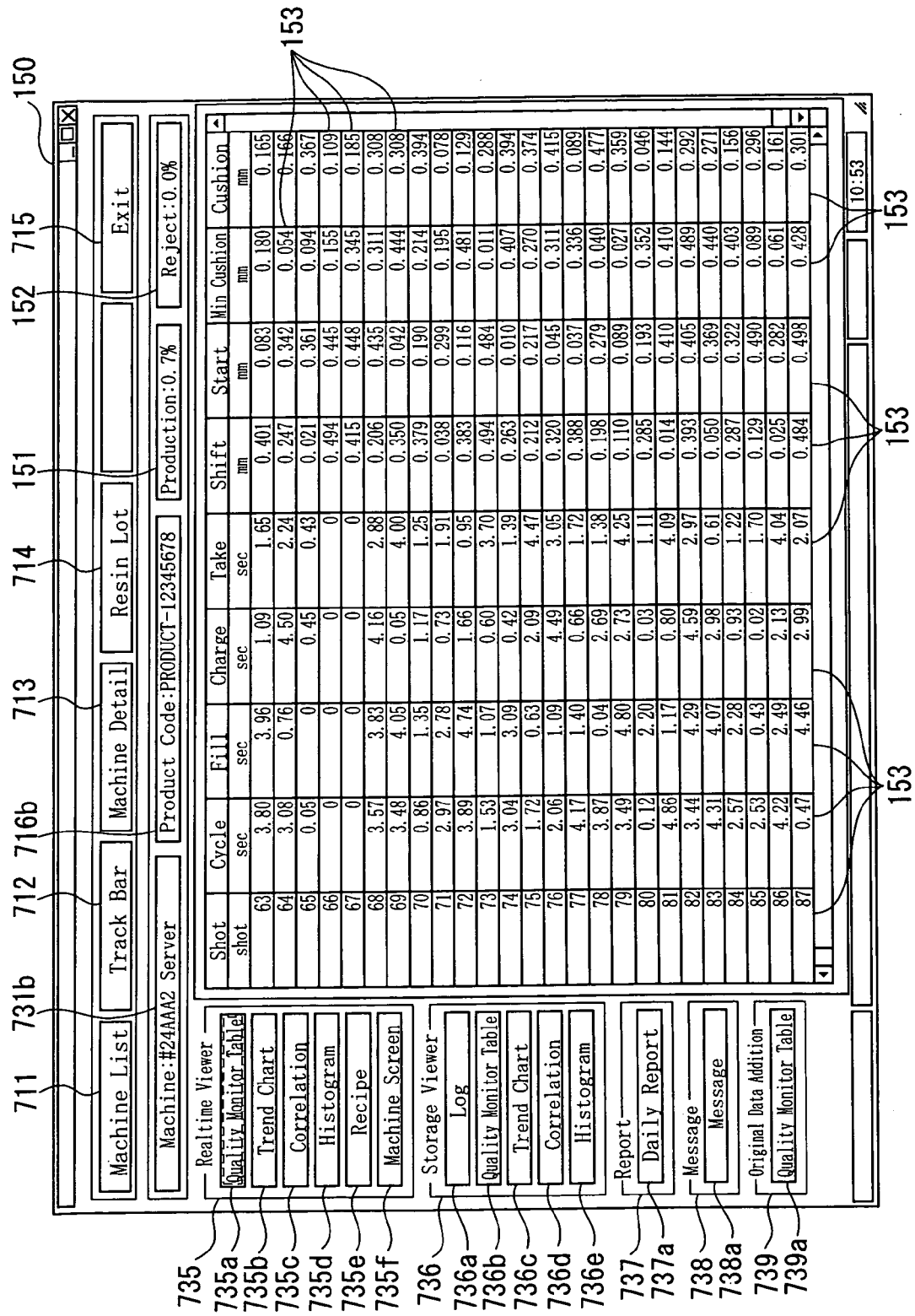
FIG. 9 is a conceptual diagram showing a quality monitor table display screen image displayed on the screen by means of the Web browser according to the embodiment.

On the quality monitor table display screen 150 shown in FIG. 9 are provided the command buttons 711, 712, 713, 714, 715, 717 as with the machine list display screen 710, the group display screen 720, and the machine detail display screen 730 described above. On the quality monitor table display screen 150 are further provided the command buttons 735 *a*~735*f*, 736*a*~736*e*, 737*a*, 738*a*, 739*a* as with the machine details display screen 730.

On the quality monitor table display screen 150 are further provided a text box 731*b* for displaying the same name of a machine as that displayed on the machine details display screen 730: a text box 716*b* for displaying the same product code as that displayed on the machine details display screen 730; a text box 151 for displaying a production achievement ratio displayed in the form of numerical value in the proximity of the progress bar 716*e* on the machine details display screen 730, and a text box 152 for displaying a defective ratio displayed in the form of numerical value in the proximity of the progress bar 732*i* on the machine details display screen 730.

On the quality monitor table display screen 150 is further provided a plurality of cells 153 for displaying in the form of numerical value information for each item as described above acquired as the operating state information in every shot by the operation of the injection-molding machine 300, with, for example, the CSV (Comma Separated Value) format which is a data format delimiting with comma. The operating state information in every shot displayed in this FIG. 9 is stored as one record in the center storage section 501b or the server storage section 601b.

Figure 10:
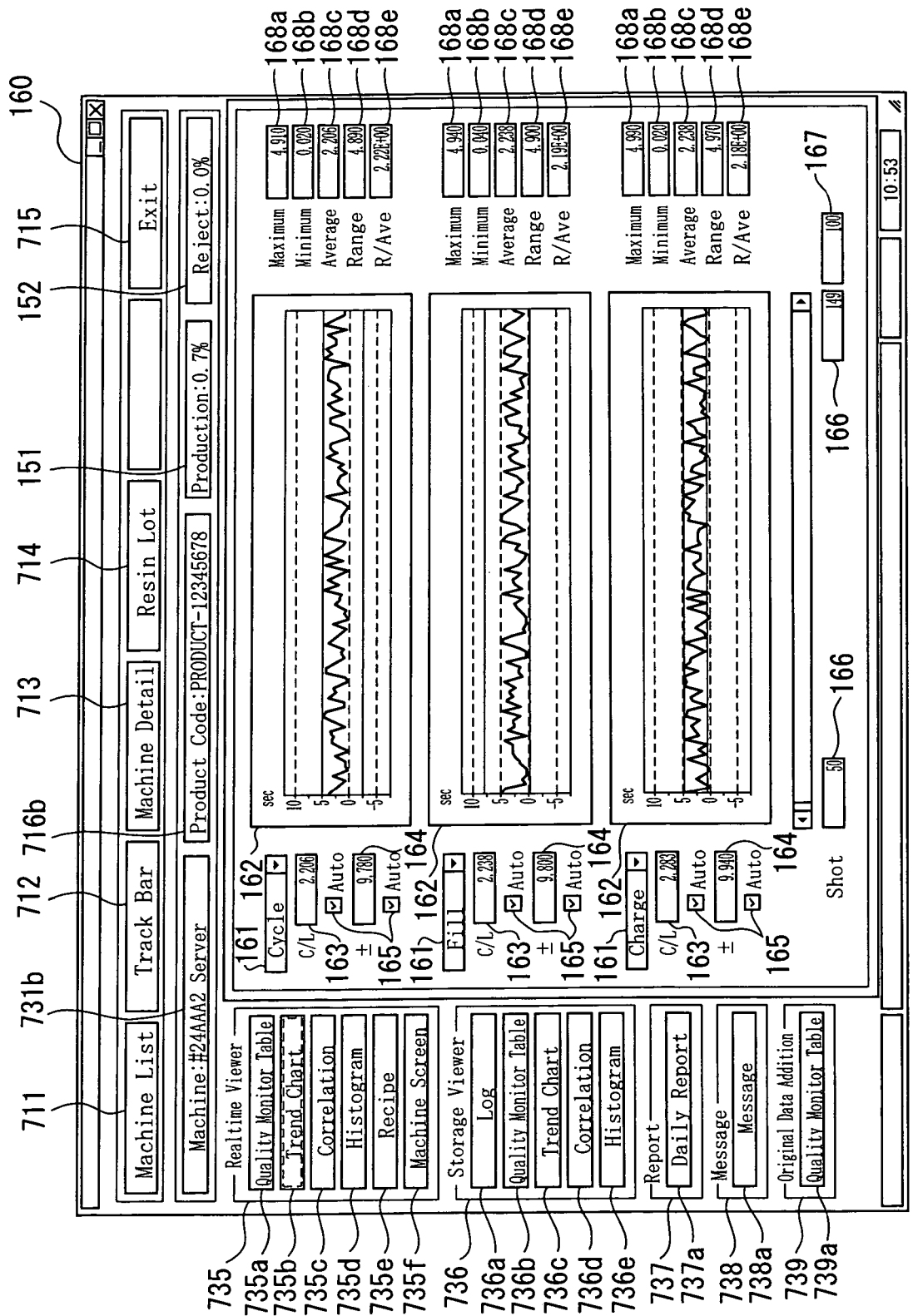
FIG. 10 is a conceptual diagram showing a trend chart display screen image displayed on the screen by means of the Web browser according to the embodiment.
Figure 11:
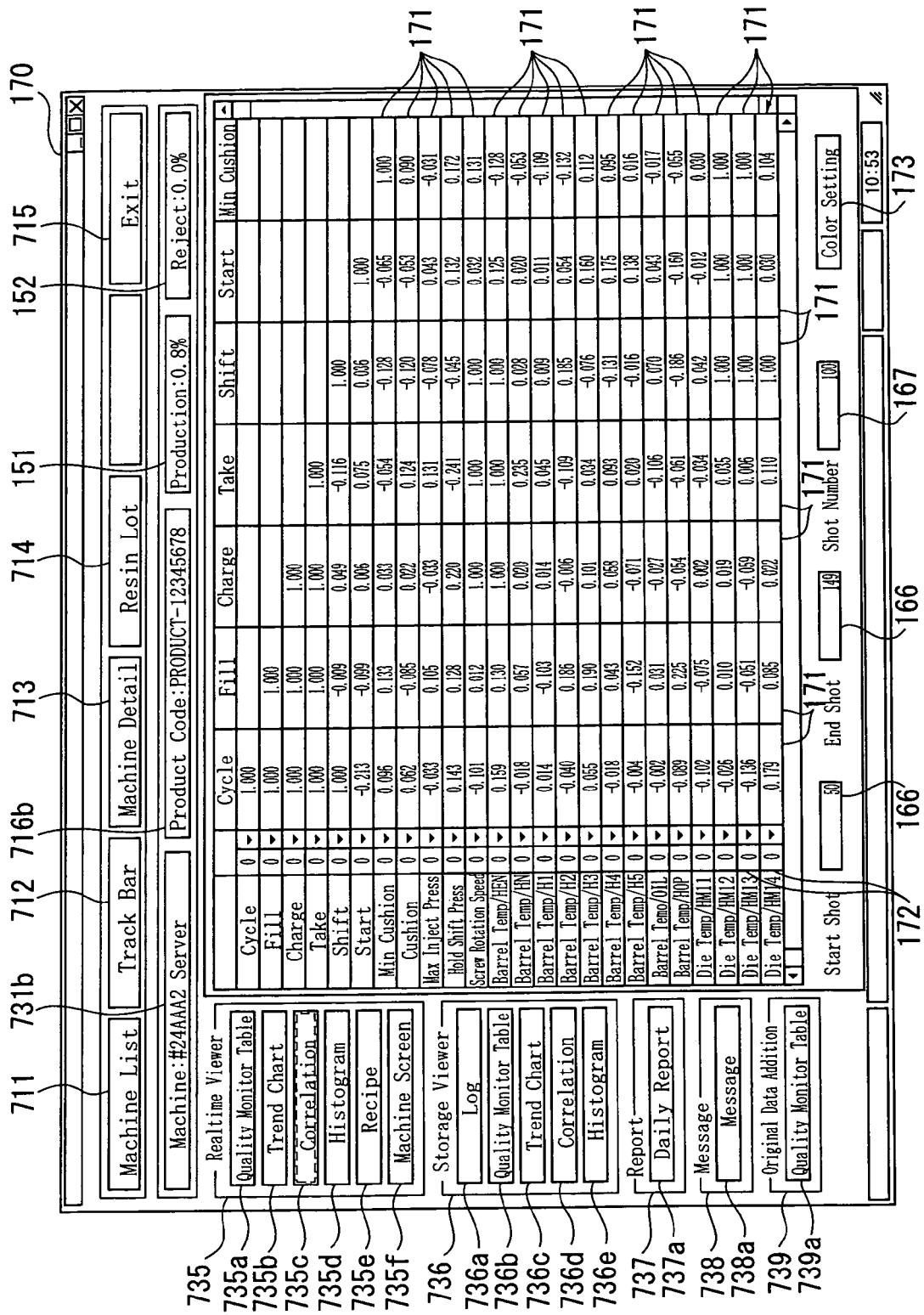
FIG. 11 is a conceptual diagram showing a correlation coefficient display screen image displayed on the screen by means of the Web browser according to the embodiment.

On the trend chart display screen 160 shown in FIG. 10 are provided the command buttons 711~715, 735a~735f, 736a~736e, 737a, 738a, 739a and the text boxes 731b, 716b, 151, 152 as with the quality monitor table display screen 150 described above.

On the trend chart display screen 160 is further provided a plurality of list boxes 161, for example, three list boxes easy to take a look for checking, for selecting the item whose distribution of a change in the state over time is computed by the data computing section 540 concerning any of the items included in the operating state information displayed on the quality monitor table display screen 150. On the trend chart display screen 160 is further provided a graph display area 162 for displaying, for example, with a line graph the change in each shot over time concerning the item in the operating state information selected in the list box 161. On the trend chart display screen 160 are further provided a text box 163 for setting a reference value which is a center line displayed in the graph display area 162 and a text box 164 for setting an acceptable value for displaying. On the trend chart display screen 160 is further provided a text box 165 for setting a display form of the graph having its display range twice as wide as a fluctuation band of the value set in these text boxes described above as an average value. Namely, through manual operation of checking these check boxes, the graph display area 162 is automatically displayed in the display form having a display range twice as wide as the amplitude (fluctuation band).

On the trend chart display screen 160 are further provided a text box 166 for setting a range of the number of shots displayed in the graph display area 162, namely, from which shot to which shot of the item in the operating state information are to be displayed; and a text box 167 for displaying the number of shots displayed in the range of the shots. On the trend chart display screen 160 are further provided text boxes 168a, 168b, 168c, 168d, 168e, each for displaying a maximum value, a minimum value, an average value, a range from the minimum value to the maximum value indicating a fluctuation band, and a value dividing the fluctuation band indicating a distribution by the average value respectively in each item.

On the relative coefficient display screen 170 are provided the command buttons 711~715, 735a~735f, 736a~736e, 737a, 738a, 739a and the text boxes 731b, 716b, 151, 152 as with the quality monitor table display screen 150 and the trend chart display screen 160 described above.

On the relative coefficient display screen 170 is further provided a plurality of cells 171 for displaying a relative coefficient which is a correlation computed by the relative coefficient computing section 542 between any of two items in each item in the operating state information displayed on the quality monitor table display screen 150 with, for example, the CSV format. On the relative coefficient display screen 170 is further provided a list box 172 for setting the data in the item for computing a relative coefficient to the number of the last shot. Namely, the list box 172 lists "0" and "−1" and displays on the cell 171a relative coefficient computed from the data in which the number of the same shot is used in the case of "0" and in which the number of last shot is used in the case of "−1". On the relative coefficient display screen 170 are further provided a text box 166 for setting a range of the number of shots as with the trend chart display screen 160; and a text box 167 for displaying the number of shots.

Figure 18:
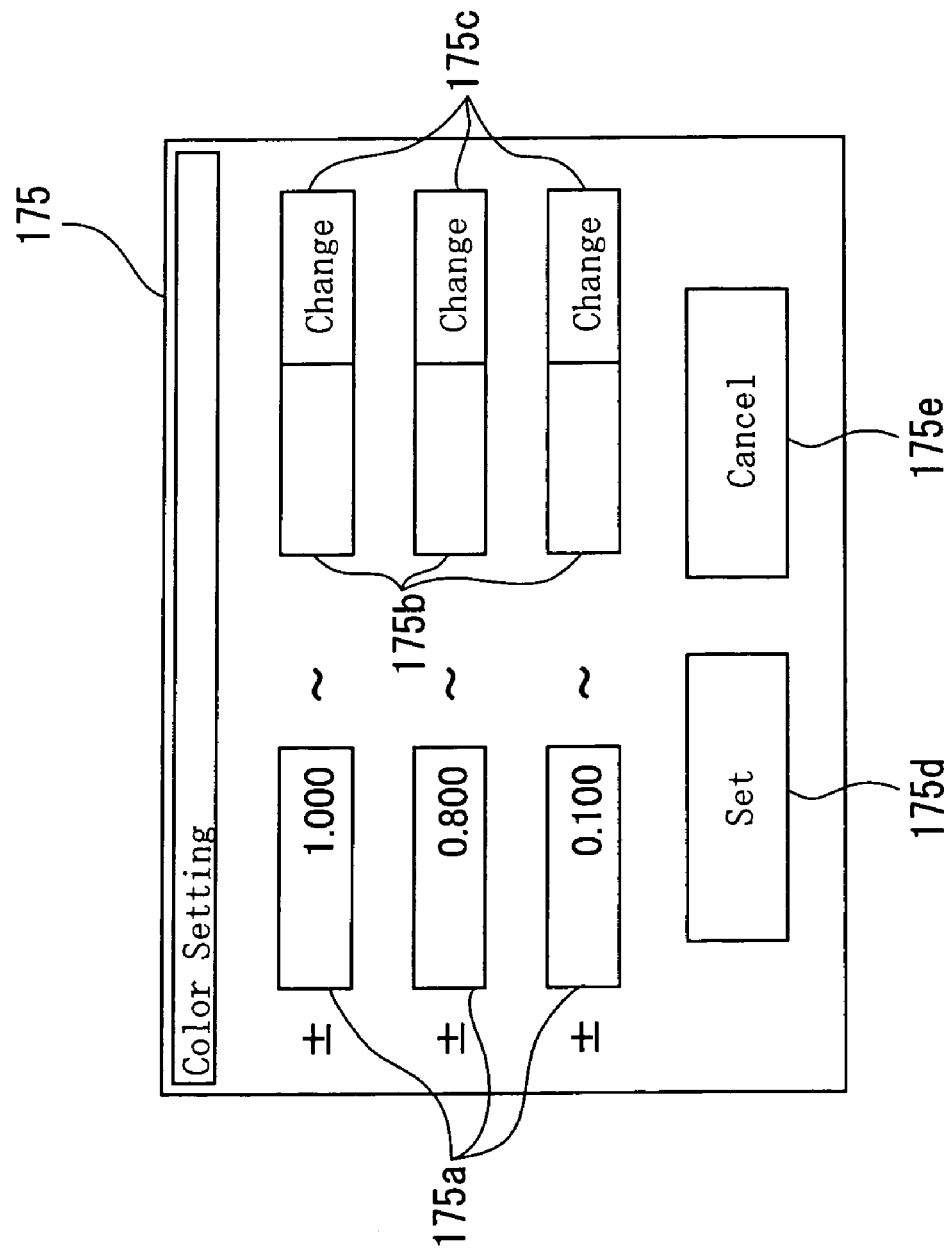
FIG. 18 is a conceptual diagram showing a displaying color setting display screen image displayed on the screen by means of the Web browser according to the embodiment.

On the relative coefficient display screen 170 is further provided a display color setting command button 173 for setting the background color of a cell. With the display color setting command button 173 through manual operation the display color setting display screen 175 is displayed in the form of screen display by means of Web browser shown in FIG. 18. On the display color setting display screen 175 are respectively provided a plurality of each set, for example, a set for three colors of; a text box 175a for setting a range of the relative coefficient displayed on the cell 171, a color display window 175b for displaying a color corresponding to each text box 175a, and a command button 175c for changing a color displayed on the color display window 175b. On the display color setting display screen 175 are further provided a command button 175d for setting the color manually operated and a command button 175e for canceling the manual operation.

Figure 19:
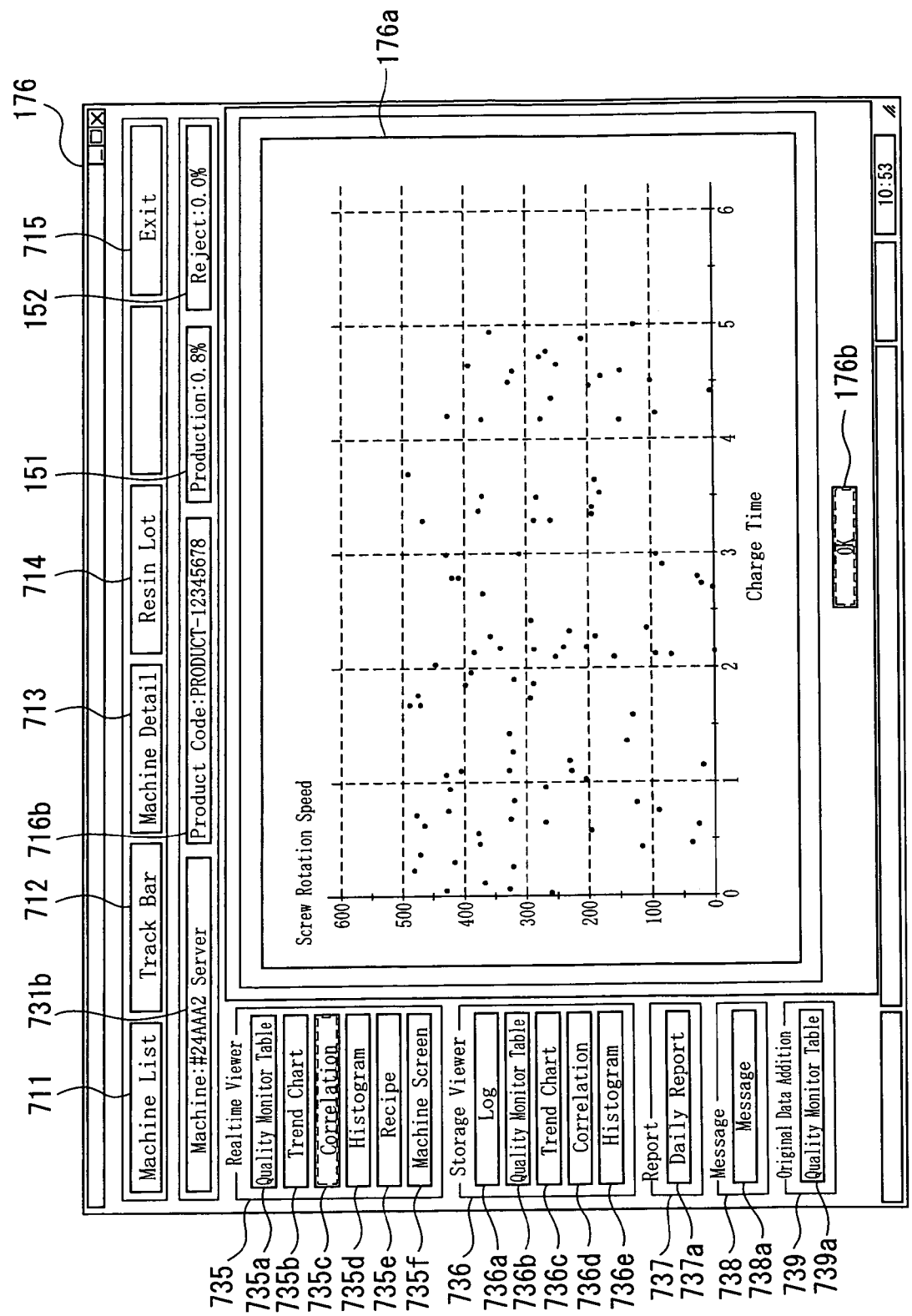
FIG. 19 is a conceptual diagram showing a correlation coefficient graph display screen image displayed on the screen by means of the Web browser according to the embodiment.

With the cell 171 on the relative coefficient display screen 170 through manual operation, for example, the manual operation in which a cursor is moved to and clocked on a prespecified cell, the relative coefficient graph display screen 176 displayed in the form of screen display by means of Web browser shown in FIG. 19 displaying the relative coefficient with a graph is displayed. On this relative coefficient graph display screen 176 are provided the command buttons 711~715, 735a~735f, 736a~736e, 737a, 738a, 739a and the text boxes 731b, 716b, 151, 152 described above. On the relative coefficient graph display screen 176 is further provided a graph area 176a for dot-displaying each relative coefficient. On the relative coefficient graph display screen 176 is further provided a command button 176 for turning back a display to the relative coefficient display screen 170 through manual operation.

Figure 12:
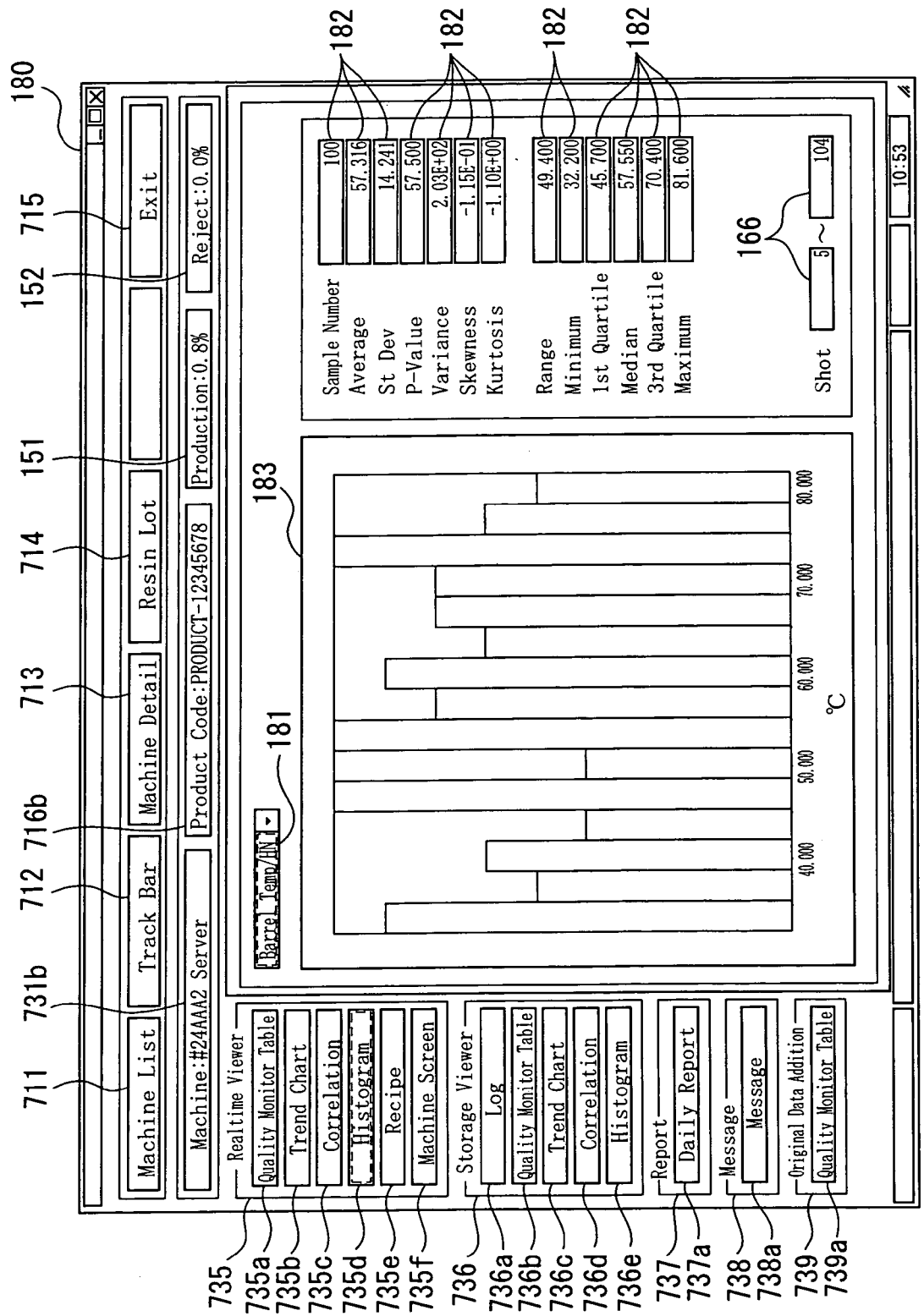
FIG. 12 is a conceptual diagram showing a distribution function display screen image displayed on the screen by means of the Web browser according to the embodiment.

On the distribution function display screen 180 shown in FIG. 12 are provided the command buttons 711~715, 735a~735f, 736a~736e, 737a, 738a, 739a and the text boxes 731b, 716b, 151, 152 described above. On the distribution function display screen 180 is further provided a list box 181 for setting any of the items to be computed the distribution function in the operating state information by the distribution function computing section 543. On the distribution function display screen 180 is further provided a text box 166 for displaying a range of the number of shots to be computed as with the trend chart display screen 160 and the relative coefficient display screen 170 described above.

On the distribution function display screen 180 are further provided text boxes for displaying the number of samples, namely, the number of shots in the range set in the text box 166; an average value computed by the distribution function computing section 543 described above; a standard deviation; a mode value; a dispersion value; a distortion degree; a kurtosis; a range of data value; the minimum value; a QI value; a median; a Q3 value; and the maximum value. On the distribution function display screen 180 is further provided a graph display area 183 for displaying the computed distribution in the form of a bar graph.

Figure 13:
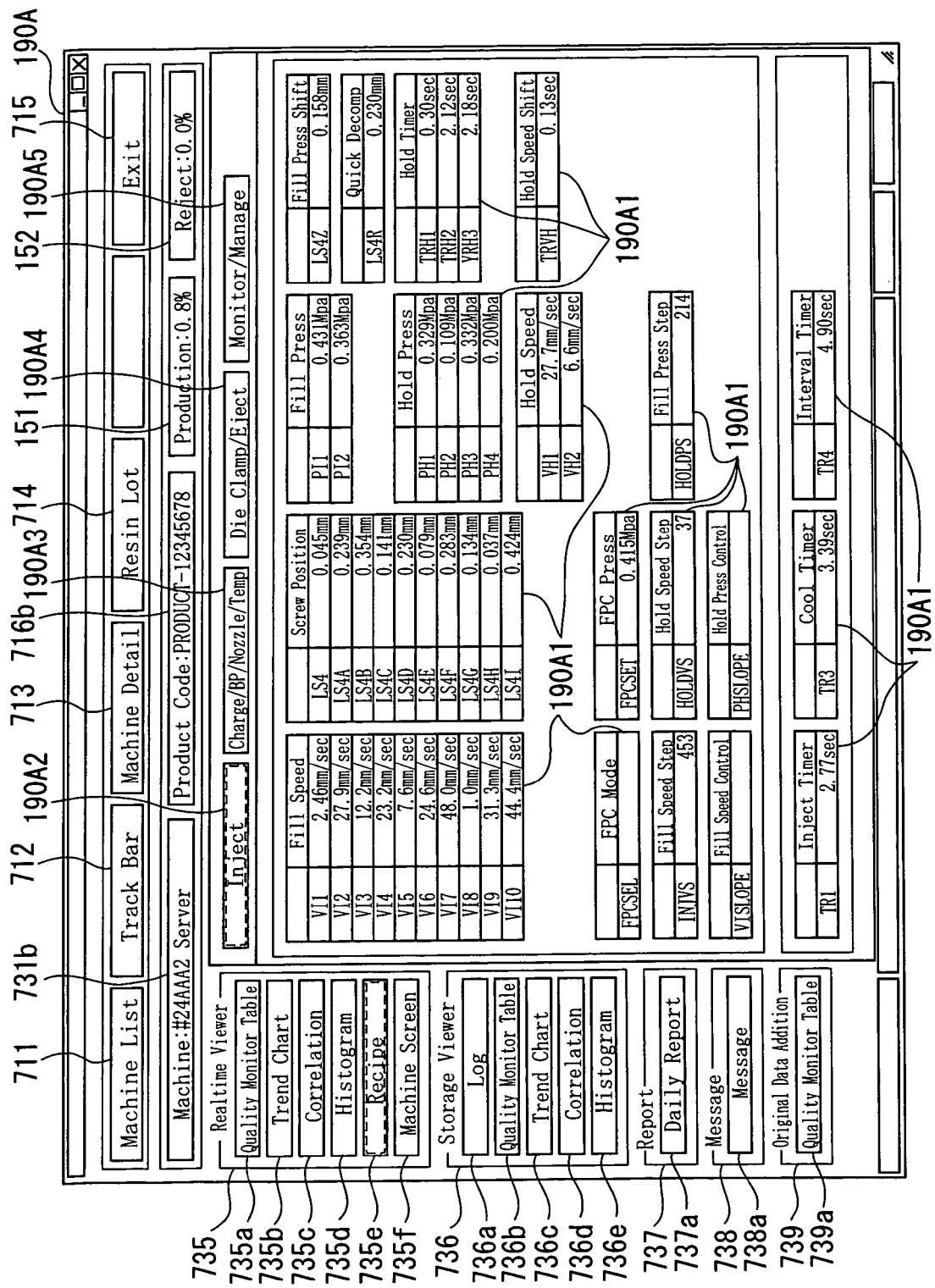
FIG. 13 is a conceptual diagram showing an injection molding condition display screen image displayed on the screen by means of the Web browser according to the embodiment.

On the injection molding condition display screen 190A shown in FIG. 13 are provided the command buttons 711~715, 735a~735f, 736a~736e, 737a, 738a, 739a and the text boxes 731b, 716b, 151, 152 described above. On this injection molding condition display screen 190A is further provided a cell 190A1 for displaying data including the injection condition, for example, filling speed, speed switchover position and the like, based on signals outputted from various types of sensors placed in the injection-molding machine 300.

On the injection molding condition display screen 190A are further provided a command button 190A2 for displaying the injection molding condition display screen 190A and command buttons 190A3, 190A4, 190A5 for displaying various types of conditions other than the injection condition in the molding condition information.

Figure 20:
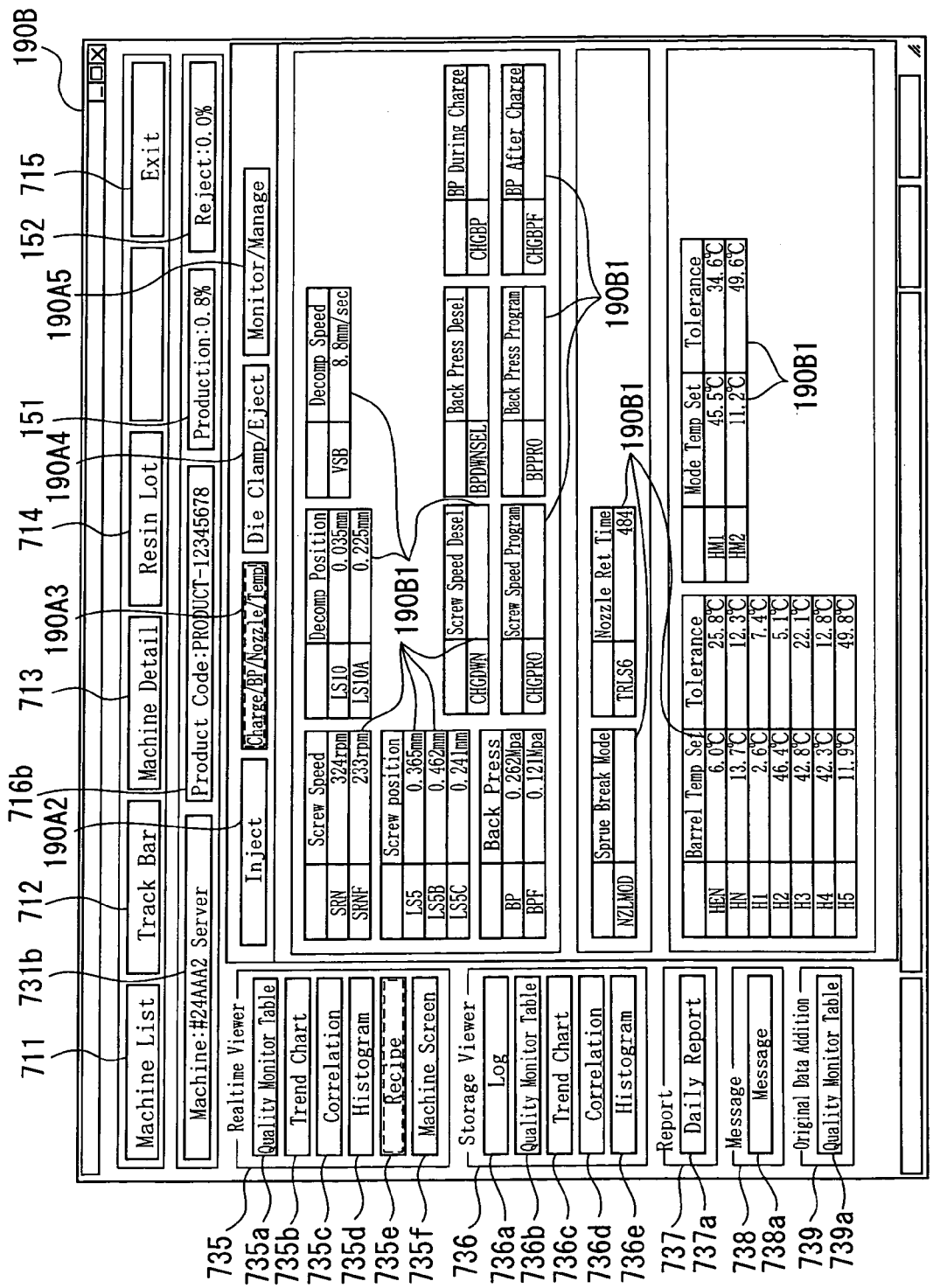
FIG. 20 is a conceptual diagram showing a measurement-and-the-like condition display screen image displayed on the screen by means of the Web browser according to the embodiment.
Figure 21:
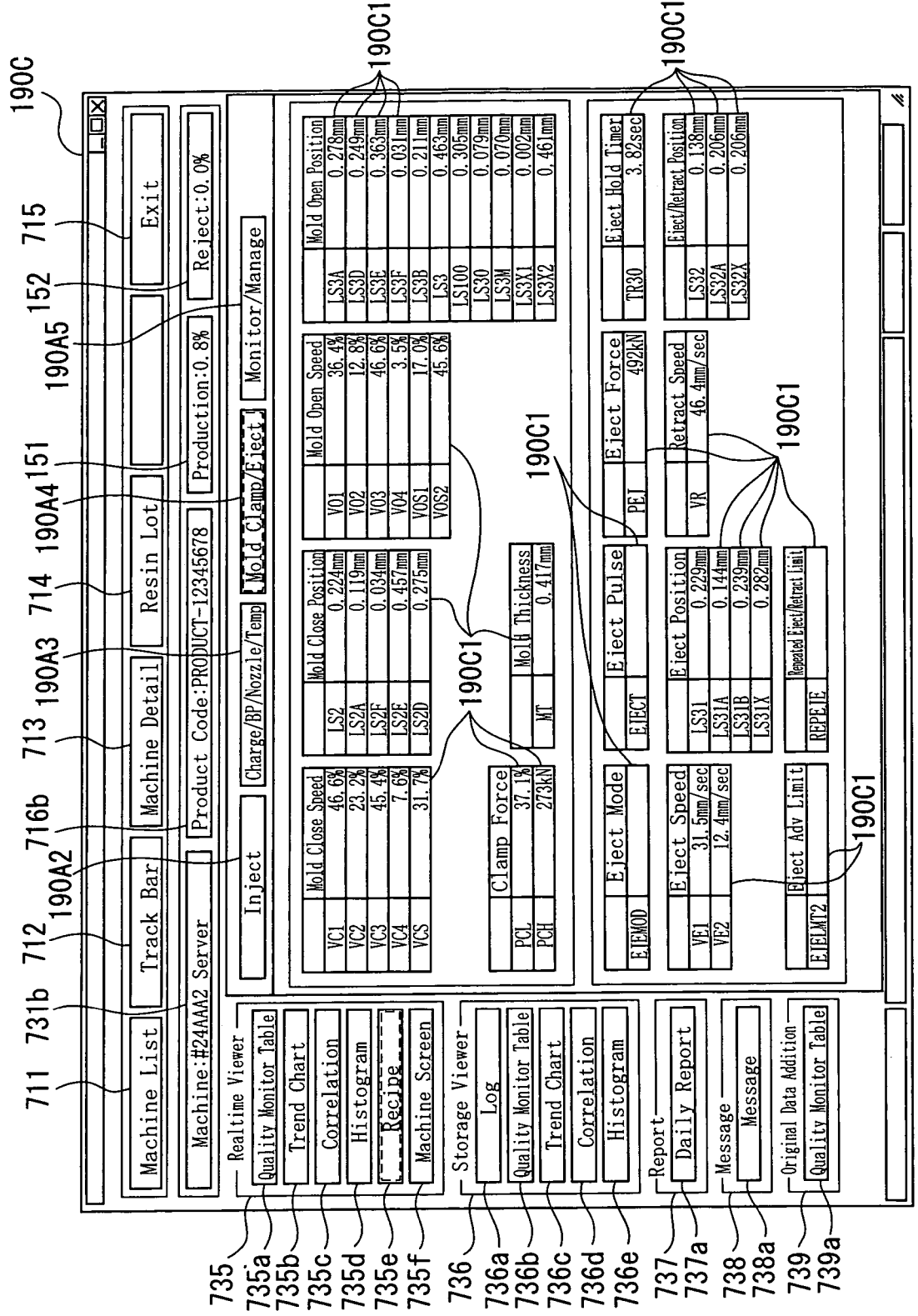
FIG. 21 is a conceptual diagram showing a type-and-the-like condition display screen image displayed on the screen by means of the Web browser according to the embodiment.
Figure 22:
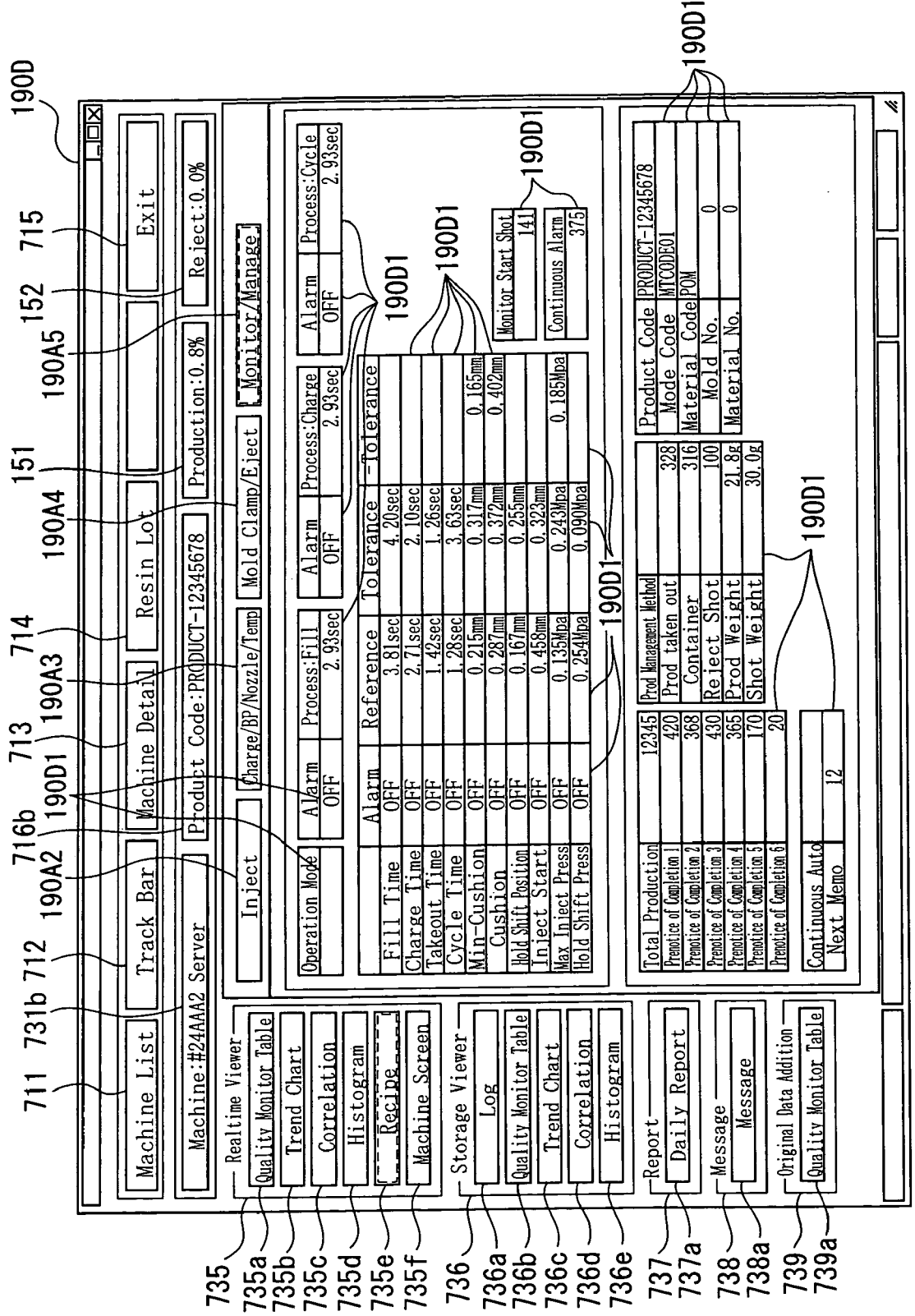
FIG. 22 is a conceptual diagram showing a monitor/management condition display screen image displayed on the screen by means of the Web browser according to the embodiment.

More specifically, with the command buttons 190A3, 190A4, 190A5 through manual operation, displays corresponding to each command button in a display form similar to that of the injection molding condition display screen 190A by means of Web browser, for example, the weighing and other conditions display screen 190B shown in FIG. 20, the type and other conditions display screen 190C shown in FIG. 21, and the monitor/management condition display screen 190D shown in FIG. 22. Namely, on these display screens 190B, 190C, 190D, are provided the command buttons 711~715, 735a~735f, 736a~736e, 737a, 738a, 739a, the text boxes 731b, 716b, 151, 152, and the command buttons 190A2~190A5 described above respectively. On the weighing and other conditions display screen 190B shown in FIG. 20 is provided a cell 190B 1 for displaying data including weighing, back pressure, nozzle, and temperature in the molding conditions information; on the type and other conditions display screen 190C shown in FIG. 21 is provided a cell 190C for displaying data including die opening/closing and extrusion, and on the monitor/management condition display screen 190D shown in FIG. 22 is provided a cell 190D1 for displaying, for example, various types of data concerning setting of alarm operation, reference values and acceptable values in the molding condition information as well as concerning production.

Figure 14:
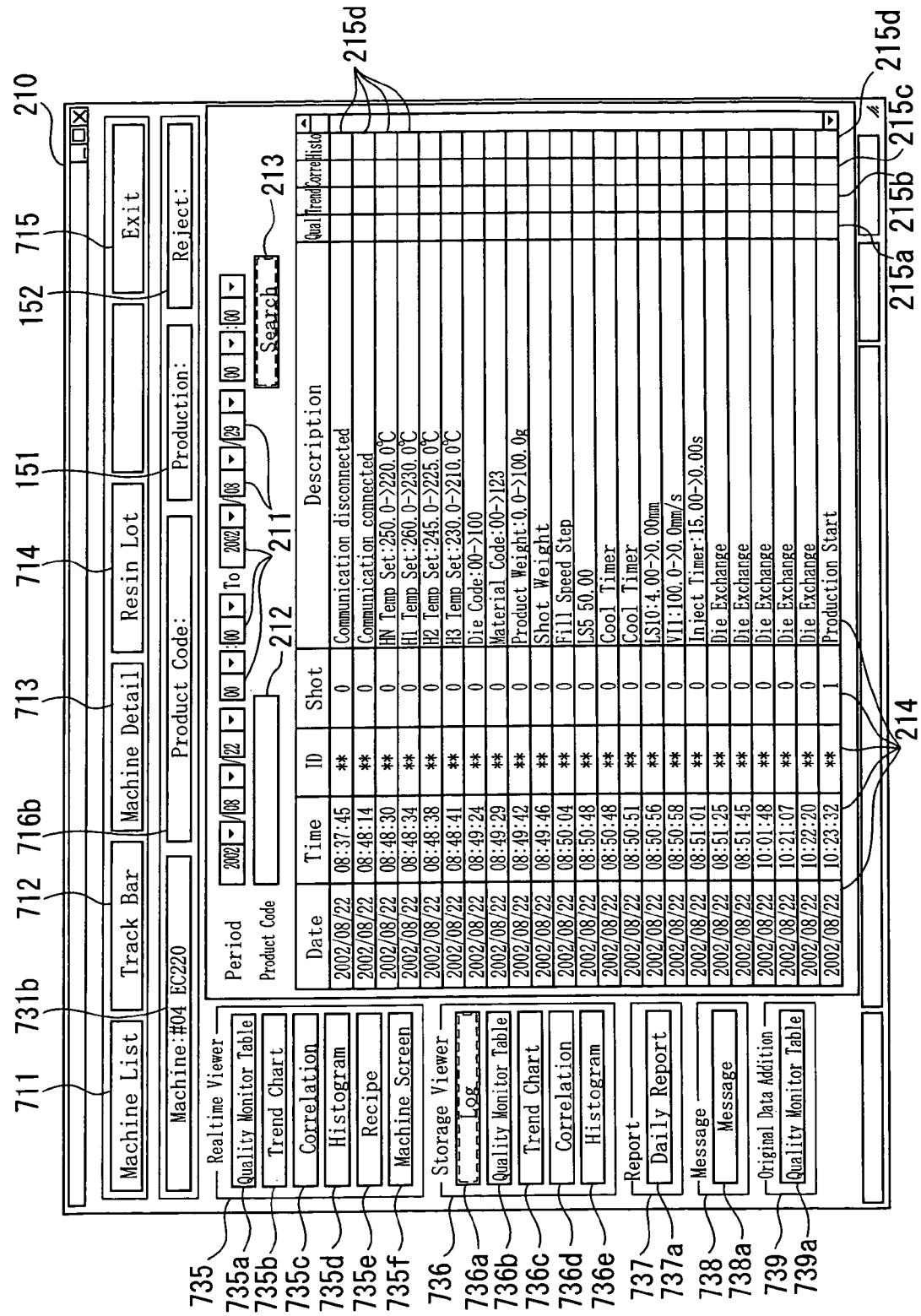
FIG. 14 is a conceptual diagram showing a log information display screen image displayed on the screen by means of the Web browser according to the embodiment.

On the log display screen 210 shown in FIG. 14 are provided the command buttons 711~715, 735a~735f, 736a~736e, 737a, 738a, 739a, and the text boxes 731b, 716b, 151, 152 described above. On the log display screen 210 are further provided a list box 211 for setting a period of time concerning the accumulated data; a text box 212 for setting the product code; and a command button 213 for executing retrieval processing of data matching these conditions.

On the log display screen 210 is further provided a plurality of cells 214 for listing the retrieved data. These cells 214 can display a plurality of background colors. Background color is used for grouping characteristics of the data to be listed to display data in different colors, for example, data concerning a setting record by blue, that concerning a stopping record by red, that concerning an alarm record by yellow, that concerning a start or completion of production by green, that concerning a trial operation by light blue, that concerning replacement of the feedstock 360 by purple, and that concerning connection/disconnection of the present production management supporting system by gray. On the log display screen 210 is further provided a plurality of display switching buttons 215a, 215b, 215c, 215d, corresponding to the data described above for displaying detailed data concerning each of the data described above. These display switching buttons 215a, 215b, 215c, 215d, function in a similar way to, for example, the command buttons 736b, 736c, 736d, 736e, and with the display switching buttons 215a, 215b, 215c, 215d, through manual operation, a display screen not shown for displaying the quality monitor table data of the accumulated data for a prespecified period of time. a display screen not shown for displaying the trend chart display of the accumulated data for a prespecified period of time, a display screen not shown for displaying the relative coefficient of the accumulated data for a prespecified period of time, and a display screen not shown for displaying the distribution function of the accumulated data for a prespecified period of time described above are displayed respectively.

Figure 15:
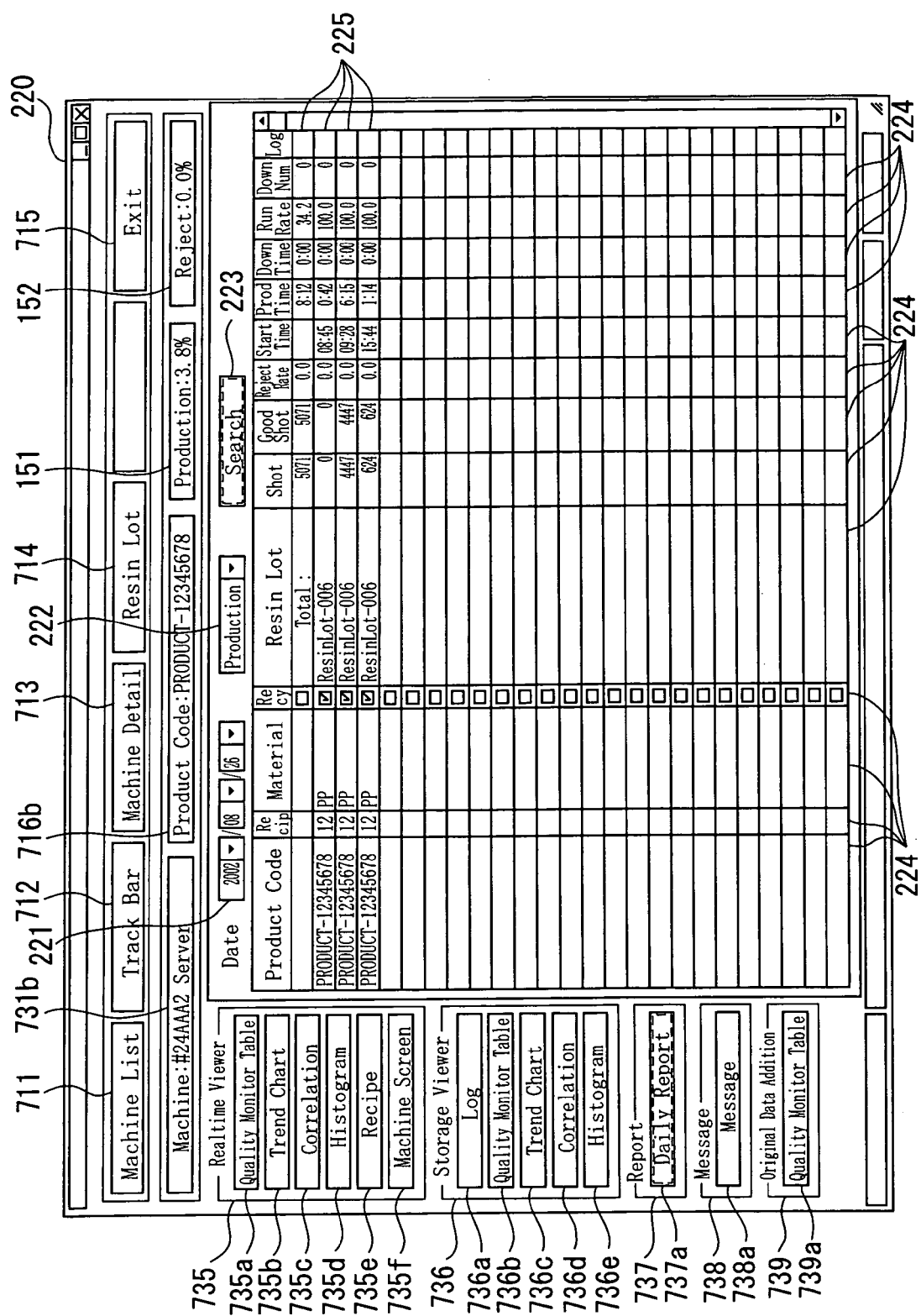
FIG. 15 is a conceptual diagram showing a daily report display screen image displayed on the screen by means of the Web browser according to the embodiment.

On the daily report display screen 220 shown in FIG. 15 are provided the command buttons 711~715, 735a~735f, 736a~736e, 737a, 738a, 739a, and the text boxes 731b, 716b, 151, 152 described above. On the daily report display screen 220 are further provided a list box 221 for setting a prespecified date in the accumulated operating data information concerning the manufactured products, a list box 222 for selecting whether the data indicates the production being going on or that having been carried out in the past, a command button 223 for having retrieval processing of data matching the conditions selected with these list boxes 221, 222, executed.

On the daily report display screen 220 is further provided a plurality of list boxes for listing the retrieved data. More specifically, in the product code information are listed patterns of injection-molding conditions, quality of the feedstock 360, whether the reclaimed feedstock is used or not, the lot of the feedstock 360, and data concerning various types of production as one record. On the daily report display screen 220 are further provided display switching buttons each for displaying log information concerning each listed record, namely, the log information display screen 210. On this log information display screen 210 are displayed date generated in the production of the listed production code.

Figure 16:
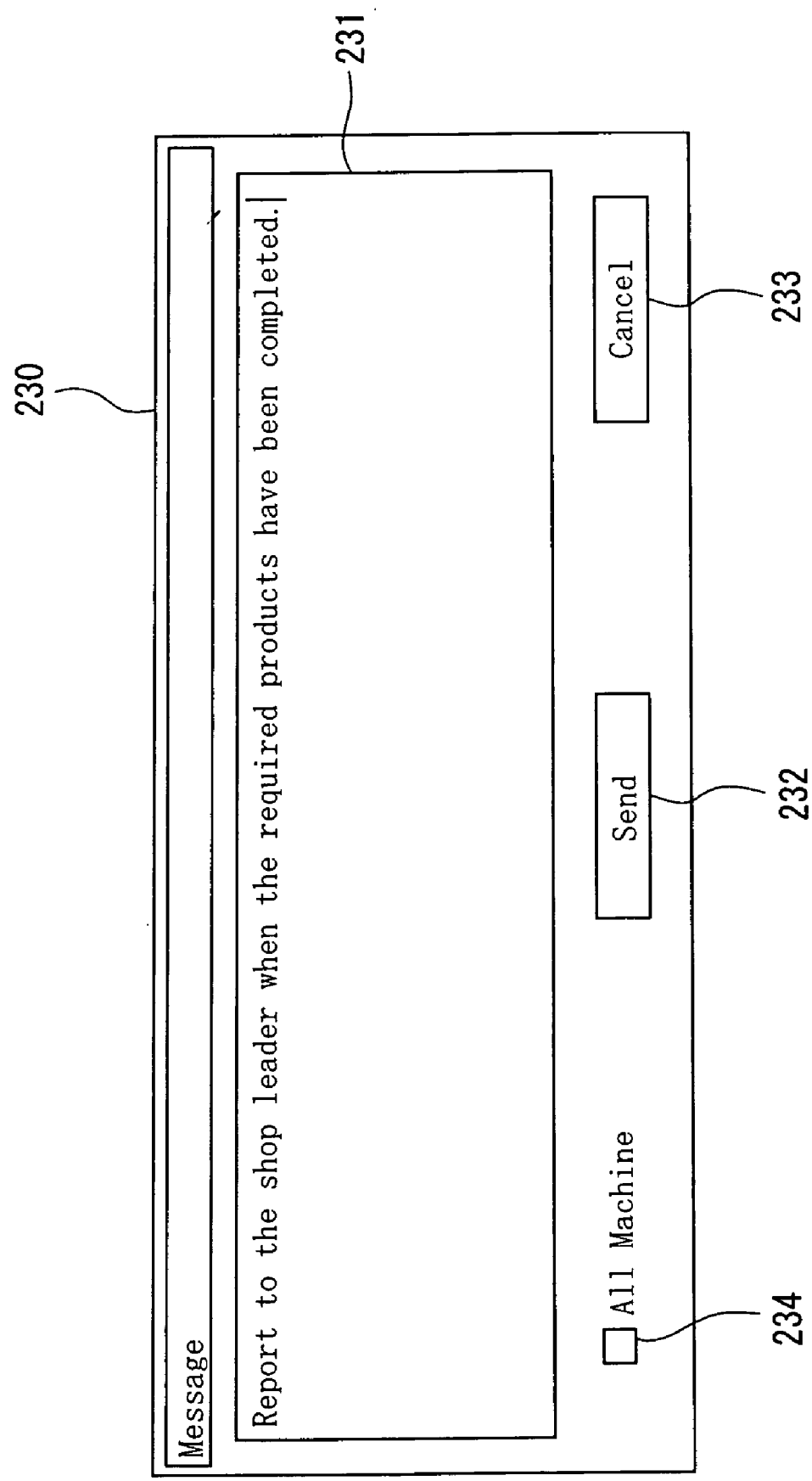
FIG. 16 is a conceptual diagram showing a message display screen image displayed on the screen by means of the Web browser according to the embodiment.

On the message display screen 230 shown in FIG. 16 are provided an input area 231 for entering a message delivered by the controlling terminal device 400, for example, in the text format; a command button 232 for executing process to send to the prespecified controlling terminal device 400 the message information which is character data entered in this input area 231; and a command button 233 for cancellation. As for delivering a message, a case where the message is displayed, for example, with the controlling terminal display section 420 is described above, however, a case where the message is transmitted by voice and sounds is applicable. On the message display screen 230 is further provided a check box for setting to send character data to each controlling terminal device 400.

Figure 17:
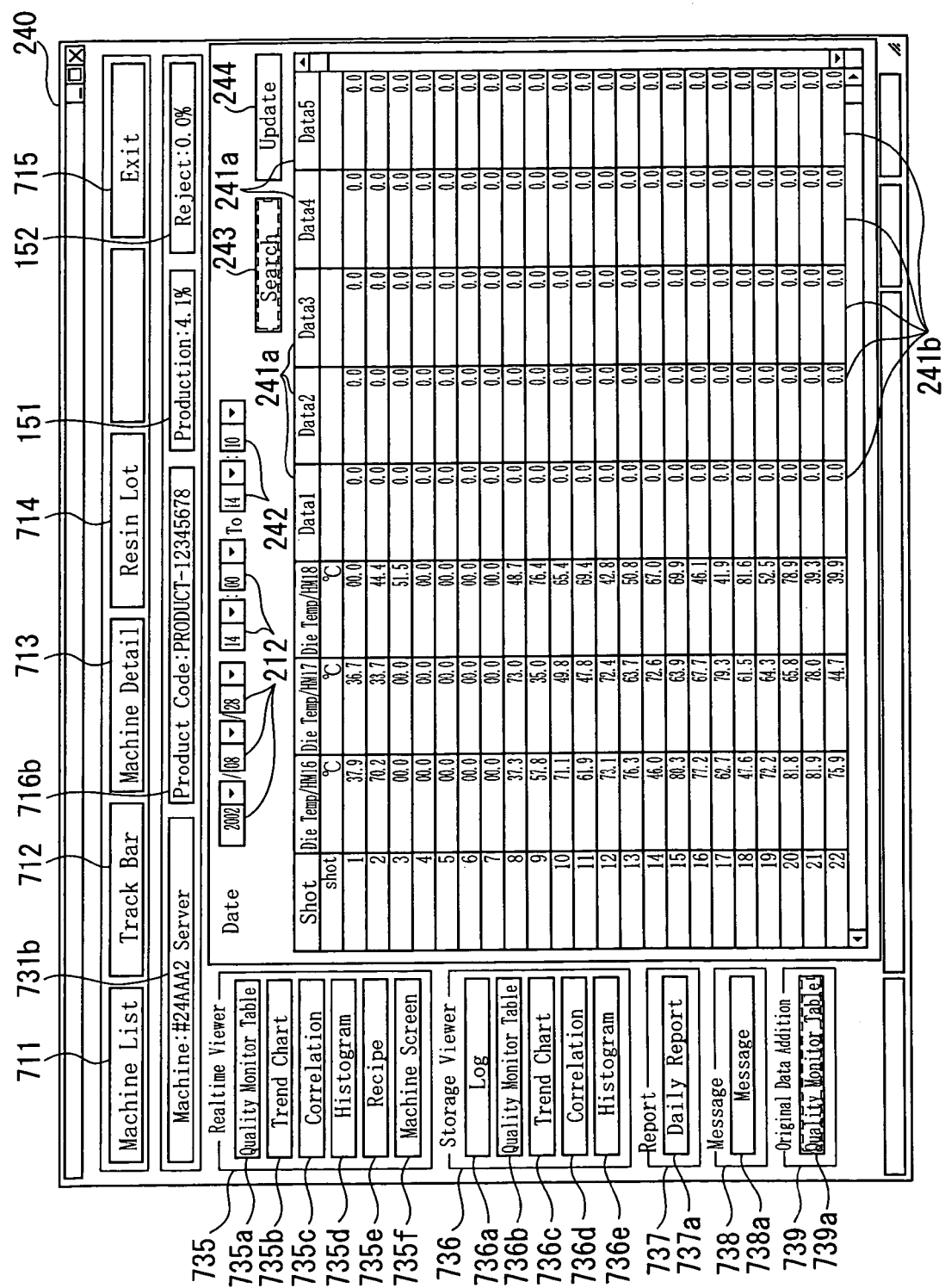
FIG. 17 is a conceptual diagram showing an original data display screen image displayed on the screen by means of the Web browser according to the embodiment.

On the original data display screen 240 shown in FIG. 17 are provided the command buttons 711~715, 735a~735f, 736a~736e, 727a, 728a, 729a, and the text boxes 731b, 716b, 151, 152 described above.

On the original data display screen 240 is further provided a plurality of cells 241b for displaying original data concerning a specially set item 241a. This FIG. 17 shows an example illustrating the display form similar to that on the quality monitor table display screen 150 together with the original data as well as the operating state information. On the original data display screen 240 are further provided a list box 242 for setting the period of time of data displayed on a cell 241b; a command button 243 for having retrieval processing of data for the period of time set in this list box 242 executed; and a command button 244 for executing updating such as, for example, updating and displaying the newly-added item 241.

Figure 23:
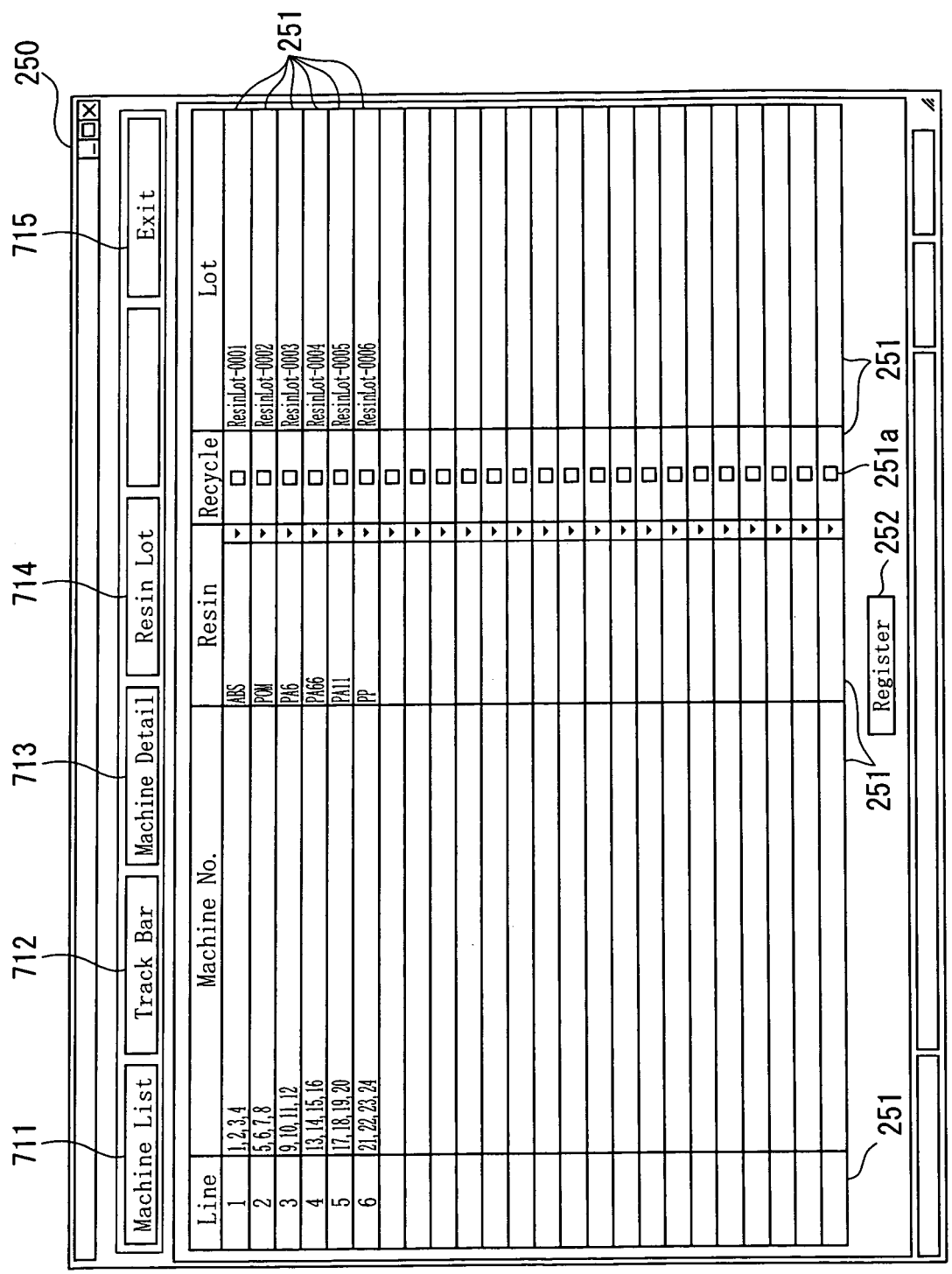
FIG. 23 is a conceptual diagram showing a resin lot display screen image displayed on the screen by means of the Web browser according to the embodiment.

In the meantime, on a resin lot display screen for displaying information concerning the feedstock 360 by the feedstock information display screen 552 through manual operation of the command button 714, for example, on the resin lot display screen 250 displayed in the screen display form by means of Web browser shown in FIG. 23 are provided the command buttons 711~715 described above. On the resin lot display screen 250 are further provided a plurality of cells 251 for displaying data such as line numbers of machines supplied the same feedstock 360, serial numbers of the machines, quality of the feedstock 360, whether the reclaimed feedstock is used or not, lot numbers of the feedstock 360, or the like. On the cell for indicating whether the reclaimed feedstock is used or not is provided a check box 251. On the resin lot display screen 250 is further provided a command button 252 for setting the data in a row(s) of the cell set necessary items and listed, as one record.

In the present embodiment, the injection condition includes, for example, filling speed, speed switchover position, injection pressure, dwell pressure, dwell speed, pressure switchover position, dwell switchover correction quantity, pressure switchover time, speed switchover time, number of row for filling speed, number of row for dwell speed, number of row for filling pressure, speed control means, dwell control means, injection timer, cooling timer, and intermediate timer. The weighing and injection condition includes, for example, data such as weighing, back pressure, nozzle, and temperature in the molding conditions information, namely, screw rotational speed, suck back position, suck back speed, weighing position, back pressure, nozzle operation, nozzle backdown time, barrel temperature, die temperature, and alarm setting temperature. The die operation includes, for example, data such as die opening/closing and extrusion in the molding condition information, namely, mold closing speed, mold closing position, mold opening speed, mold opening position, mold tightening force, mold thickness, pressing mode, number of times of extrusion, extrusion force, extrusion retention timer, extrusion speed, extrusion position, extrusion return rate, extrusion return position, extrusion push-in limit, and repetitive extrusion push-out limit. The monitor information includes, for example, operation mode and filling time limit value, along with the setting conditions for the controlling terminal device 400 and various data concerning setting of alarm operation, reference values and acceptable values in the molding condition information as well as concerning production.

(Machine Screen Displaying Screen)

Next the machine screen displaying screen 740 and other operational screens relating to this screen are described below.

Provided on the machine screen displaying screen 740 shown in FIG. 24 are command buttons 711, 712, 713, 714, 715, and 717 like in the machine list displaying screen 710, group displaying screen 720, and machine detail displaying screen 730. Further provided on the machine screen displaying screen 740 are command buttons 735a to 735f, 736a to 736e, 727a, 728a, and 739a like those in the machine detail displaying screen 730.

Further a screen displaying area 741, on which the screen display displayed on the controlling terminal displaying section 420 of the controlling terminal device 400 is displayed as it is, is provided on the machine screen displaying screen 740. Image data acquired from the controlling terminal displaying section 420 is displayed on this displaying area 741. It is to be noted that, as this image data, for instance the data having the same format as that of the image data used when printing the displaying screen by operating button 741a for screen copying as shown in the screen displaying area 741 is displayed in response to an operation of the touch panel of the controlling terminal device 400. Further a list box 742 used for selecting image data to be displayed on the screen displaying area 741 and a command button 743 used for setting the item selected in this list box 742 are provided on the machine screen displaying screen 740.

Provided on the lifetime list displaying screen 750 for replacement parts shown in FIG. 25 are command buttons 711, 712, 713, 714, 715, 716 like those provided on the machine list displaying screen 710 described above. Further provided on the lifetime list displaying screen 750 are a plurality (for instance, a number corresponding to that of the machine list displaying screens 710) of screens 716a each displayed with, for instance, "Machine #01", which is machine-specific information like the screen 716a of the section 716 of the machine list displaying screen 710 shown in FIG. 6. With an input operation with the screen 716a of this lifetime list displaying screen 750, a lifetime list detail display screen 760 shown in FIG. 26 and described later is displayed thereon.

Further provided on the lifetime list displaying screen 750 are a plurality of text boxes 751, for instance, for heaters, contactors, servo motors, ball screws, or the like, all of which are replacement parts, and the number corresponds to that of the screens 716a. FIG. 25 shows a case where the injection molding machine 300 comprises 4 units of heaters, 4 pieces of contactors, 3 units of servo motors, and 3 ball screws as the replacement parts. These text boxes 751 are displayed with names which are parts-specific information indicating the respective parts such as "HN" or "H1" for a heater.

A numeric value which is a result of computing a ratio of cumulative utilization of each replacement parts with the operating condition recognizing section 531 as a percentage is shown in each of these text boxes. Further displayed in each of the text boxes 751 is the percentage of cumulative utilization computed by the operating condition recognizing section 531 against the lifetime is displayed with a different display format, for instance, with a different color. For instance, a percentage less than 75 is displayed with a green color, that not less than 75 and less than 90 with a yellow color, and that not less than 90 with a red color. The screen 716a is displayed with the same display format for the text box 751 having the largest value among those of text boxes 751 for corresponding parts, namely with the same color.

Further provided command buttons 752 and 753 are provided on the lifetime list displaying screen 750. The command button 752 is for display of the order ledge displaying screen 770 for ordering replacement parts shown in FIG. 27 and described hereinafter. In response to an input operation with the command button 753, a replacement record displaying screen 780 for displaying a replacement record shown in FIG. 30 and described later is displayed.

Figure 26:
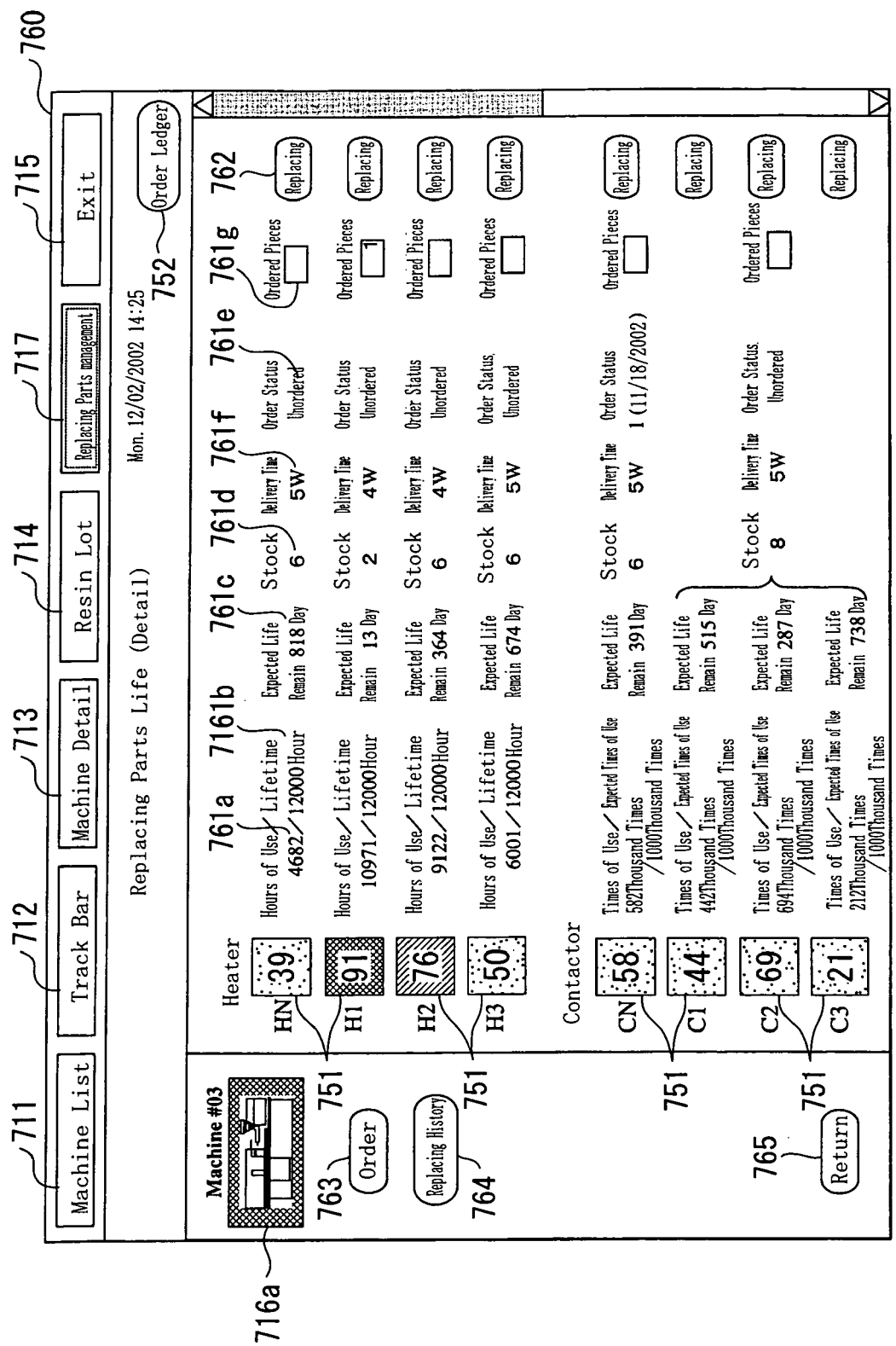
FIG. 26 is a conceptual diagram showing a lifetime list details display screen image displayed on the screen by means of the Web browser according to the embodiment.

The lifetime list detail displaying screen 760 shown in FIG. 26 is displayed in response to an input operation of the screen 716a. Provided on the lifetime list detail displaying screen are command buttons 711, 712, 713, 714, 715, and 717 like on the machine list displaying screen 710 described above. Further the screen 716a operated for input is displayed together with the text box 751 for the corresponding replacement parts on the lifetime list detail displaying screen 760.

Together with each text box 751, information concerning the cumulative utilization, stock situation, ordering situation or the like is displayed. Display of the cumulative utilization is provided, for instance, as a text box 761a displaying the cumulative utilization time or cumulative utilization times, a text box 761b displaying the lifetime previously stored as the lifetime information in the center storage section 501b, or as a text box 761c displaying a number of remaining days until the anticipated date when the lifetime expires. The display concerning the stock situation is provided, for instance, as a text box 761d indicating a number of stocks. The ordering situation is displayed, for instance, as a text box 761e showing whether an order has been placed or not, a text box 761f showing a time limit for delivery of the parts previously stored as parts information in the center storage section 501b, or a text box 761g in which a number of parts to be ordered can be set and inputted from the center terminal input section 502. Also the date and time when the order is placed can be displayed on the text box 761e. FIG. 26 shows a case where the contactors C1, C2, and C3 use the same parts.

Figure 27:
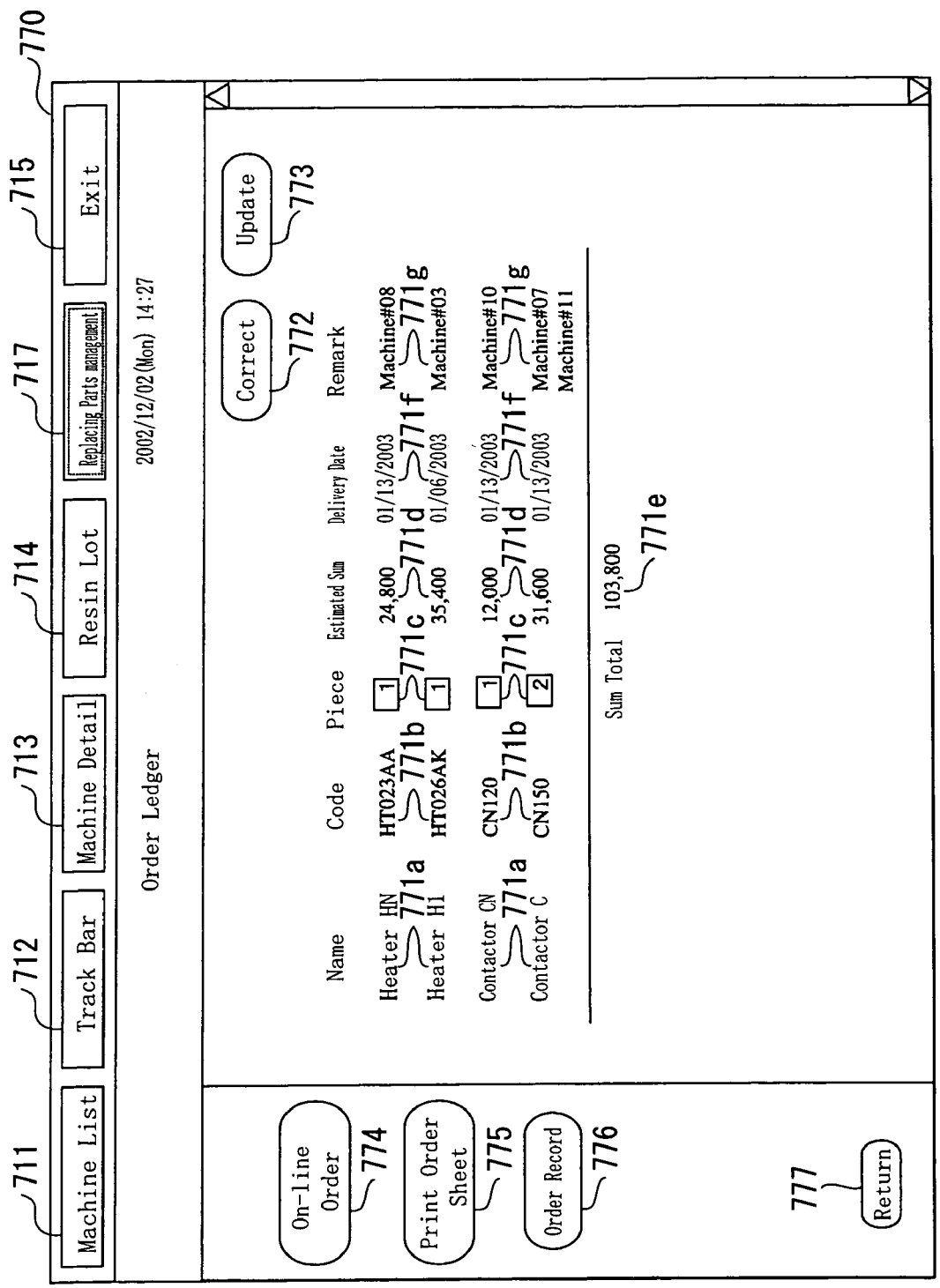
FIG. 27 is a conceptual diagram showing an order ledger display screen image displayed on the screen by means of the Web browser according to the embodiment.

Provided on the lifetime list detail displaying screen 760 is a command button 762 for displaying a replacement record data input displaying screen 800 for setting and inputting information concerning the parts replacement situation shown in FIG. 29 and described later in correspondence to each text box 751. Further provided on the lifetime list detail displaying screen 760 are, in addition to the command button 752 for the lifetime list displaying screen 750 and the command button 752 for displaying the order ledger displaying screen 770 shown in FIG. 27, a plurality of command buttons 763, 764, and 765. The command button 763 is used for placing an order for parts by the number of parts set and inputted in the text box 761g. The command button 764 is used to display a replacement record for each parts of the injection molding machine 300 shown on the lifetime list detail displaying screen 760 on a parts replacement times displaying screen 850 described later and shown in FIG. 35 in the graphic form. It is to be noted that, in response to an input operation with this command button 764, for instance, the replacement record displaying screen 780 shown in FIG. 30 may be displayed. In response to an input operation with the command button 765, this lifetime list detail displaying screen 760 is closed and the lifetime list displaying screen 750 shown in FIG. 25 is displayed. In response to an input operation with the command button 765, not only the lifetime list displaying screen 750, but also, for instance, the machine list displaying screen 710 shown in FIG. 6 or others may be displayed. The order ledger displaying screen 770 shown in FIG. 27 is displayed when an input operation is performed with the command button 752 on the lifetime list displaying screen 750 shown in FIG. 25 or the command button 752 on the lifetime list detail displaying screen 760 shown in FIG. 26. Provided on the order ledger displaying screen 770 are the command buttons 711, 712, 713, 714, 715, and 717 like on the machine list displaying screen 710 described above. Further provided on the order ledger displaying screen 770 are a plurality of text boxes 771a, 771b, 771c, 771d, 771e, 771f, and 771g each showing the ordering situation for ordered parts of each injection molding machine 300.

The text box 771a displays a name of each parts. This parts name is previously stored as parts information, for instance, in the center storage section 501b. The text box 771b displays the specifications such as forms or characteristics of parts previously stored as parts information, for instance, in the center storage section 501b. The text box 771c displays a number of parts set and inputted in the text box 761g of the lifetime list displaying screen 760 as a total of one same parts for each of the injection molding machine 300. The text box 771d displays an estimated sum of money calculated by multiplying the total number of parts displayed in the text box 761c by a unit price of the parts stored as parts information in, for instance, the center storage section 501b. The text box 761e displays an estimated sum of money by computing a total of the estimated sums of money shown in the text box 771d. The text box 771f displays a date of delivery when an ordered product is delivered computed, for instance, with the center computer section, from the current date based on the information concerning an appointed date of delivery for the ordered parts previously stored as parts information in the center storage section 501b. The text box 771g displays, for instance, "Machine #08", which is a machine-specific information for the injection molding machine 300, for which a number of ordered parts is set and inputted in the text box 761g of the lifetime list detail displaying screen 760. It is to be noted that a total of ordered replacement parts, an estimated sum of money, and a total of estimated sums of money are computed, for instance, by the data computing section 540.

Provided on the order ledger displaying screen 770 are a plurality of command buttons 772, 773, 774, and 775. In response to an input operation with the command button 772, a numerical value for a number of ordered parts displayed in the text box 771c can be changed in response to an input operation with the center terminal input section 502. In response to an input operation with the command button 773, the data set in the text box 771c is selected with the old data updated and the new data is stored in the center storage section 501. In response to an input operation with the command button 774, the processing for placing an order in the online mode is carried out according to the contents on the order ledger displaying screen 770. More specifically, the processing for transmitting a signal for placing a order for the parts to a terminal of a manufacturer of the parts is executed according to address included in information for the parts manufacturer previously stored in the center storage section 501. The command button 775 is used to execute the processing for printing an order form for the ordered parts, namely the contents displayed on the order ledger displaying screen 770 with a prespecified format stored, for instance, in the center storage section 501. The command button 776 is used to display an order record displaying screen 790 for displaying an order record showing the ordering situation of the ordered parts described below and shown in FIG. 28. In response to an input operation with the command button 777, this order ledger displaying screen 770 is closed, and for instance, the lifetime list displaying screen 750 shown in FIG. 25 is displayed. The command button 777 may be used to display not only the lifetime list displaying screen 750, but, for instance, the machine list displaying screen 710 shown in FIG. 6.

Figure 28:
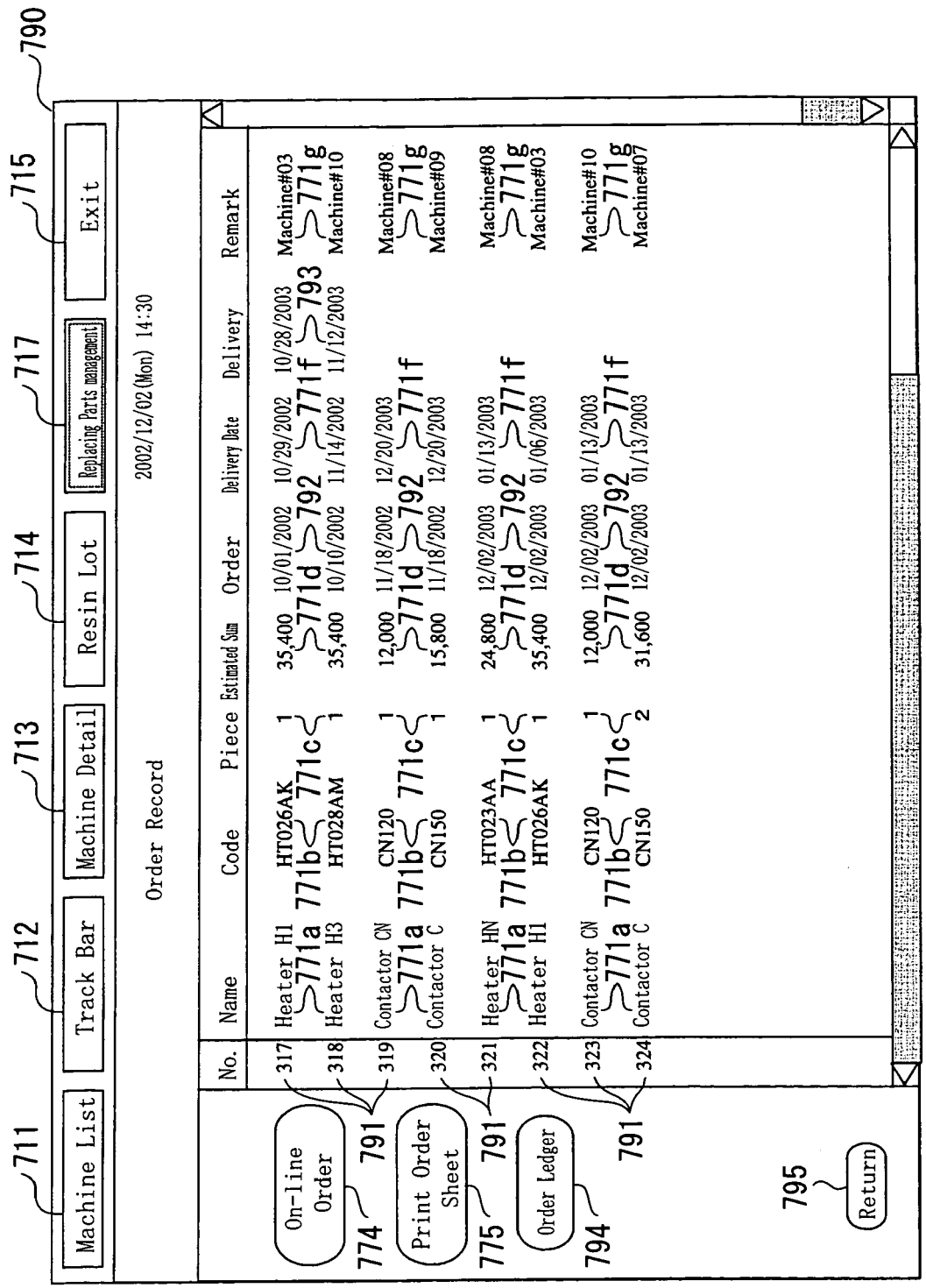
FIG. 28 is a conceptual diagram showing an order history display screen image displayed on the screen by means of the Web browser according to the embodiment.

The order record displaying screen 790 shown in FIG. 28 is displayed in response to an input operation with the command button 776 on the order ledger displaying screen 770. Provided on the order record displaying screen 790 are the command buttons 711, 712, 713, 714, 715, and 717 like, for instance, on the machine list displaying screen 710 described above. Also provided on the order record displaying screen 770 are a plurality of text boxes 791, 792, 793 each for displaying information concerning contents of ordered parts, in addition to the linked text boxes 771a, 771b, 771c, 771d, 771f, 771g each for showing the same data as those on the order ledger displaying screen 770.

The text box 791 displays thereon, for instance, data concerning an order number serially set for each item and stored in the center storage section 501b. The text box 792 displays, for instance, data for the date and time when the command button 774 on the order ledger displaying screen 770 is operated for input for placing an order. The text box 793 displays data for the data and time, for instance, when the ordered parts is delivered. The data concerning the delivery date and hour can be inputted by a responsible person who recognized the delivery in the center terminal input section 502, or with a terminal device owned by the ordered manufacturer. FIG. 28 shows a case where an order number, a name of the ordered parts, size and characteristics thereof, a number of parts to be purchased, an estimated sum of money, an appointed date of delivery, a date of actual delivery, and remarks are shown, but other information concerning an order may be displayed thereon.

Further provided on the order record displaying screen 790 are the same command buttons 774, 775 as those on the order ledger displaying screen 770, and also a plurality of command buttons 794, 795. In response to an input operation with the command button 794, the order ledger displaying screen 770 is displayed. The command button 795 is used to close this order record displaying screen 790 being displayed and to display, for instance, the lifetime list displaying screen 750 shown in FIG. 25. It is to be noted that the command button 795 may be used to display not only the lifetime list displaying screen 750, but also, for instance, the machine list displaying screen 710 shown in FIG. 6.

Figure 29:
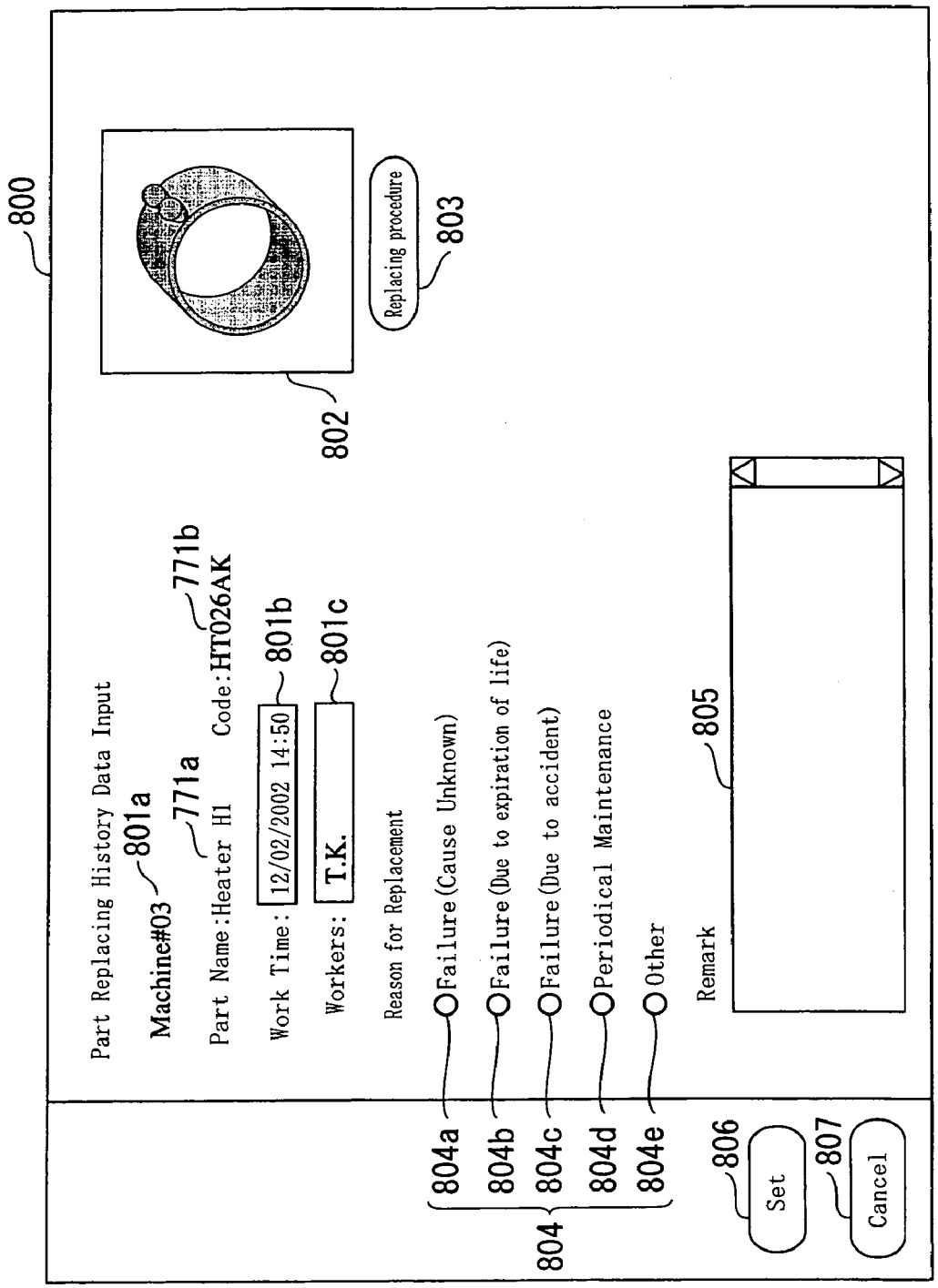
FIG. 29 is a conceptual diagram showing an exchange history display screen image displayed on the screen by means of the Web browser according to the embodiment.

The replacement record data input displaying screen 800 shown in FIG. 29 is displayed in response to an input operation with the command button 762 on the lifetime list detail displaying screen 760 shown in FIG. 26. A plurality of text boxes are provided on the replacement record data input display screen 800. The text boxes 771a, 771b are linked, for instance, to the order ledger displaying screen 770 shown in FIG. 27, and provides the same displays as those shown on the order ledger displaying screen 770, namely, the displays of "H1 heater" which is a name of the "H1", parts-specific information, size and characteristics of the parts, for example.

The text box 801a displays, for instance, "Machine #03", which is machine-specific information for the injection molding machine 300 corresponding to the screen 716a of the lifetime list detail displaying screen 760 to which the command button 762 is linked. Data for date when the parts is replaced can be set and inputted in the text box 801b, for instance, in response to an input operation with the center terminal input section 502. In the text box 801c, such data as a name of an operator having exchanged the replacement parts can be set and inputted in response to an input operation with the center terminal input section 502.

Provided on the replacement record data input displaying screen 800 is an image data displaying area 802, which is an area for displaying image data for parts correlated to parts-specific information such as a name of replacement parts and constituting the parts information. A command button 803 providing a window display for a procedure for replacing the parts as, for instance, text data is provided near the image data displaying area 802. Further, provided on replacement record data input displaying screen 800 is an option group 804 comprising a plurality of option buttons 804a to 804e. Each of these buttons 804a to 804e is correlated to a reason for replacement of parts. Further provided on the replacement record data input displaying screen 800 is a text box in which the reason for replacement can be inputted, for instance, as a text, in response to an input operation with the option button 804e.

Provided on the replacement record data input displaying screen 800 is a command button 806 for selecting data inputted in any of the text boxes 801b, 801c, 805 or in the option group 804 to have the selected data stored as one replacement record data in the center storage section 501b, closing the replacement record data input displaying screen 800, and displaying, for instance, the lifetime list detail displaying screen 760. Further provided on the replacement record data input displaying screen 800 is a command button 807 used to cancel the data inputted in any of the text boxes 801b, 801c, 805 or in the option group 804 and to, for instance, restore the display state before input of the data.

Figure 30:
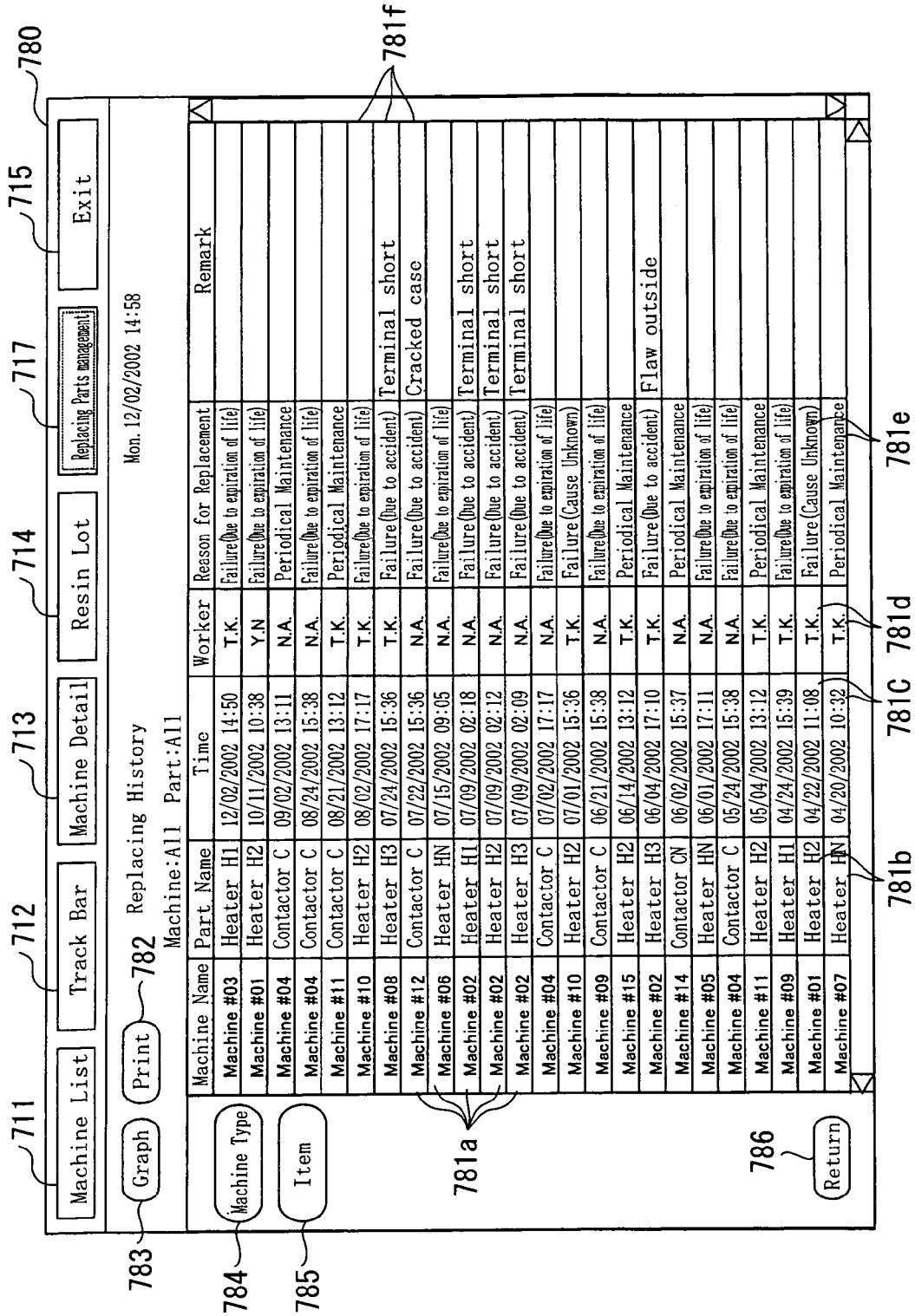
FIG. 30 is a conceptual diagram showing an exchange history display screen image displayed on the screen by means of the Web browser according to the embodiment.

The replacement record displaying screen 780 shown in FIG. 30 is displayed in response to an input operation with the command button 753 on the lifetime list displaying screen 750 shown in FIG. 25. Provided on the replacement record displaying screen 780 are the command buttons 711, 712, 713, 714, 715, and 717 like on the machine list displaying screen 710 described above.

The replacement record data set and inputted on the replacement record input displaying screen 800 shown in FIG. 29 is displayed on the replacement record displaying screen 780 in the list form, for instance, with the CSV format. Namely the replacement record displaying screen 780 has a cell 781a corresponding to the text box 801a and displaying machine-specific information of the injection molding machine 300 in which any parts is replaced, a cell 781b corresponding to the text box 771a and displaying parts-specific information for the replaced parts, a cell 781c corresponding to the text box 801b and displaying the date and hour when the parts is replaced, a cell 781d corresponding to the text box 801c and displaying a name of an operator who replaced the parts, a cell 781e corresponding to the option group 804 and displaying a reason why the parts was replaced in the text form, a cell 781f corresponding to the text box 805 and displaying the text data set and inputted therein.

Further provided on the replacement record displaying screen 780 are a plurality of command buttons 782, 783, 784, 785, and 786.

The command button 782 is used to have the replacement record data printed in the list form in response to an input operation therewith. The command button 783 is used to have a graph setting displaying screen 810 shown in FIG. 31 and described later for setting conditions for displaying the replacement record data described above in the graphic form in response to an input operation therewith. The command button 784 is used to have a machine type selection displaying screen 820 shown in FIG. 32 and described later for selecting and setting, for instance, conditions for the graphic display of the replacement record data described above, namely for selecting and setting the injection molding machine 300 to be displayed in response to an input operation therewith. The command button 785 is used to have an item selection displaying screen 830 shown in FIG. 33 and described later for selecting and setting conditions for the graphic display of, for instance, the replacement record data described above, namely for selecting and setting an item to be displayed in response to an input operation therewith. The command button 786 is used to close the replacement record displaying screen 780 and have the lifetime list displaying screen 750 shown in FIG. 25 and described later displayed in response to an input operation therewith. The configuration is allowable in which not only the lifetime list displaying screen 750, but, for instance, also the machine list displaying screen 710 shown in FIG. 6 are displayed in response to an input operation with the command button 786.

Figure 31:
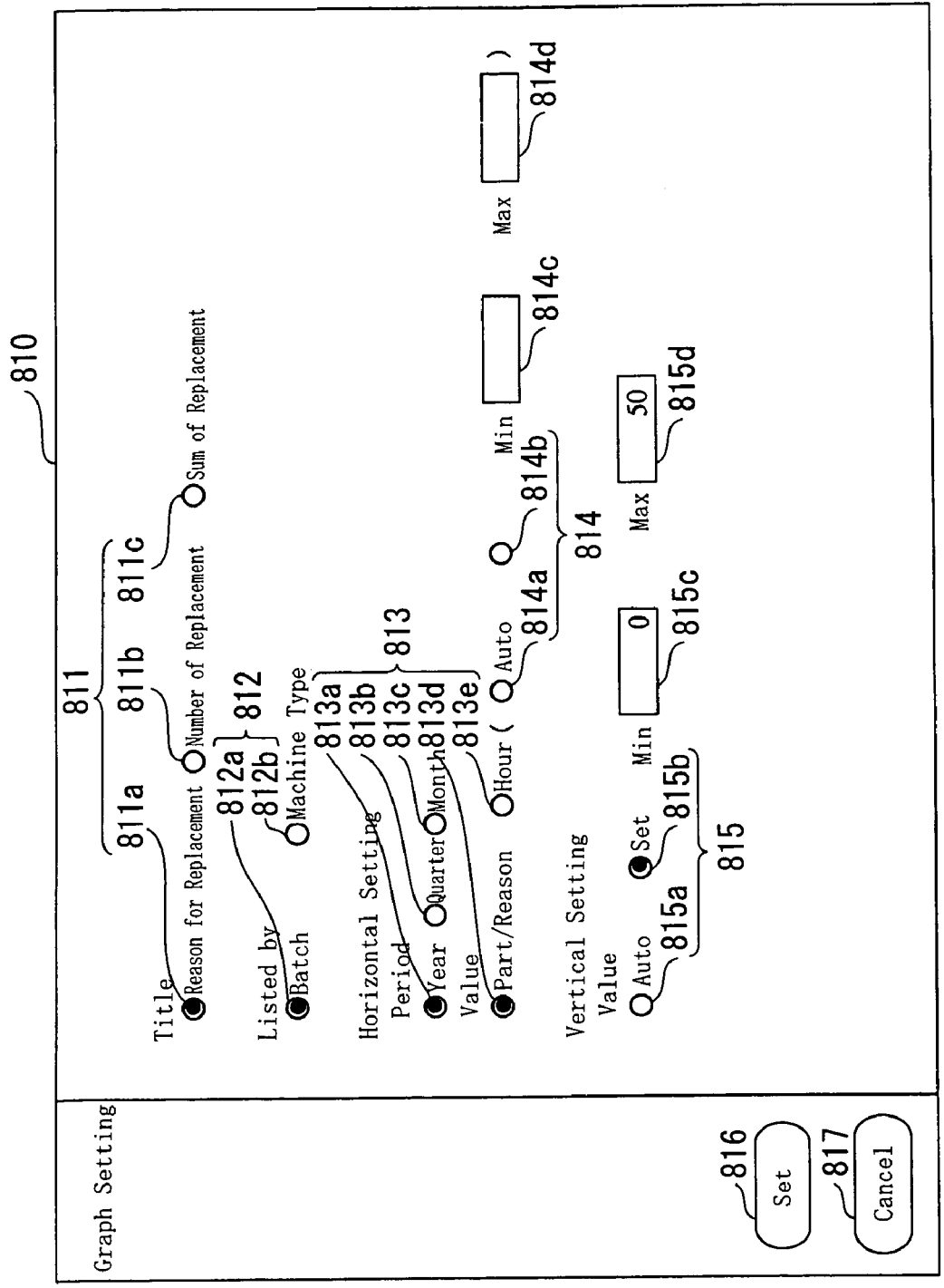
FIG. 31 is a conceptual diagram showing a graph setting display screen image displayed on the screen by means of the Web browser according to the embodiment.

The graph setting displaying screen 810 shown in FIG. 31 is displayed in response to an input operation with the command button 783 on the replacement record displaying screen 780 shown in FIG. 30. An option group 811 for setting a title to be displayed in the graphic form is provided on the graph setting displaying screen 810. This option group 811 has a plurality of option buttons 811a, 811b, 811c for displaying the displaying screens showing titles with different format respectively. The option button 811a is used to set a displaying screen for displaying a reason for replacement in the graphic form like on a parts replacement reason displaying screen 840 shown in FIG. 34 and described later. The option button 811b is used to set a displaying screen for displaying times of replacement in the graphic form like, for instance, on the parts replacement times displaying screen 850 shown in FIG. 35 and described later. The option button 811c is used to set a displaying screen for displaying a total sum of money of the replaced parts in the graphic form like, for instance, on a sum of money for replaced parts displaying screen 860 shown in FIG. 36 and described later.

An option group 812 for setting the displaying method, namely a state of the graphic display is provided on the graph setting displaying screen 810. This option group 812 has a plurality of option buttons 812a and 812b for setting displaying screens, in which the display format varies according to the display method, namely for specifying whether all of the injection molding machines 300 are to be displayed in batch or a specified one among the injection molding machines is to be displayed. The option button 812a is used to specify batch display, while the option button 812b is used to select a discrete display for a specified one among the injection molding machines 300.

Further an option group 813 for setting conditions for the horizontal axis conditions for specifying a state of the graphic display is provided on the graph setting displaying screen 810.

With the option group 813, specification can be made as to which of a period of time, each specific parts, a reason for replacement, time or other data should be used for plotting the horizontal axis. The option group 813 has an option button 813a for selecting a year as the period of time, an option button 813b for selecting a season as the period of time, and an option button 813c for selecting a month as the period of time. Further the option group 813 has, as other conditions, an option button 813d for selecting a parts/reason, and an option button 813e for setting the time. Further provided on the graph setting displaying screen 810 is an option group 814 on which an input operation is enabled in response to an input operation with the option button 813d or 813e. This option group 814 has an option button 814a used for automatically set the time, and an option button 814b which a user can freely use to set the state according to the necessity. Further text boxes 814c and 814d on which text input is enabled in response to an input operation with the option button 814b are provided on the graph setting displaying screen 810. More specifically, text input for a parts/reason or for a minimum or maximum value for a range of the time is enabled. When the option button 814a is set to "automatic", for instance, display is provided with the maximum value of the item to be displayed as a reference.

Further an option group 815 for setting conditions for the vertical axis as one of conditions for the graphic display is provided on the graph setting displaying screen 810.

The option group 815 is used to set a range of the vertical axis, and has an option button 815a for automatically setting, and an option button 815b for selecting the state in which a user can freely select the conditions according to the necessity. Further provided on the graph setting displaying screen 810 are provided text boxes 815c and 815d in which, for instance, text input is enabled in response to an input operation with the option button 815b.

Figure 34:
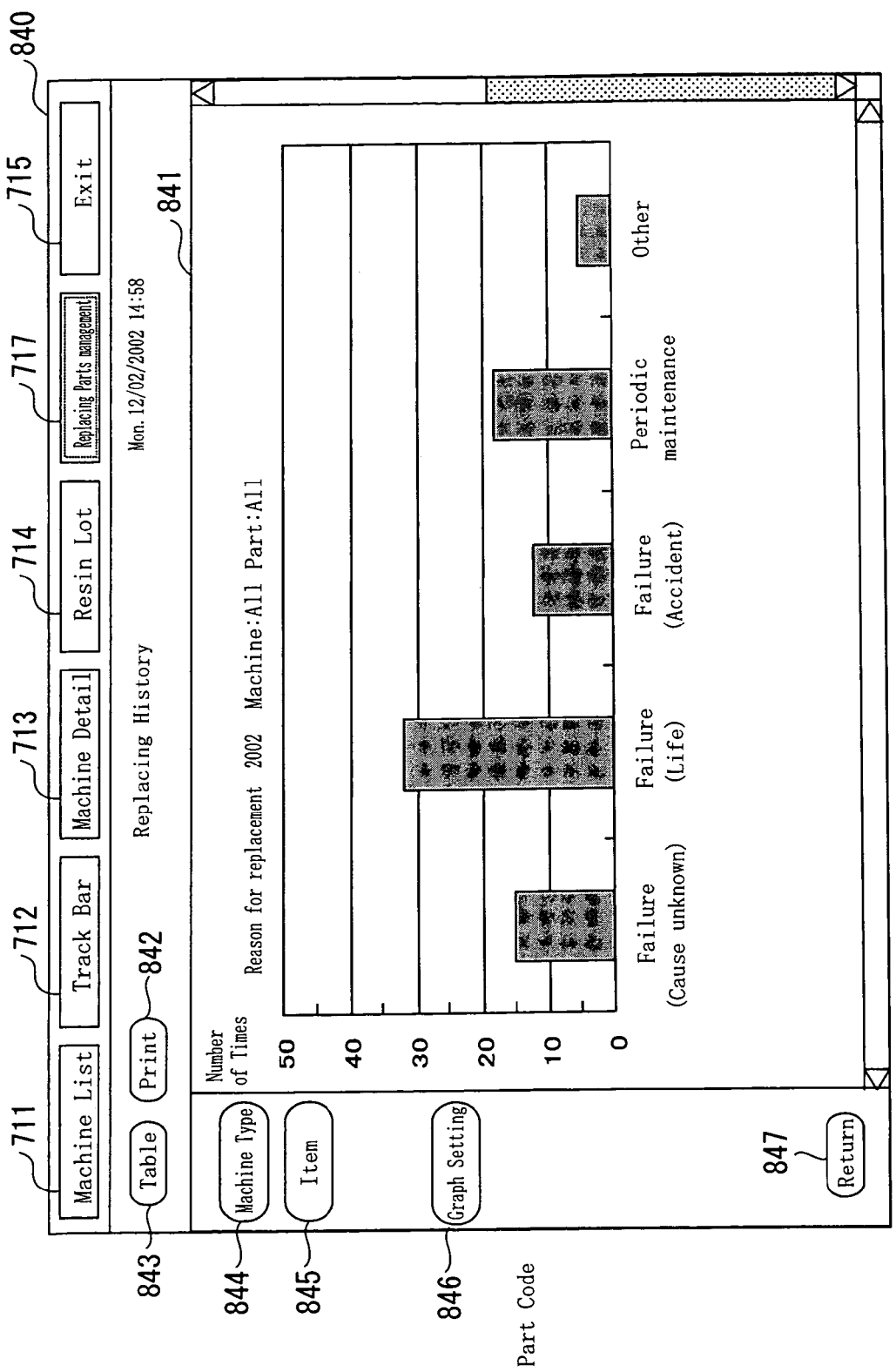
FIG. 34 is a conceptual diagram showing a parts exchange reason display screen image displayed on the screen by means of the Web browser according to the embodiment.
Figure 36:
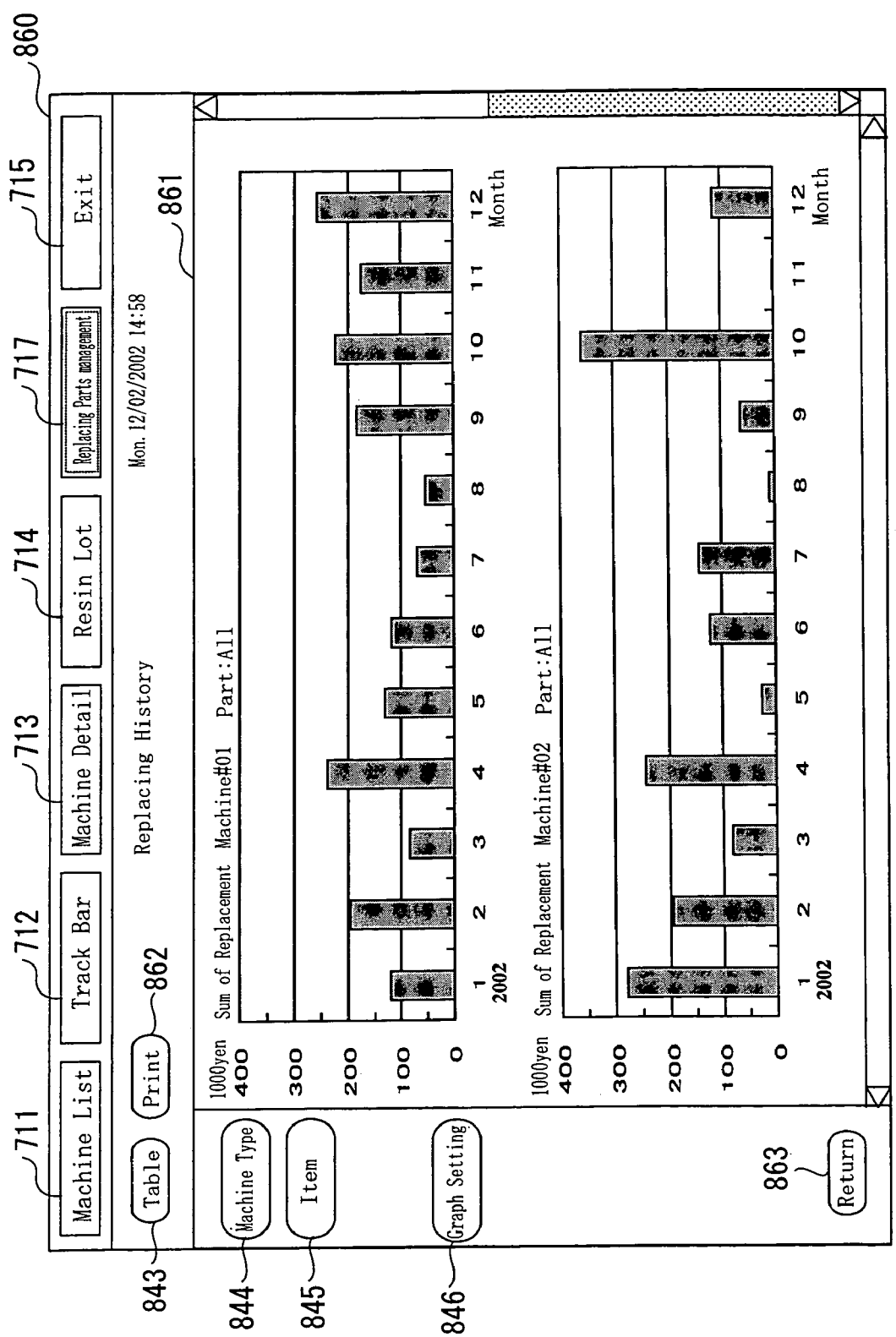
FIG. 36 is a conceptual diagram showing a parts exchange amount display screen image displayed on the screen by means of the Web browser according to the embodiment.

Further provided on the graph setting displaying screen 810 is provided a command button 816 for selecting input of each of the option buttons 811a to 815d to close the graph setting displaying screen 810 and display, for instance, a parts replacement reason displaying screen 840 shown in FIG. 34, a parts replacement times displaying screen 850 shown in FIG. 50, a sum of money for replaced parts displaying screen 860 shown in FIG. 36, or the replacement record displaying screen 780 shown in FIG. 30. Further provided on the graph setting displaying screen 810 is a command button 817 for canceling input of each of the option buttons 811a to 815b and restoring the state before any of the option buttons 811a, 811b is selected.

Figure 32:
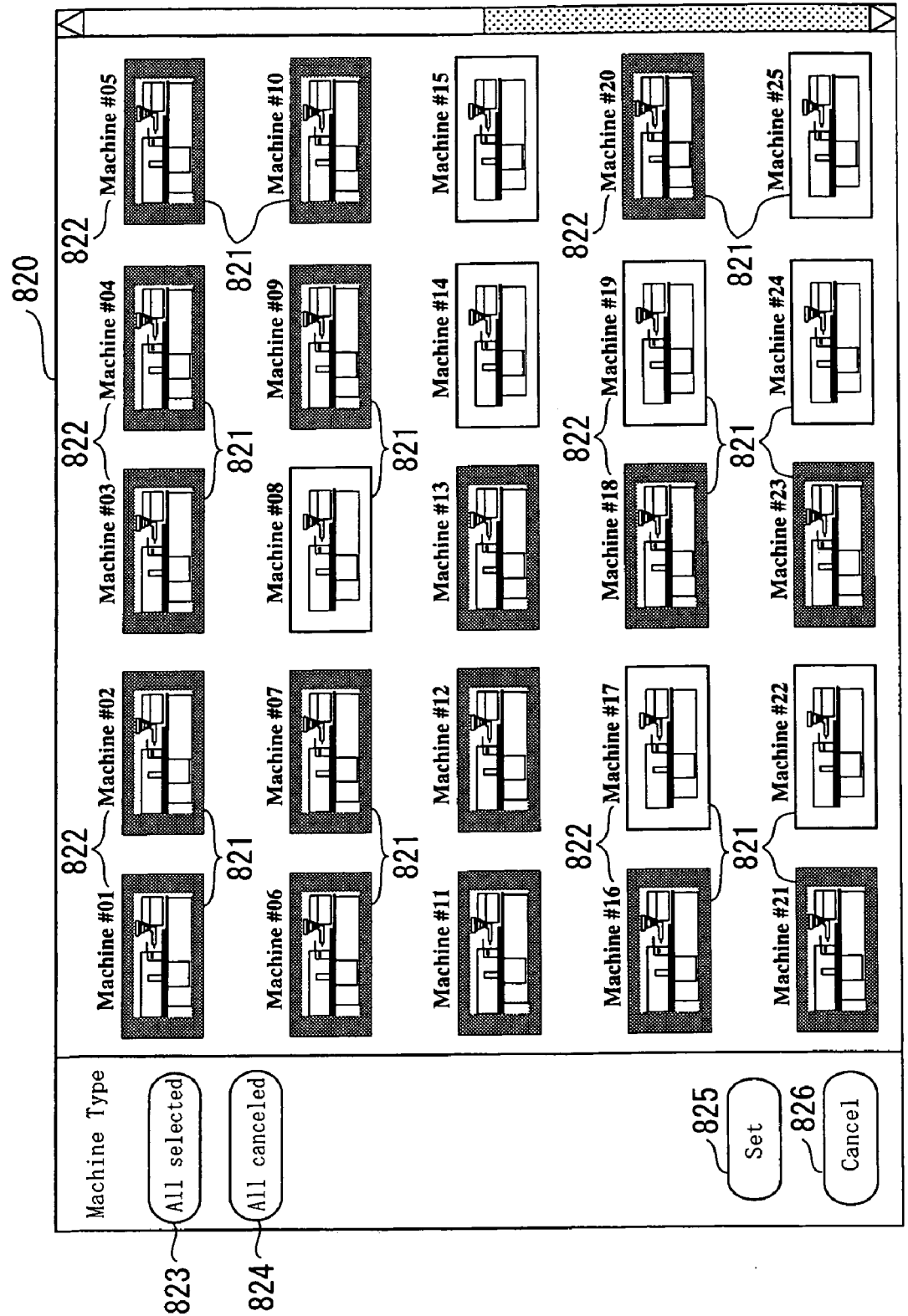
FIG. 32 is a conceptual diagram showing a machine type selection display screen image displayed on the screen by means of the Web browser according to the embodiment.

The machine type selection displaying screen 820 shown in FIG. 32 is displayed in response to an input operation with the command button 784 on the replacement record displaying screen 780 shown in FIG. 30. A plurality of screens 821, the number of which corresponds to, for instance, that of all injection molding machines 300 to be managed, are provided on the machine type selection displaying screen 820, and the screens 821 display image data simulating the injection molding machines 300 respectively like the screen 716a. These screens 821 can be selected and set, namely can be clicked thereon, and when any of the screens 821 is clicked thereof, the display format can be switched to that indicating that the screen has been selected, namely to the blinking mode with the back ground color changed to a different or deeper color. In addition, like on the lifetime list displaying screen 750 shown in FIG. 25, text boxes 822 showing serial numbers respectively such as "Machine #01" which is machine-specific information indicating the injection molding machine 300 are provided and form pairs with the screens 821 respectively.

Further provided on the machine selection displaying screen 820 are a command button 823 for selecting all of the screens 821 and a command button 824 for canceling the selection of the screens 821, namely for canceling the state where all of the screens 821 have been selected. Further provided on the machine selection displaying screen 820 is a command button 825 for setting input for selection of all of the screens 821, closing this machine selection displaying screen 820, and the displaying, for instance, the replacement record displaying screen 780 shown in FIG. 30. Further provided on the machine section displaying screen 820 is a command button 826 for canceling selection of all of the screens 821, namely for restoring the state before the selection like the command button 824.

Figure 33:
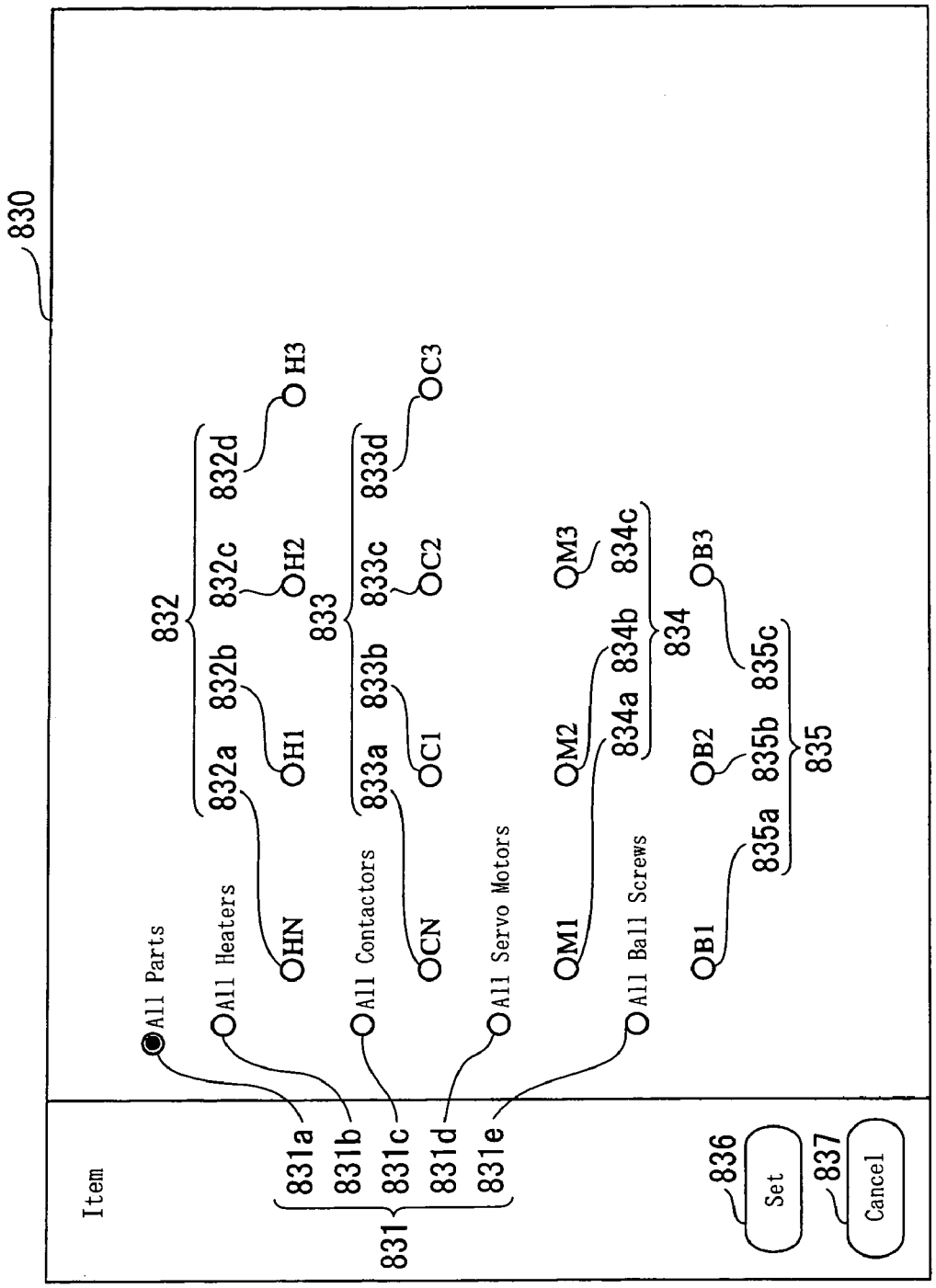
FIG. 33 is a conceptual diagram showing an item selection display screen image displayed on the screen by means of the Web browser according to the embodiment.

The item selection displaying screen 830 shown in FIG. 33 is displayed in response to an input operation with a command button 785 on the replacement record displaying screen 780 shown in FIG. 30. Provided on the item selection displaying screen 830 shown in FIG. 33 is an option group 831 having a plurality of option buttons 831a, 831b, 831c, 831d, 831e used for selection of an item to be displayed in the graphic form.

The option button 831a is used to display all of parts to be displayed in the graphic state in response to an input operation therewith. The option button 831b is used to display all of replacement parts for a heater, the option button 831c to display all of replacement parts for a contactor, the option button 831d to display all of replacement parts for a servo motor, the option button 831e to display all of replacement parts for a ball screw respectively.

Provided on the item selection displaying screen 830 are provided a plurality of option groups 832, 833, 834, and 835.

The option group 832 has a plurality of option buttons 832a, 832b, 832c, and 832c corresponding to the heaters used to select any of the heaters respectively as a parts to be displayed in the graphic state in response to an input operation therewith. The option group 833 has a plurality of option buttons 833*a*, 833*b*, 833*c*, and 833*d* corresponding to the contactors used to select any of the contactors as a parts to be displayed in the graphic state in response to an input operation therewith. The option group 834 has a plurality of option buttons 834*a*, 834*b*, and 834*c* corresponding to servo motors respectively used to select any of the servo motors as a parts to be displayed in the graphic state. The option group 835 has a plurality of option buttons 835*a*, 835*b*, and 835*c* corresponding to the servo motors to select any of the servo motors as a parts to be displayed in the graphic state.

Further provided on the item selection displaying screen 830 is a command button 836 for setting input of the option buttons 831*a* to 835*c* described above, closing this item selection displaying screen 830, and displaying the replacement record displaying screen 780 shown in FIG. 30. Also provided on the item selection displaying screen 830 is a command button 837 for canceling selection of any of the option buttons 831*a* to 835*c*, namely for restoring the state before the selection.

Provided on the parts replacement reason displaying screen 840 for providing graphic displays shown in FIG. 34 are the command buttons 711, 712, 713, 714, 715, 717 like those, for instance, on the machine list displaying screen 710 described above. Also provided on the parts replacement reason displaying screen 840 is a graphic display area 841 for setting, for instance, a reason for replacement based on the conditions set and inputted in the option group 804 on the replacement record data input displaying screen 800 shown in FIG. 29 as the horizontal axis, and setting times of replacement corresponding to the number of data set and inputted as the vertical axis to display a graph such as a bar graph showing the relation between the reason for replacement and the times. FIG. 34 shows an example of the graphic display of the relation between the reason for replacement and times for all parts in all of the injection molding machines 300.

Provided on the parts replacement reason displaying screen 840 are a plurality of command buttons 842, 843, 844, 845, 846, and 847.

The command button 842 is used to have the graph displayed in the graph display area 841 displayed in response to an input operation therewith. The command button 843 is used to have the replacement record displaying screen 780 shown in FIG. 30 displayed in response to an input operation therewith. The command button 844 is used to have the machine type selection displaying screen 820 shown in FIG. 32 displayed in response to an input operation therewith. The command button 845 is used to have the item selection displaying screen 830 shown in FIG. 33 displayed in response to an input operation therewith. The command button 846 is used to have the graph setting displaying screen 810 shown in FIG. 31 displayed in response to an input operation therewith. The command button 847 is used to close the parts replacement reason displaying screen 840 and have, for instance, the lifetime list displaying screen 750 shown in FIG. 25 displayed in response to an input operation therewith. When an input operation is performed with the command button 847, not only the lifetime list displaying screen 750, but also, for instance, the machine list displaying screen 710 shown in FIG. 6 may be displayed.

Figure 35:
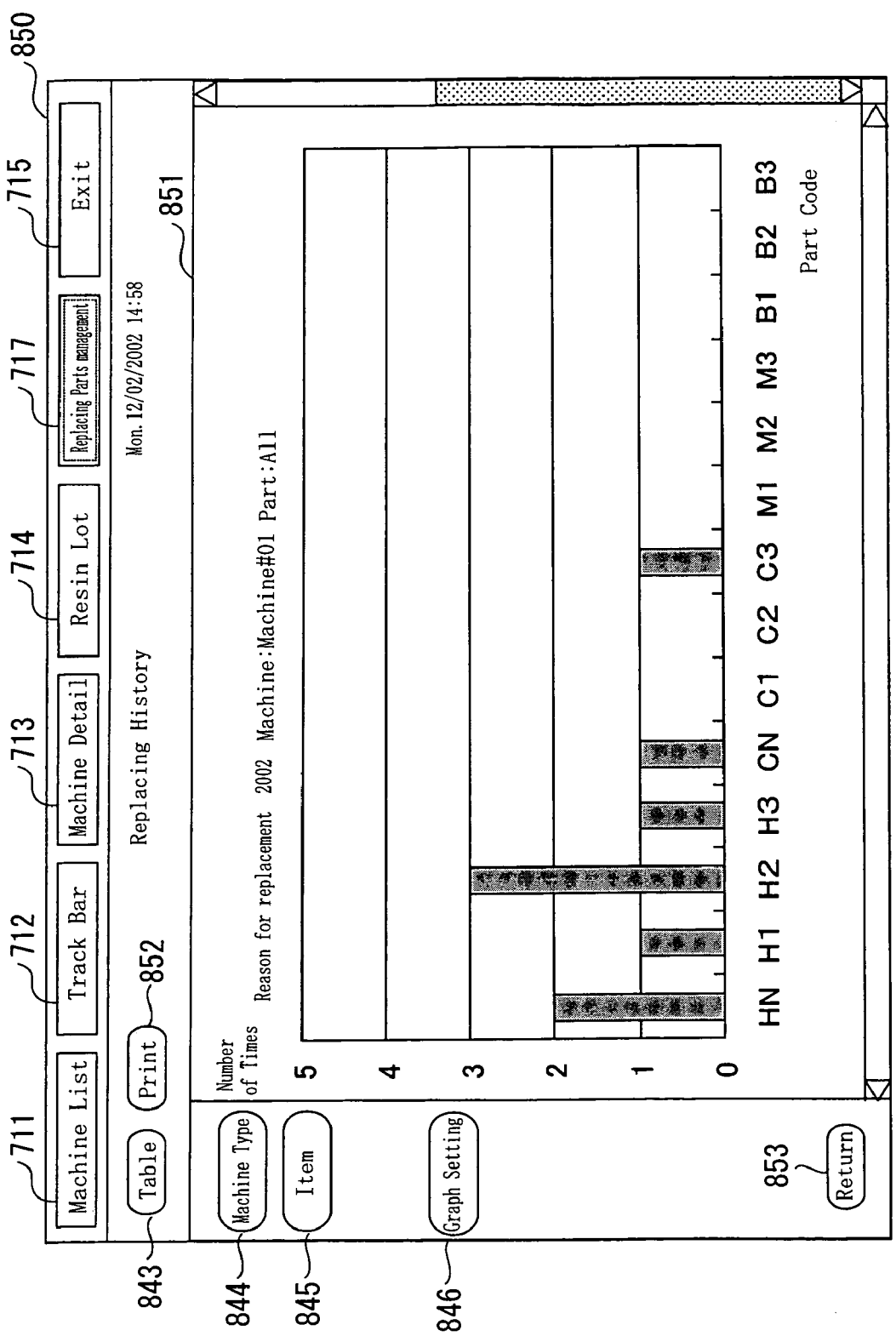
FIG. 35 is a conceptual diagram showing a parts exchange times display screen image displayed on the screen by means of the Web browser according to the embodiment.

Further provided on the parts replacement times displaying screen 850 for providing the graphic display shown in FIG. 35 are the command buttons 711, 712, 713, 714, 715, 717 like on, for instance, the machine list displaying screen 710 described above. Further provided on the parts replacement times displaying screen 850 is a graphic display area 851 for displaying a graph such as a bar graph plotted, for instance, with the type of a replacement parts set and inputted by selecting any of the option groups 831, 832, 833, 834, and 835 on the item selection displaying screen 830 as the horizontal axis, and also with the times of replacements corresponding to a number of data set and inputted as the vertical axis to show the relation between the replaced parts and the times of replacement. FIG. 35 shows an example of a graphic display showing times of replacement for all parts in each of the injection molding machines 300 selected on the machine type selection displaying screen 820 shown in FIG. 32.

Provided on the parts replacement times displaying screen 850 are a plurality of command buttons 843 to 846 like on the parts replacement reason displaying screen 840 shown in FIG. 34 described above. Further provided on the parts replacement times displaying screen 850 are, like on the parts replacement reason displaying screen 840, a command button 852 used to have the graph displayed on the graph displaying area 851 printed in response to an input operation therewith, and a command button 853 used to close this parts replacement times displaying screen 850 and have, for instance, the lifetime list displaying screen 750 shown in FIG. 25 displayed.

Provided on the sum of money for parts replacement displaying screen 860 are the command buttons 711, 712, 713, 714, 715, 717 like on the machine list displaying screen 710 described above. Further provided on the sum of money for parts replacement displaying screen 860 is a graphic display area 851 for displaying a graph such as a bar graph showing a sum of money for parts replacement in each period plotted with a period based on data set and inputted in the option group 813 on the graph setting displaying screen 810 shown in FIG. 31 as the horizontal axis and also a sum of money based on data set and inputted in the option group 815 as the vertical data. FIG. 36 shows a graphic display for all parts in each of the injection molding machine 300 selected on the machine selection displaying screen 820 shown in FIG. 32.

Provided on the sum of money for parts replacement displaying screen 860 are provided a plurality of command buttons 843 to 846 like those on the parts replacement reason displaying screen 840 shown in FIG. 34 as well as on the parts replacement times displaying screen 850 shown in FIG. 35. Further provided on the sum of money for parts replacement displaying screen 860 are a command button 862 used to have the graph displayed on the graphic display area 861 printed in response to an input operation therewith like on the parts replacement reason displaying screen 840 as well as on the parts replacement times displaying screen 850, and a command button 863 used to close the sum of money for parts replacement displaying screen 860 and have, for instance, the lifetime list displaying screen 750 shown in FIG. 25 displayed.

Figure 37:
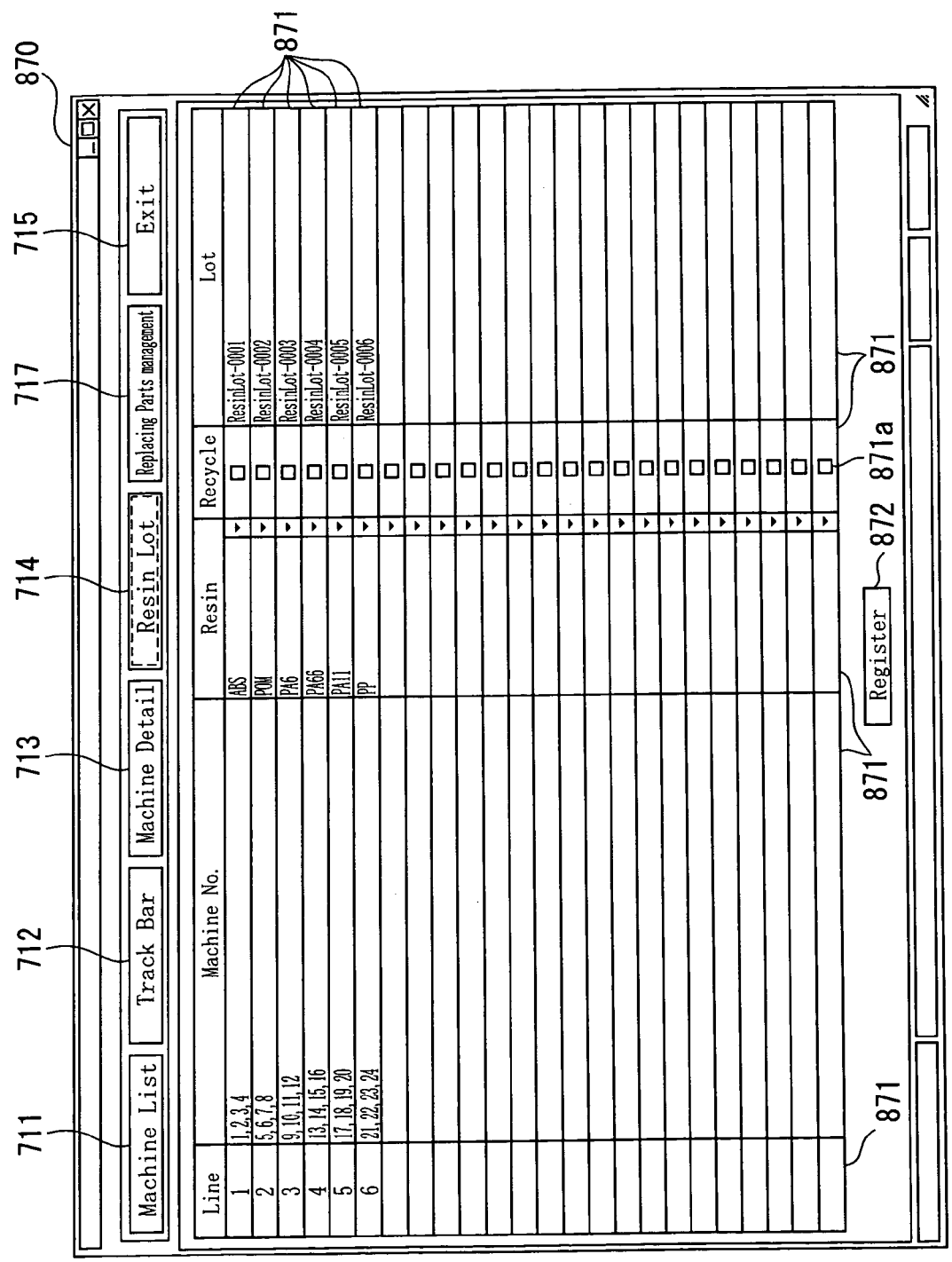
FIG. 37 is a conceptual diagram showing a resin lot display screen image displayed on the screen by means of the Web browser according to the embodiment.

On the other hand, the command buttons 711 to 717 described above are provided on a displaying screen to display information concerning the feed stock 360 on the feed stock displaying section 552 in response to an input operation with the command button 714, for instance on a resin lot displaying screen 870 shown in FIG. 37. A plurality of cells 871 for displaying data such as line numbers of machines to which the same feed stock 360 is fed, serial numbers of the machines, characteristics of the feed stock 360, availability of the recycled feed stock, a lot number of the feed stock 360, or the like are provided on this resin lot displaying screen 870. Further a command button 872 for setting data in a line of the cell 871 enlisted by setting these data as one piece of record is provided on the resin lot displaying screen 870.

(Configuration of the Server Device)

Next configuration of the server device 600 for actual use is described with reference to the related drawings.

A server storage section 601b of the server device 600 has a machine information database 610 for storing therein information managed by the production management supporting system 100 set in the server computing section 601a as described above, a feed stock information database 620, a distributed information database 630, and a terminology database 640.

Figure 38:
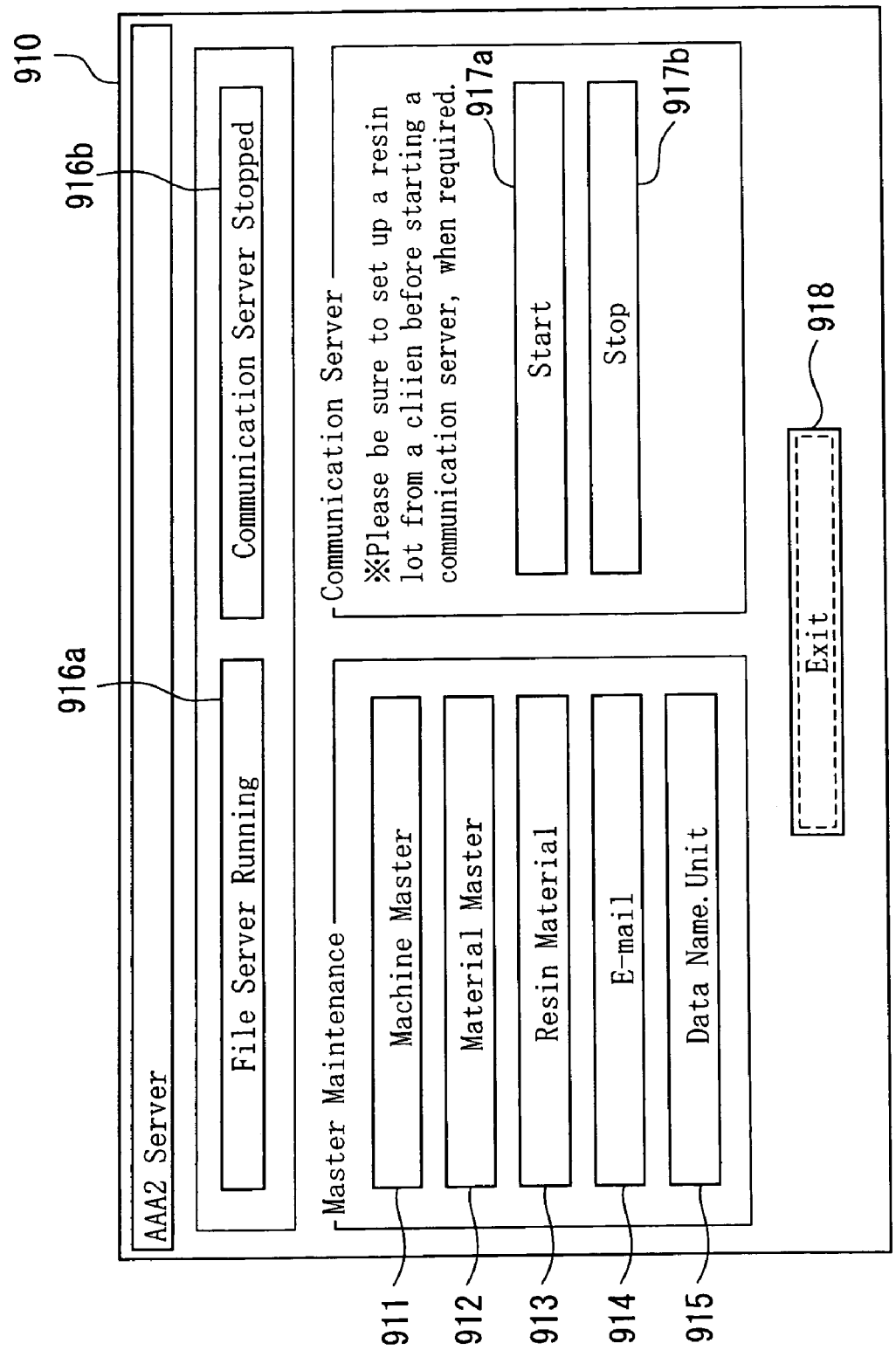
FIG. 38 is a conceptual diagram showing a menu display screen image displayed on the screen by means of the Web browser according to the embodiment.

Specifically, when an application software for controlling the production management supporting system 100 with the server computing section 601a of the server device 600 is started, a menu screen 910, for instance, based on a screen display from a web browser shown in FIG. 38 for setting various types of data is displayed. This menu screen can be switched to any displaying screen according to the necessity to set desired type of data.

Namely, a plurality of command buttons 911, 912, 913, 914, and 915 each used to display displaying screens for displaying various types of data respectively are provided on the menu screen 910.

In response to an input operation with the command button 911, a machine master setting displaying screen 920 is displayed, for instance, as a screen display from the web browser shown in FIG. 39, although the details are described later. On this machine master setting displaying screen 920, machine master information concerning the injection molding machine 300 such as the operating state information processed by the center management terminal device 500 according to the necessity is set, and is stored in the machine information database 610.

Figure 40:
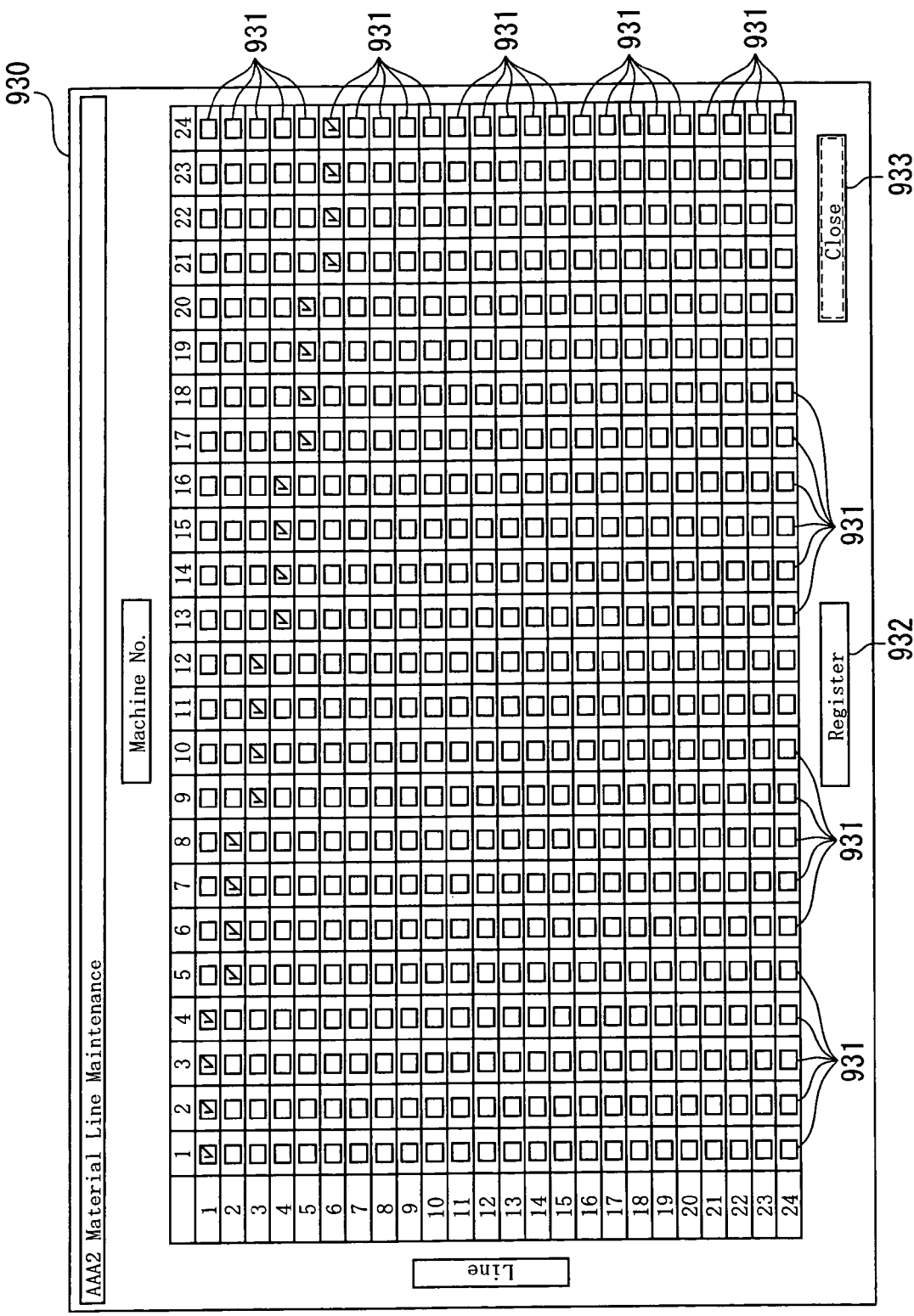
FIG. 40 is a conceptual diagram showing a feedstock line setting display screen image displayed on the screen by means of the Web browser according to the embodiment.

Although the details are described later, in response to an input operation with the command button 912, a feed stock line setting displaying screen 930 displayed, for instance, with a display screen from the web browser shown in FIG. 40 is displayed. On this feed stock line setting screen 930, the feet stock line information for specifying the injection molding machine 300 using the feed stock 360 for injection molding is set, and is stored in the line information database 621.

Figure 41:
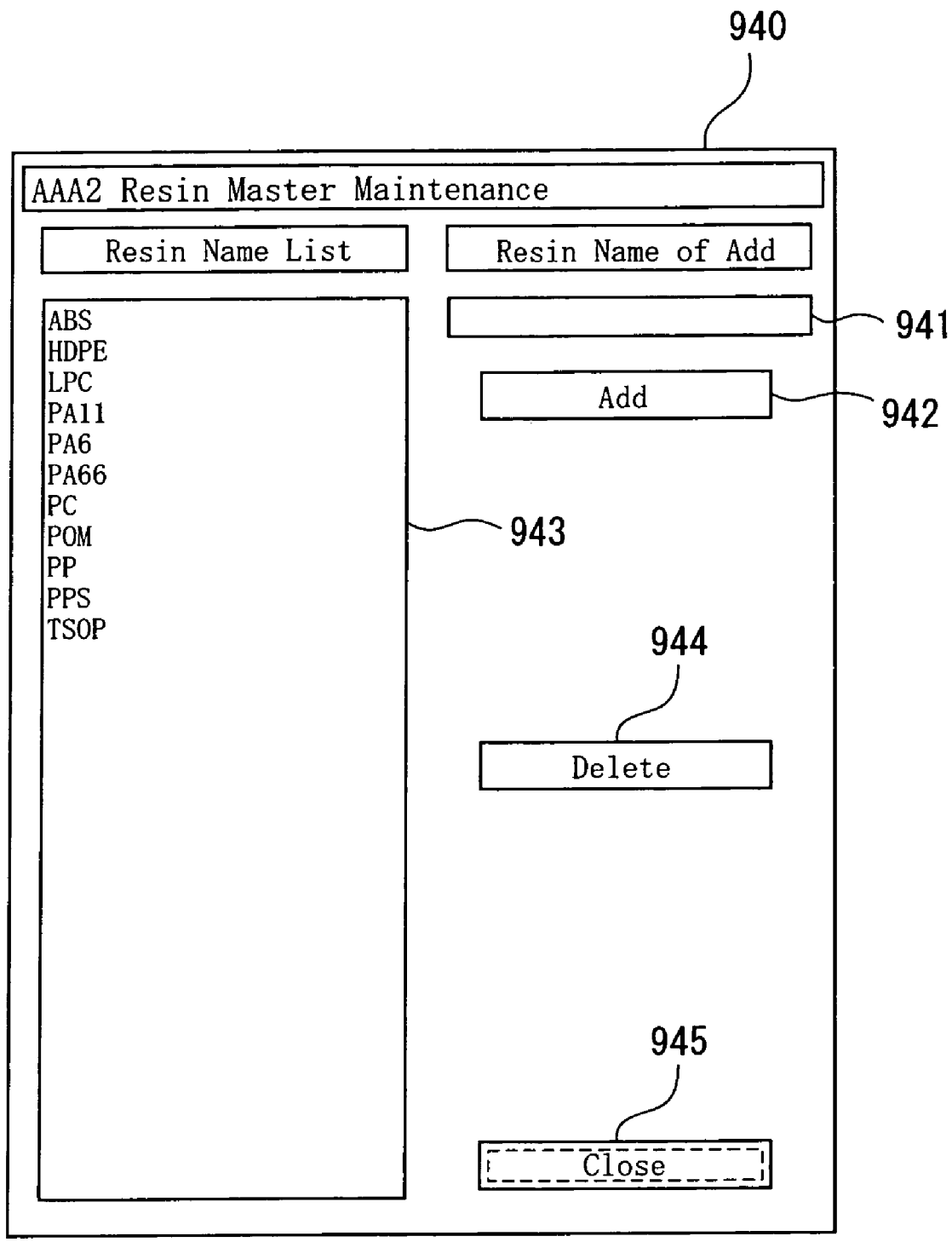
FIG. 41 is a conceptual diagram showing a resin setting display screen image displayed on the screen by means of the Web browser according to the embodiment.

In response to an input operation with the command button 913, a resin setting displaying screen 940 displayed, for instance with a screen display from the web browser shown in FIG. 41 is displayed, although the details are described later. On this resin setting displaying screen 940, resin master information concerning the feed stock 360 used for injection molding is set, and is stored in a feed stock contents information database 622.

Figure 42:
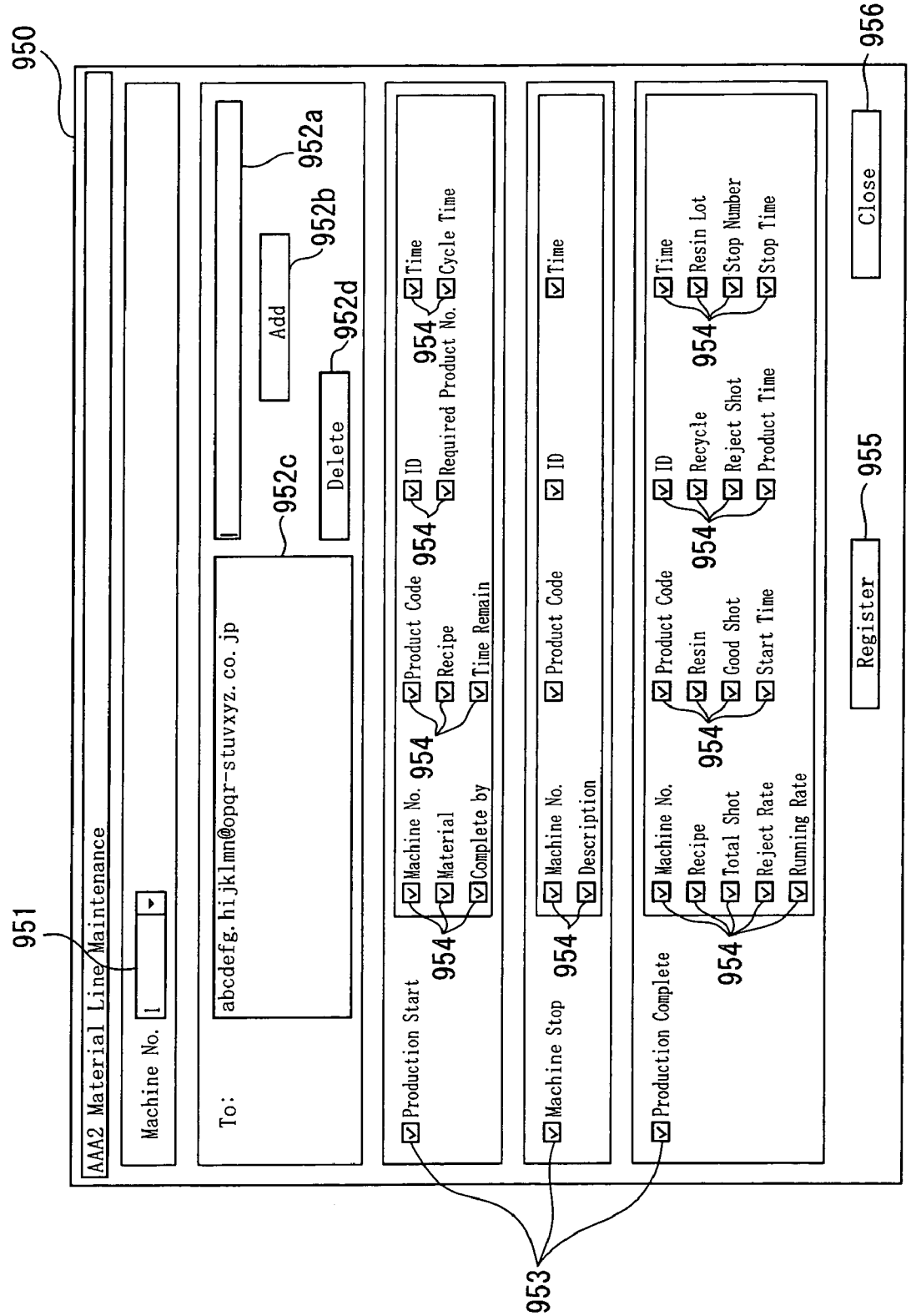
FIG. 42 is a conceptual diagram showing an e-mail information setting display screen image displayed on the screen by means of the Web browser according to the embodiment.

In response to an input operation with the command button 914, a mail information setting displaying screen 950 displayed, for instance, with a screen display from the web browser shown in FIG. 42 is displayed, although the details are described later. On this mail information setting displaying screen 950, E-mail information for transmitting various types of information is set, and is stored in the distributed information database 630.

In response to an input operation with the command button 915, a terminology setting displaying screen 960 displayed, for instance, with the web browser shown in FIG. 43 is displayed, although the details are described later. On this terminology setting displaying screen 960, various terms such as item names for data and units used in the production management supporting system 100 are set as terminology information, and is stored in the terminology database 640.

Provided on the menu screen 910 are provided a text box 916a showing that an application software in the server device 600 has been activated, and a text box 916b showing that the server device 600 has been connected to the network 200. Further provided on the menu screen 910 are command buttons 917a, 917b for connection or disconnection of the server device 600 to or from the network 200. Also provided on the menu screen 910 is a command button 918 for terminating operations of the application software.

Figure 39:
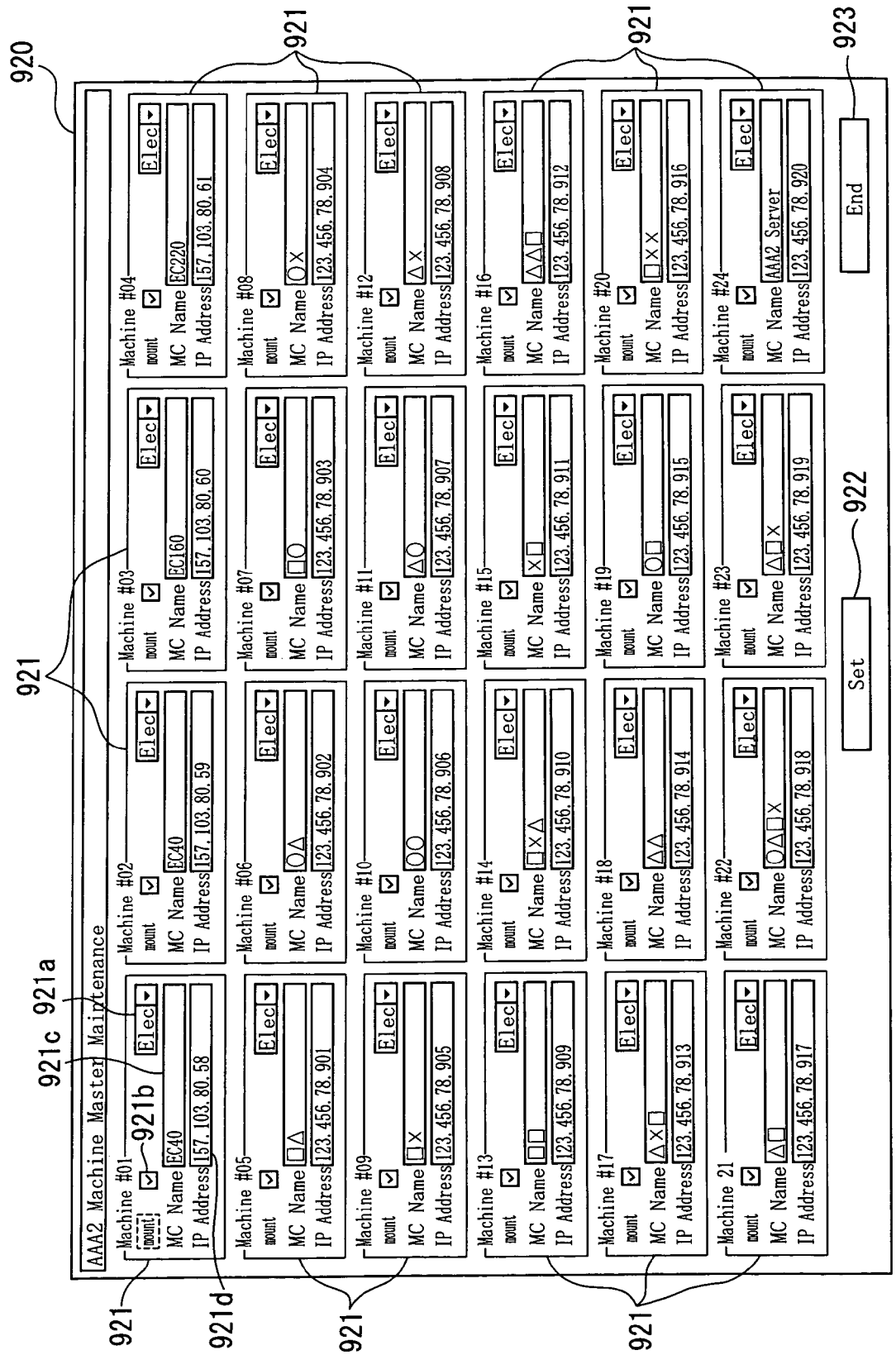
FIG. 39 is a conceptual diagram showing a machine master setting display screen image displayed on the screen by means of the Web browser according to the embodiment.

On the machine master setting displaying screen 920 displayed with a display screen from the web browser shown in FIG. 39, a plurality of setting sections 921 each setting information for each injection molding machine 300 for setting the machine list display screen 710 are provided. Provided in each of the setting sections 921 are a list box 921a for setting a type of the injection molding machine 300, a check box 921b for specifying whether the controlling terminal device 400 for the injection molding machine 300 is to be linked to the network 200 or not, a text box 921c for setting and inputting the machine name, and a text box 921d for setting and inputting an IP address for a communication protocol for information transaction with the controlling terminal device 400, for instance, that for the Internet.

Provided on the machine master setting displaying screen 920 is a command button 922 used to set the information inputted in each setting section 921 and store the information set in each setting section 921 as one piece of record in the machine information database 610. Further provided on the machine master setting displaying screen 920 is a command button 923 for terminating the set state and closing this screen display.

Provided on the feed stock line setting displaying screen 930 shown in FIG. 40 are a plurality of check boxes 931 each used for setting the injection molding machine which is a machine constituting the line for feeding the feed stock 360. FIG. 40 shows a case in which a serial number for a machine is used for identifying the injection molding machine constituting the lime and a serial number for identifying the line.

Provided on the feed stock line setting displaying screen 930 is a command button 932 for storing the checked line as one piece of record in the line information database 621. Further provided on the feed stock setting displaying screen 930 is a command button 933 for terminating the set state and closing this screen display.

Further provided on the resin setting displaying screen 940 shown in FIG. 41 are a text box 941 for setting and inputting the feed stock 360 to be used, and a command button 942 to set (add) the information inputted in this text box. Also provided in the resin setting displaying screen 940 is a list display area 943 on which the set feed stocks 360 to be used are displayed in response to an input operation with the command button 942 are displayed in the list form. Further provided on the resin setting displaying screen 940 is a command button 944 for deleting the feed stock 360 displayed in the list displaying area. In addition, provided on the resin setting displaying screen 940 is a command button 945 for terminating the set state and closing this screen display.

Provided on the mail information setting displaying screen 950 are a check box 953 for setting the timing for transmitting a mail, and a check box 954 for setting which data in the operating state information is to be transmitted at each timing for transmission. Also provided on this mail information setting displaying screen 950 are a command button 955 used to set each item to be set as described above and have the set data stored as one piece of record in the distributed information database 639, and a command button 956 used to terminate the set state and close this screen display.

A plurality of cells for setting terms such as technical terms, units, and converted values used in this production management supporting system 100 are provided on the terminology setting displaying screen 960 shown in FIG. 43. Also provided on the terminology setting displaying screen 960 are a list box 962 showing in a list form serial numbers for machines used to set the injection molding machine 300 in which the terms set in the cell 961 are to be used, and a list box 963 showing in a list form the screen displays on which the terms are used. Further provided on the terminology setting displaying screen 960 are a command button 964 for having, for instance, information in a line of the cell 961 as one piece of record in the terminology database 640, and a command button 965 used to terminate the set state and close this screen display.

[Operations of the Production Management Supporting System]

Next operations of the production management supporting system are described above.

To start operations of the system according to this embodiment, at first the controlling terminal device 400 for each of the injection molding machines 300, the center management terminal device 500, and the server device 600 are connected to each other via the network 200. Further the application software for the center management terminal device 400 of the production management supporting system 100 is installed in the center management terminal device 500, and also the application software for the server device 600 of the production management supporting system 100 is installed in the server device 600.

Then the application software in the server device 600 is started to have the menu screen 910 displayed. Next, the server input section 602 is operated and the command buttons 911 to 915 are operated according to the necessity to have the machine master setting displaying screen 920, feed stock setting displaying screen 930, resin setting displaying screen 940, mail information setting displaying screen 950, and terminology setting displaying screen 960 displayed on the server displaying section 603. Then the server inputting section 602 is operated to set and input various types of data based on displays on the displaying screens 920 to 960 and have the set data stored in the server storage section 610*b*.

On the other hand, the application software installed in the center management terminal device 500 is started to initialize the communication protocol for information transaction with the server device 600 via the network 200, namely to initialize the communication protocol by setting the IP address of the server device 600.

Then the controlling terminal input section 410 of the controlling terminal device 400 is operated to set and input the conditions for injection molding with the injection molding machine 300, namely the operating conditions for the injection molding machine 300. Then the injection molding machine is driven according to the necessity to manufacture synthetic resin products by means of injection molding.

After the operations for injection molding by the injection molding machine 300 are started, the controlling terminal device 400 acquires the operating state information concerning the operating state of the injection molding machine 300, namely signals detected by sensors of the injection molding machine 300, and transmits the acquired operating state information via the network 200 to the center management terminal device 500 or to the server device 600. This operating state information is transmitted, for instance, once for each short which is one cycle of the injection molding process from each of the injection molding machines 300 connected thereto through the network 200. The center management terminal device 500 or the server device 600 receive the operating state information, and store the operating state information once for each shot by each of the injection molding machines 300 sequentially in the center storage section 501*b* or in the server storage section 601*b*. More specifically, as shown, for instance, on the quality monitor table displaying screen 750 shown in FIG. 25, the center management terminal device 500 or the server device 600 receive and store the operating state information as information for each shot to accumulate the operating state information.

An operator monitoring the injection molding process has the operating state information displayed on the center terminal displaying section 503 of the center management terminal device 500 in which the application software is started according to the necessity to monitor the injection molding process executed by each of the injection molding machines 300. Namely, with the machine list displaying screen 710, it is possible to intensively grasp the operating state of the injection molding machines 300, which enables the efficient management without the need of going to an installation site of each injection molding machine 300 to visually check the state of the controlling terminal displaying section 420 of the controlling terminal device 400. Further it is possible to easily determine whether the injection molding machine 300 with the operation down has been stopped due to any failure, or whether the injection molding machine 300 has been stopped to exchange, for instance, a die or the like by, for instance, checking the background color of the screen 716*a* of the machine list displaying screen 710. Further, when it is necessary to determine acceptability of any product, or even when the machine is stopped due to any failure or an alarm is generated, it is possible to easily determine contents of the failure or the alarm by checking the acquired and accumulated operating state information on the trend chart displaying screen 160 or the correlation coefficient displaying screen 170, correlation coefficient graphic displaying screen 180, distribution function displaying screen 190, machine screen displaying screen 740 or other screens, which enables a quick response to any abnormality or alarm.

Further, even in a case of the injection molding machine 300 which is typically running automatically, the operating state information is transmitted as a mail according to the necessity, and therefore even when the injection molding machine 300 is not being monitored by the center management terminal device 500, it is possible to detect occurrence of an unexpected abnormality by checking the mail, which allows a quick response.

An operator responsible for maintenance of the injection molding machines 300 has the operating state information displayed on the center terminal displaying section 503 of the center management terminal device 500 actuated by the application software according to the necessity to monitor the operating state of each parts in the injection molding machines 300. Namely, with the lifetime list displaying screen 750 shown in FIG. 25, it is possible to intensively manage utilization of each parts in relation to the lifetime of the injection molding machine 300, which enables efficient management of the injection molding machines 300 without the need of going to the installation site of each injection molding machine to visually check the controlling terminal displaying section 420 of the control terminal device 400. Further with the lifetime detail displaying screen 760 shown in FIG. 26, it is possible to recognize detail situation of the utilization of each parts, and also when the parts is to be replaced, also the stocking situation can be recognized.

When parts replacement is performed, a procedure for replacement can visually be checked on the replacement record data input displaying screen 800 shown in FIG. 29, so that the replacement can be carried out under good conditions. When replacement is performed, data for the replacement work is set and inputted on the replacement record data input displaying screen 800 and is accumulated as the record data, so that the situation of parts replacement in the past can visually be checked, for instance, on the replacement record displaying screen 780 shown in FIG. 30, and therefore also the timing for replacement of each parts can easily be determined. Further the situation of replacement can visually be checked, for instance, on the parts replacement reason displaying screen 840 shown in FIG. 34, on the parts replacement times displaying screen 850 shown in FIG. 35, and on the sum of money for parts replacement displaying screen 860 shown in FIG. 36 with the graphic displays, so that the timing for parts replacement can easily be determined.

[Effects of the Production Management Supporting System]

As described above, in the embodiment described above, the parts state information concerning the operating state of replacement parts of each injection molding machine 300 is recognized with the operating conditions recognizing section 531 from the operating state information concerning the operating state of the injection molding machine 300; the cumulative utilization such as the cumulative utilization time or cumulative utilization times for parts replacement is recognized based on this parts situation information; further the available state in which the required parts is available is recognized based on the cumulative utilization determined with reference to the lifetime information concerning a lifetime of the parts stored in the center storage section 501b; and the information is displayed on the center terminal displaying section 503 according to the necessity. Because of this feature, the cumulative utilization of each parts changing in response to the operating condition of the injection molding machine 300 can easily be recognized, and for instance, even in a case where the operating conditions of the injection molding machines 300 each having a plurality of parts each requiring the lifetime management are different from each other, expiration of the lifetime of each replacement parts can easily be estimated, and it is possible to prevent the accident in which operation of the injection molding machine 300 is stopped due to damages of any replacement parts or in which a parts still fully available is replaced with a new one, which in turn enables efficient replacement of each parts and easy management of the operating state.

The available time information concerning the available time of each parts or the available times information concerning the available times of each parts is stored as lifetime information in the center storage section 501b; the cumulating utilization is recognized by computing the cumulative utilization time or cumulative utilization times for actual utilization of the parts with the operating condition recognizing section 531; and further the available state is recognized by computing a time difference between the cumulative utilization time and the available time information or a difference between the cumulative utilization times and the available times information. Because of this feature, the available time of each parts can easily be recognized by simple data processing, which enables simplification of the system as well as system construction, and further because of reduction of a work load for data processing in the system, the data processing can easily be carried out at a high speed, which enables management of the operating state under stable conditions.

The available state recognized by the operating condition recognizing section 531 is displayed by the replacement parts display controlling section 551e on the center terminal displaying section 503 with a different display format respectively according to availability of each parts. More specifically, the availability information is displayed with different colors as expiration of the parts is coming near. Because of this configuration, the state of availability until expiration of each parts can easily and visually be recognized at a glance, which enables easy management of the operating state.

Further with the guidance preparing section 560, it is possible to generate a signal for placement of an order for a parts based on the available state recognized in the operating condition recognizing section 531 and to transmit the signal to a terminal device of a manufacture of the parts with the center communicating section 510 according to the necessity, or to place the order by means of facsimile, and also to have a slit required for placement of the order printed. Because of this feature, the order processing for placing an order for a parts can easily be carried out according to a changing situation until expiration of lifetime of the parts, so that out of stock never occurs, and in addition, replacement of parts can be carried out at a preferable timing according to, for instance, the operating condition, which enables easy management of the operating state, automation, and promotion of utilization.

The center storage section 501b has the configuration based on a table structure in which specific parts information set for each replacement parts indicated by the parts state information is correlated to machine-specific information set for each replacement parts indicated by the parts state information and corresponding to the injection molding machine 300 including the replacement parts and is recorded as one record. Because of this feature, the operating state of each replacement parts is correlated to the operating state of each injection molding machine, so that lifetime management for each replacement parts and data processing for lifetime management can easily be carried out, which enables simplification of the system configuration and easy system, and further because of reduction of a work load for data processing in the system, the data processing can be executed at a higher rate, so that management of the operating state can be carried out under stable conditions.

Further, time information concerning the data and hour when each replacement parts is replaced is acquired with the machine information acquiring section 520, and the time information is correlated to the parts information concerning the parts and is stored in the center storage section 501b. When a prespecified signal is recognized with the replacement parts displaying section 551e, for instance, in response to a prespecified input operation with the center terminal input section 502, the parts replaced at the prespecified timing is displayed on the center terminal displaying section 503 like on, for instance, the parts replacement times displaying screen 850 shown in FIG. 35. Because of this feature, situation of parts replacement can easily be recognized.

Further the parts price information concerning a unit price of a parts is acquired with the machine information acquiring section 520, and the parts price information is correlated to the parts information for the parts and is stored in the center storage section 501b. Then, with the replacement parts displaying section 551e, and based on the machine-specific information, parts information, and parts price information, at least either one of the times of replacement of each replacement parts in each injection molding machine 300 and a total price of the replaced parts is displayed on the center terminal displaying section 503, like on, for instance, the sum of money for replacement parts displaying screen 860. Because of this feature, situation of replacement of each replacement parts and the cost for replacement can easily be recognized.

With the machine information acquiring section 520, the replacement cause information concerning a cause for replacement of a parts is acquired, and is stored in the center storage section 501b in correlation to the parts information for the parts. Then, when a prespecified signal is recognized by the replacement parts displaying section 551e in response to an input operation with the center terminal input section 502, the cause for replacement of the parts is displayed on the center terminal displaying section 503 based on the replacement cause information and time information like on, for instance, the parts replacement reason displaying screen 840 shown in FIG. 34. Because of this feature, the situation of parts replacement can easily be recognized.

On the replacement record data input displaying screen 800 for generating record information concerning replacement of each parts shown in FIG. 29, image data for the parts to be replaced or a procedure for replacement of the parts can be displayed. Because of this feature, placement of an order for or delivery of a parts, and further a work for replacement of the parts can easily be performed.

On the other hand, from the controlling terminal device 400 provided for each injection molding machine 300 for controlling the operating state of the injection molding machine 300 by acquiring the operating state information concerning the operating state of the injection molding machine 300, the operating state information is acquired by the machine information acquiring section 520 together with the time information concerning the date and hour when the operating state information is acquired, and the operating condition of the injection molding machine 300 is determined by the operating condition recognizing section 531 based on the operating state information. Then the display controlling section 550 provides controls so that the changes in the operating conditions of the injection molding machine 300 is displayed as a function of elapse of time on the center terminal displaying device 503 with a different format for each operating condition respectively. Because of this feature, shift of operating condition of the injection molding machine 300 can easily be checked, which enables easy management of the operating state.

Then the display controlling section 550 provides controls so that the operating conditions determined discretely is displayed on the center terminal device 503 based on the operating state information acquired from a plurality of controlling terminal devices 400. Because of this feature, operating conditions of the plurality of controlling terminal devices 400 can be checked in batch, which enables easy management of the operating state.

The display controlling section 550 provides controls so that changes of types of products manufactured by the injection molding machines 300 at each point of time are displayed as a function of elapse of time together with changes in the operating conditions of the injection molding machines 300 with different display formats for product types respectively. Because of this feature, the relation between the operating condition and types of products to be manufactured can easily be recognized, which makes it possible to easily set a production plan for manufacturing various types of products and also to easily administer the production system.

Further the display controlling section 550 provides controls so that changes of types of feed stocks used for manufacturing products with the injection molding machines 300 are displayed in correlation to changes in the operating conditions as well as to elapse of time with different display formats for the types of used feed stocks respectively. Because of this feature, the relation between the operating conditions and types of feed stocks can easily be recognized, which enables, for example, easy feed stock management and improved production system management.

Further the operating state information concerning the operating state of the injection molding machines 300 is acquired by the machine information acquiring section 520 from the controlling terminal device 400 provided for each of the injection molding machines 300, and the operating condition of each of the injection molding machines 300 is determined by the operating condition recognizing section 531 based on the operating state information. Then the list displaying section 551b of the display controlling section 550 provides controls so that a plurality of sections 716 having screens 716a displaying conditions of the injection molding machines 300 with different display formats, namely with different colors for the operating conditions respectively are displayed in a form of a list on the center terminal displaying section 503. Because of this feature, operating conditions of a plurality of injection molding machines 300 can be checked in batch, and therefore operating state of a plurality of injection molding machines 300 can be managed in batch, which enables easy management of the operating state of a plurality of injection molding machines 300.

An object for the operating state management is the injection molding machine 300 which runs automatically, and even in a case of the injection molding machine 300 which is generally automatically run days and nights continuously, the operating condition, acceptability of products manufactured by the injection molding machine 300, utilization of parts, and other factors concerning the operating state can easily be recognized, which enables easy management of the operating state. Further in the injection molding machine 300 which cyclically repeats operations for manufacturing products, a correlation coefficient with any previous cycle can be computed, so that an especially excellent correlation is insured.

Further, the operating state information for each cycle is acquired from the injection molding machine 300 which cyclically repeats operations for manufacturing products. Because of this feature, acceptability of each manufactured product can be determined based on the operating state information for each cycle, which makes it easier to determine acceptability of each manufactured product.

The display controlling section 550 provides controls so that operating conditions of the injection molding machines 300 are displayed with different colors respectively on the screens 716a in the section 716. Because of this feature, operating conditions of a plurality of injection molding machines 300 can visually be checked at a glance, and therefore it is possible to manage the operating state of each of the injection molding machines 300 with the simple configuration.

Further the display controlling section 550 provides controls so that a plurality of sections 716 are classified in display to a plurality of groups classified according to at least one of a line of the injection molding machine 300, each operating state in production of each product, or the characteristics of each injection molding machine 300 such as the type. Because of this feature, the operating state of the injection molding machines 300 is managed by the operating state of each injection molding machine 300 or by a type of each injection molding machine 300, which enables systematic management of the injection molding machines 300 and insures improvement of efficiency in the operating state management.

Further the machine displaying section 551a of the display controlling section 550 provides controls so that detailed contents of the operating state information for the injection molding machine 300 corresponding to the sections 716 selected in response to an input operation with the center terminal input section 502 among those displayed on the list displaying section 551b as the machine list display screen 710 on the center terminal displaying section 503 is displayed as the machine detail displaying screen 730. Because of this feature, as the detailed contents of the operating state information for each of the injection molding machines 300 is displayed from the section 716 for each of the injection molding machines 300 displayed in the list form, and therefore the detailed operating state of the injection molding machine 300 can be recognized, which insures further improvement in management of operating state of each injection molding machine 300.

The bar display 723 is provided for displaying the operating condition in correlation to changes in the operating conditions time from time on the group displaying screen 720 or on the machine detail displaying screen 730. Because of this feature, shift of the operating condition of each injection molding machine 300 can easily be checked, which insures improvement in management of the operating state with the simple configuration.

Such information as that for occurrence of a failure or contents of the failure, and expected expiration of lifetime of a replacement parts can be transmitted as an electronic mail to, for instance, a mobile telephone terminal owned by a manager according to the conditions set on the mail information setting displaying screen 950 of the server device 600. Because of this feature, even in the injection molding machine 300 which is generally run automatically days and nights, occurrence of a failure or contents of the failure can easily be recognized, which allows a quick response to the failure and enables improvement in management of the operating state.

Further, even when the manager is away from the center management terminal device 500, by making use of transmission of an electronic mail to report occurrence of a failure or utilization of any parts, the manager can recognize occurrence of the failure or utilization of the parts without the need of directly recognizing displays on the center terminal displaying section 503, which insures further improvement in management of the operating state of the injection molding machine 300.

The system components are connected to each other via the network 200 so that information transaction can freely be carried out, and therefore even the operating state of a plurality of injection molding machines 300 can be managed intensively with the simple system configuration, so that it is easy to increase or reduce a number of injection molding machines 300 to be managed, which allows management corresponding to the current situation and application of the management supporting system according to the present invention in a more extensive range.

With the system configuration, a display format for the operating state to be managed by the center management terminal device 500 is set in the server device 600, and therefore, even with the system configuration in which a plurality of center management terminal devices 500 are connected to each other via the network 200 so that management of the operating state can be carried out in each department or division, the production management supporting system 100 can intensively be controlled by the server device 600, so that systematic management of the production management supporting system 100 can easily be carried out with its adaptability to be administered being further improved.

The production management supporting system 100 is configured by installing application software for the production management supporting system 100 in the center management terminal device 500 or in the server device 600, and therefore the production management supporting system 100 can easily be built only by installing the application software with, for instance, a general-purpose computer, which enables its utilization in a wide area.

Further by storing the application software for the production management supporting system 100 in a recording medium such as an optical disk, handling of the application software is quite easy, which also enables utilization of the production management supporting system 100 in a wide area. Also by down-loading the application software by means of communication, the software can easily be installed, which also enables utilization of the production management supporting system 100 in a wide area.

On the other hand, acceptability of each manufactured product is determined by the data computing section 540 by means of determination of histogram distribution, and the determination is carried out by acquiring the operating state information from the controlling terminal device 400 provided for each injection molding machine 300 manufacturing products for controlling the operating state of the injection molding machine 300 by acquiring the operating state information concerning the operating state of the injection molding machine 300 and also by computing the histogram with the distribution function computing section 543 based on the operating state information. Because of this feature, state of products manufactured by a plurality of injection molding machines 300 can be recognized in batch, and therefore even the operating state of a plurality of injection molding machines 300 can easily be managed.

The data computing section 540 determines as acceptable a product manufactured with the operating state information within a prespecified range of a reference value information which is a distribution range of the operating state information set on the trend chart displaying screen 160 in response to an input operation with the center terminal input section 502. Because of this feature, acceptability of each manufactured product can easily be determined based on the operating state information.

The display controlling section 550 provides controls so that the histogram computed by the data computing section 540 is displayed on the center terminal displaying section 503 in the graphic form. Because of this feature, situation of the determination concerning acceptability of each manufactured product can easily be recognized in the graphic form, which enables easy management of the operating state.

In addition, the operating state information is acquired together with the time information concerning the data and hour when the operating state information is generated in each injection molding machine 300, and a histogram for a prespecified period of time is computed or a graphic display for a prespecified period of time is provided based on the time information. Because of this feature, when a trial run is carried out for setting conditions for controlling the controlling terminal device 400 for switching a type of products to be manufactured or for switching the feed stock to be manufactured, or when the operating state is to be checked just after start of its operation for switching a type of products to be manufactured or for switching the feed stock to be manufactured, acceptability of products manufactured during a prespecified period of time can easily be checked, so that changes in the operating state during the prespecified period of time can easily be recognized, which enables easy management of the operating state.

Further a record on changes in contents of controls provided by the controlling terminal device 400 based on a result of determination of acceptability of each manufactured product by the data computing section 540 for controlling operations of each injection molding machine 300 is stored as record information in the center storage section 501b or in the server storage section 601b. Because of this feature, in addition to the operating state information, also information concerning the changes in contents of controls by the controlling terminal device 400 is accumulated in association with passage of time, and it becomes easier to set contents of controls by using the record information for setting contents of controls by the controlling terminal device 400, which also enables easy management of the operating state.

Further this record information is displayed on the log information displaying screen 210 with a different display format from that for the operating state of the injection molding machine 300. Because of this feature, changes in contents of controls can visually be checked in batch, so that the record information can easily be used for setting contents of controls by the controlling terminal device 400 for manufacturing acceptable products, which insures further improvement in management of the operating state.

The production achievement ratio computing section 541 generates a production achievement ratio by computing a percentage of a quantity of acceptable products indicating a quantity of products determined as acceptable based on the latest operating state information acquired from the controlling terminal device against s total shot number indicating a quantity of products to be manufactured set on the machine detail displaying screen 730 in response to an input operation with the center terminal input section 502. Because of this feature, the current situation of production can easily be checked.

The display controlling section 550 provides controls so that the achievement ratio data generated by the production achievement ratio computing section 541 is displayed as a percentage against the time from start of the production until completion of the production set in the machine detail displaying screen 730 on the center terminal displaying section 503 in the form of bar display 716e. Because of this feature, the situation of production at the current point of time can easily and visually be checked at a glance, which enables easy management of the operating state.

The machine information acquiring section 530 acquired a plurality of operating state information from the controlling terminal device 400 provided for each of the injection molding machines 300 each manufacturing products through operations for manufacturing a product as one cycle and controlling the operating state of the injection molding machines 300, and the correlation coefficient computing section 542 computes a correlation coefficient between the plurality of operating state information acquired as described above by comparing one cycle including in one operating state information to another cycle including in the other operating state information. Because of this feature, for instance, in the injection molding machine 300 repeating a feed stock weighing step, an injecting step, a cooling step, a die-opening step, -a take-out step, and a die-closing step, assuming that the take-out step for taking out a production is a staring point of one cycle, one cycle consists of the die-closing step, feed stock weighing step, injecting step, cooling step, and die-opening step, and the production cycle for manufacturing an actual product is the cycle consisting of the weighing step, injecting step, cooling step, and die-opening step in the cycle just ahead the die-closing step, and thus by computing the operating state information in any previous step and a correlation coefficient therewith, a more appropriate correlation coefficient is obtained, which enables improved management of the operating state in the injection molding machines 300.

The display controlling section 550 provides controls so that a result of computing by the correlation coefficient computing section 542 is displayed either as a numerical display or a graphic display, switching according to the necessity, on the center terminal displaying section 503. Because of this feature, the state of obtained correlation coefficient can easily be recognized, which enables easy management of the operating state of the injection molding machine 300.

Further the display controlling section 550 provides controls so that the correlation coefficient is displayed on the center terminal displaying section 503 with a different display format, namely, for instance, with a different color for a different degree of correlation. Because of this feature, the degree of correlation can easily be recognized based on the correlation coefficient, which enables easy management of the operating state of the injection molding machine 300.

Further information concerning the fact that contents of controls by the controlling terminal device 400 has been changed according to the correlation coefficient computed by the correlation coefficient computing section 542 is stored, namely memorized as record information in the center storage section 501b or the server storage section 601b. Because of this feature, information concerning changes in contents of controls by the controlling terminal device 400 is accumulated, and the accumulated information can be used as record information for setting contents of controls by the controlling terminal device 400, which makes it easier to set contents of controls by the controlling terminal device 400 and enables easy management of the operating state.

The image data displayed on the controlling terminal displaying section 420 displaying situation of the controls by the controlling terminal device provided for each injection molding machine 300 and controlling the operating state of the injection molding machine 300 by acquiring the operating state information concerning the operating state of the injection molding machine 300 is acquired using the Internet protocol (IP) via the network 200, and is displayed by the display controlling section 550 on the centre terminal display section 503. Because of this feature, the same display as that on the controlling terminal displaying section 420 can be checked with the simple configuration without the need of directly checking the controlling terminal displaying section 420 of the controlling terminal device 400, and this configuration is especially effective when the operating state of a plurality of controlling terminal devices 400 is to be checked, which enables easy management of the operating state.

The message information prepared by the guidance preparing section 560 in response to an input operation with the centre terminal input section 502 is transmitted by the center communicating section 510 via the network 200 to a pre-specified controlling terminal device 400 so that the message information is displayed thereon, namely so that the message information is displayed on the controlling terminal displaying section 420. Because of this configuration, namely as the message information is sent to the controlling terminal device 400, it is possible to send a message, for instance, to an operator responsible for maintenance of the controlling terminal device 400, which enables quick communications. Especially a communication network for message transaction via a communication network to which a plurality of controlling terminal devices 400 are connected can be established, which makes it possible to manage the operating state under stable conditions. Further the network 200 is used for acquiring image data, complicated configuration is not necessary, which also enables establishment of a stable communication network.

The operating state information, parts information or the like acquired by the machine information acquiring section 520 is transmitted by the center computing section 501a via the network 200 to, for instance, a mobile telephone terminal or a PDA (Personal Digital Assistant) not shown and owned by a manager responsible for management of the operating state of the machine. Because of this feature, the operating state or utilization of any parts can be recognized without the need of recognizing displays on the center terminal displaying section 503 or on the server device 603, which insures improved management of the operating state of the injection molding machine 300.

Further the center computing section 501a recognized the operating state of the injection molding machine 300 based on the operating state information, and transmits the operating state information to a communication terminal when at least either one of the fact that operation of the injection molding machine 300 has been started and the fact that operation of the injection molding machine 300 has been stopped. Because of this configuration, the staring phase in which the operating state is not stable, occurrence of a failure, end of production or the like can easily be recognized, which enables the improved efficiency in management of the operating state without the need of always monitoring the operating state information.

The server device provides controls for adjusting clocking in a clocking section of the controlling terminal device 400 or the center management terminal device 500 according to the necessity. Because of this feature, the operating state information can be processed at an accurate timing, which enables accurate management of the operating state in the term of timing.

Further the worldwide standard time is used as the reference for clocking in the server device 600, so that the production management supporting system according to the present invention can be used not only in Japan, but also in foreign countries, which insured the availability in a wide area.

[Variants of the Embodiment]

The present invention is not limited to the embodiment described above, and includes the following variants within a range in which the objects of the present invention can be achieved.

Namely, the above description assumes use of the injection molding machine 300 as a machine, the operation state of which is to be managed, but the machine to which the present invention is applicable is not limited to the injection molding machine 300, and the present invention can be applied to any type of manufacturing machine, and further the present invention may be applied to management of the operating state of any type of machine other than the manufacturing machines. Further the present invention may be applied not only to machines like the injection molding machine 300 capable of automatically running, but other types of machines which run semi-automatically or are operated manually.

Further the operating state information is not limited to information concerning situation or production, and any information concerning operations of machine may be used in the present invention.

Although description of the embodiment above assumed the system configuration also including the server device 600, the configuration is allowable in which the center management terminal device 500 execute the same functions as those by the server device and the independent service device 600 is not provided.

Further, a number of units of the center management terminal devices 500 is not limited to one, and a plurality of units of center management terminal are connected thereto.

The same display as that provided on the center terminal displaying section 503 may be provided on the service displaying section 603 of the server device 600 so that management of the operating state can be performed also with the server device 600.

In the embodiment described above, controls are provided so that the contents set on the machine master setting displaying screen 920 of the server device is displayed on the machine list displaying screen 710, and the section 716 corresponding to the injection molding machine 300 connected to the controlling terminal device 400, or to the injection molding machine 300 not having been set is displayed with a gray color, but the configuration is allowable in which the section 716 corresponding to the injection molding machine 300 not running is displayed with a gray color, or in which the section corresponding to the injection molding machine 300 now running is displayed with a gray color, and thus contents of displays to be displayed with different display formats corresponding to different operating states respectively may be set freely according to the necessity.

For instance, a scroll allow provided on the displaying screen shown, for instance, in FIG. 25 may be provided on the machine list displaying screen 710 shown or the group displaying screen 720 shown, for instance, in FIG. 6, so that the sections 716 are displayed in the scrollable state.

Further 24 pieces of sections 716 can be displayed in the embodiment described above, but a number of the sections 716 shown in the lift form is not limited. Controls may be provided so that an area in which the sections 716 are display can be expanded or shrunk to fill the displaying screen with the displayed sections 716. With this configuration, the size of each section 176 is varied according to the size of a display area on the center terminal displaying section 503 and the sections 716 are displayed throughout the display area, and therefore the operating state of the injection molding machines 300 can visually be checked at a glance with the simple configuration, which enables improved and easier management of the operating state.

A display format of the sections 716 is not limited to that described above, and the sections 716 may be displayed with any display format on the condition that there is provided a display area such as the screen 716*a* for displaying operating conditions of the injection molding machines 300 with different display formats each corresponding to one specific operating condition respectively. More specifically, a display format not including the text boxes 716*b*, 716*c*, 716*d* or the progress bar 716*e* is allowable, and a display format accompanying other operating state information is also allowable.

The description of the embodiment above assumes the configuration in which the group display is divided to two ones classified according to a serial number of each machine, but for instance the configuration is allowable in which the injection molding machines 300 are used as machines for manufacturing products from the supplied feed stock, and the display controlling section 550 provides controls so that the sections 716 are displayed as a plurality of groups for each of the groups classified according to at least one of a type of the feed stock and a type of products to be manufactured. With this configuration, the operating state of the injection molding machine 300 is managed according to classified types of feed stocks for the injection molding machine 300 or to classified types of products to be manufactured thereby, which enables systematic management of the operating state and allows easy management of the operating state with a higher efficiency. Further a text box for setting a number of displays may be provided so that the number of displays can be changed.

Description of the embodiment above assumes the configuration in which the sections displaying operating states of the injection molding machines 300 are displayed in the complete list form on the machine list displaying screen 710, but the display controlling section 550 may provide controls so that the sections 716 are displayed in the list form looking like a map reflecting actual arrangement of the injection molding machines 300. With this configuration, the actual arrangement of the injection molding machines 300 corresponds to the displayed arrangement of the sections 716, which enables easy management of the operating state of the injection molding machines 300 with the simple configuration.

With the configuration as described above, for instance, a drawing of a premise where the injection molding machines are installed is prepared on or read by the machine master setting displaying screen 920 of the server device 600, and the drawing is converted to, for instance, image data to acquire image data for the premise. Also the configuration is allowable in which the setting sections 921 are provided on the image data displaying the premise at positions corresponding to the actual positions of the injection molding machines 300, and the machine list displaying screen displayed on the center terminal displaying section 503 is set by setting necessary data on each text box in the setting section 921.

Further as a display in the list form, the displays may be displayed group by group each reflecting a type of products to be manufactured or a type of supplied feed stock.

Description of the embodiment above assumes a case where different operating conditions are displayed with different background colors of the screen 716*a* respectively, but not only colors, but also figures such as a inclined line or a dotted line, characters such as "Emergency Stop", and flashing displays such as blinking or lighting-up may be used to provide different display formats. Further the configuration for displaying operating conditions is not limited to those on the screen 716*a*, and any method including a display with characters may be employed.

Display of classified groups is not limited to that on the group displaying screen 720.

Further display of the machine detail displaying screen 730 is not always required.

In the embodiment described above, name of items, displayed data and other explanations on displaying screen are described in Japanese, but it is allowable in other language i.e. English, Spanish, Chinese or another. The displaying language may be set freely according to the necessity.

The method of providing a display in the list form is not limited to that on the machine list displaying screen 710, and any format may be used for that purpose.

What is claimed is:

1. A management supporting apparatus, comprising:
   a machine information acquiring section for acquiring operating state information from a controlling terminal device provided for each machine and for acquiring state information including parts state information relating to the operating state of parts constituting the machine to control the operating state of the machine;
   a storage section for storing therein lifetime information concerning lifetime of the parts;
   a parts utilization recognizing section for recognizing cumulative utilization of the parts based on the parts state information; and
   a lifetime determining section for determining the availability in which the parts can be utilized based on the cumulative utilization with reference to lifetime information stored in the storage section.

2. The management supporting apparatus according to claim 1, wherein said storage section stores utilizable time information concerning the utilizable time of the parts or utilizable times information concerning the utilizable times of the parts as the lifetime information; said parts utilization recognizing section recognizes cumulative utilization of the parts by computing cumulative utilization time or cumulative utilization times of parts used for operation; and said lifetime determining section recognizes the availability by computing a difference between the utilizable time information and the cumulative utilization time or a difference between the utilizable times information and the cumulative utilization times.

3. The management supporting apparatus according to claim 1, further comprising a display controlling section for having the availability information recognized by said lifetime determining section displayed with various display formats on a displaying section in response to the availability of the parts.

4. The management supporting apparatus according to claim 1, further comprising a purchase order controlling section for outputting a signal for purchase order of the parts based on the availability recognized in said lifetime determining section.

5. The management supporting apparatus according to claim 1, wherein said operating state information includes machine-specific information prepared for each machine; said parts state information includes parts information specific to each parts; and said storage section is configured with a table structure in which the parts information for the parts utilized in the machine corresponding to the machine-specific information is correlated to the machine-specific information and is stored as one record.

6. The management supporting apparatus according to claim 5, further comprising:
   a parts information acquiring section for acquiring time information relating to the date and hour at which the parts is replaced with a new one, and storing the time information in correlation to the parts information in the storage section; and
   a display controlling section for having the parts replaced with a new one at the prespecified time displayed on the displaying section based on the parts information as well as the time information stored in said storage section when a prespecified signal is recognized.

7. The management supporting apparatus according to claim 6, wherein said parts information acquiring section acquires replacement cause information concerning a cause for replacement of the parts and stores the information in said storage section in correlation to the parts information, and said display controlling section has the cause for replacement of the parts replaced at the prespecified time displayed on the display section based on the replacement cause information and the time information when a prespecified signal is recognized.

8. The management supporting apparatus according to claim 5, further comprising:
   a parts information acquiring section for acquiring parts price information concerning a unit price of the parts and storing the parts price information in correlation to the parts information in said storage section; and a display controlling section for having at least either one of the times of parts replacement and a total price of the replaced parts for each machine displayed on the displaying section based on the machine-specific information, parts information, and parts price information stored in the storage section when a prespecified signal is recognized.

9. The management supporting apparatus according to claim 1, wherein said machine is automatically driven under control by a controlling terminal device.

10. The management supporting apparatus according to claim 1, wherein said machine is an injection molding machine.

11. The management supporting apparatus according to claim 1, further comprising a reporting section for alerting the necessity of the replacement of parts by recognizing that the availability of the parts recognized by said lifetime determining section has reached the prespecified limit.

12. The management supporting apparatus according to claim 11, wherein said reporting section alerts the necessity of replacement of the parts by distributing the information indicating the necessity by means of an electronic mail.

13. A management supporting system, comprising the management supporting apparatus according to claim 1, and a controlling terminal device which is connectable via a network to said management supporting apparatus, allowing information transaction, and provided for each machine to control the operating state of the machine by acquiring the operating state information in relation to the operating state of the machine.

14. A management supporting method, comprising:
   acquiring the operating state information from a controlling terminal device provided for each machine by a computing section and controlling the operating state of the machine by acquiring state information including parts state information relating to the operating state of parts constituting the machine; and
   recognizing cumulative utilization information used for operations of the parts based on the parts state information of the acquired operating state information; wherein the availability of the parts is recognized based on the recognized cumulative utilization of lifetime information compared to the previously acquired lifetime information concerning lifetime of the parts.

15. A management supporting program which, when executed by the computing section, performs the management supporting method according to claim 14.

16. A storage medium on which the computing section has readibly recorded the management supporting program according to claim 15.

17. A management supporting apparatus, comprising:
   a machine information acquiring section for acquiring operating state information from a controlling terminal device provided for each machine and controlling the operating state of the machine by acquiring state information relating to the operating state of the machine;
   a displaying section capable of displaying the operating state information acquired by said machine information acquiring section;
   an operating condition recognizing section for determining an operating condition of the machine based on the operating state information; and
   a display controlling section having a display area in which the operating condition determined by said operating condition recognizing section is displayed with a different display format for each operating condition for providing controls so that a plurality of sections each corresponding to each machine are displayed in a list form on said displaying section.

18. The management supporting apparatus according to claim 17, wherein said display controlling section provides controls so that each type of operating condition is displayed with a different color on a display area of the corresponding section.

19. The management supporting apparatus according to claim 17, wherein said display controlling section provides controls so that a plurality of sections are displayed for each of the categories classified according to at least one of the operating state of the machine or the characteristics of the machine.

20. The management supporting apparatus according to claim 19, wherein said machine is a manufacturing machine for manufacturing products from the feed stock, and said display controlling section provides controls so that the plurality of sections are displayed in the list form for each of the categories classified according to at least one of a type of the machine or a type of the product.

21. The management supporting apparatus according to claim 17, further comprising an input section capable of selecting the section to be displayed on the displaying section in response to an input operation, wherein said display controlling section provides controls so that the contents of operating state information for the machine corresponding to the selected section by the input section in response to the input operation is displayed.

22. The management supporting apparatus according to claim 17, wherein said display controlling section provides controls so that the sections are displayed according to an arrangement in which the machines are installed.

23. The management supporting apparatus according to claim 17, wherein said display controlling section sets the size of a display of the section on the displaying section according to the necessity and provides controls so that all of the sections to be displayed are placed within a display area of said displaying section.

24. The management supporting apparatus according to claim 17, wherein said display controlling section provides controls so that the display format for each operating condition varies according to elapse of time during the operation.

25. The management supporting apparatus according to claim 17, wherein the machine runs automatically under controls by the controlling terminal device.

26. The management supporting apparatus according to claim 25, further comprising an abnormality reporting section for reporting, when the operating condition recognizing section recognizes occurrence of any abnormality in the operating condition of the machine, either one of the fact that the abnormality has occurred or contents of the abnormality.

27. The management supporting apparatus according to claim 26, wherein said abnormality reporting section displays, for reporting, at least either one of the fact concerning occurrence of the abnormality or contents of the abnormality on said displaying section by said display controlling section.

28. The management supporting apparatus according to claim 26, wherein said abnormality reporting section transmits, for reporting, at least either one of the fact concerning occurrence of the abnormality or contents of the abnormality by making use of an electronic mail.

29. The management supporting apparatus according to claim 17, wherein the machine is an injection-molding machine.

30. A management supporting system, comprising:
the management supporting apparatus according to claim 17; and
a controlling terminal device which is connectable via a network, allowing information transaction, to said management supporting apparatus and provided for each machine to control the operating state of the machine by acquiring the operating state information in relation to the operating state of the machine.

31. The management supporting system according to claim 30, further comprising a server equipment which is connectable via a network, allowing information transaction, to said management supporting apparatus and sets the section to be displayed by controlling said displaying section by means of the display controlling section of said management supporting apparatus.

32. The management supporting system according to claim 31, wherein said server equipment is provided with a clocking section for clocking, and executes the processing for matching with the time clocked in at least one of the either said controlling terminal device or said management supporting apparatus.

33. A management supporting system, comprising the management supporting apparatus according to claim 17 and a server which is connectable via a network, allowing information transaction, to said management supporting apparatus and sets the section to be displayed by controlling said displaying section by means of the display controlling section of said management supporting apparatus.

34. The management supporting system according to claim 33, wherein said server equipment is provided with a clocking section for clocking, and executes the processing for matching with the time clocked in at least one of the either said controlling terminal device or said management supporting apparatus.

35. A management supporting method, comprising:
acquiring the operating state information from a controlling terminal device provided for each machine, said controlling terminal device acquires the operating state information concerning the operating state of the machine by means of a computing section to operate the operating state of the machine; and
determining an operating condition of the machine based on the acquired operating state information; wherein a section has a display area in which the determined operating condition is displayed with a different format for each operating condition so that a plurality of sections each corresponding to each machine are displayed in a list form on a displaying section.

36. A management supporting program which, when executed by the computing section, performs the management supporting method according to claim 35.

37. A storage medium on which the computing section has readibly recorded the a management supporting program according to claim 36.

38. A management supporting apparatus, which is connectable via a network to a controlling terminal device, having a controlling terminal displaying section provided for each machine, for acquiring operating state information concerning the operating state of the machine to control the operating state of the machine and also displaying the control situation thereon, for allowing information transaction to receive and process the operating state information, comprising a display controlling section for acquiring image data displayed on the controlling terminal displaying section using the Internet protocol (IP) to have the image data displayed on the displaying section.

39. The management supporting apparatus according to claim 38, further comprising:
a message information preparing section for preparing message information; and
a communicating section for transmitting the prepared message information via a network to the controlling terminal device so that the message information is displayed on the controlling terminal displaying section of the controlling terminal device.

40. The management supporting apparatus according to claim 38, further comprising:
a machine information acquiring section for acquiring operating state information from said controlling terminal device; and
a computing section for transmitting the operating state information acquired by the machine information acquiring section via a network to a communication terminal.

41. The management supporting apparatus according to claim 40, wherein said computing section transmits the operating state information to the communicating terminal by recognizing the operating state of the machine based on the operating state information and also by recognizing at least either start or stop of running of the machine.

42. A management supporting system, comprising:
the management supporting apparatus according to claim 38; and
a controlling terminal device, which is connectable via a network to said management supporting apparatus to allow information transaction and has a controlling terminal displaying section provided for each machine, for acquiring operating state information concerning the operating state of the machine to control the operating state of the machine and also displaying the control situation thereon.

43. The management supporting system according to claim 42, further comprising a server equipment, which is connectible via a network to said management support apparatus to allow information transaction and sets an operation of said management supporting apparatus.

44. The management supporting system according to claim 43, wherein said server equipment is provided with a clocking section for clocking, which executes the processing for matching with the time clocked in at least one of the either said controlling terminal device or said management supporting apparatus.

45. A management supporting system, comprising:
the management supporting apparatus according to claim 38; and
a server equipment, which is connectible via a network to said management support apparatus to allow information transaction and sets an operation of said management supporting apparatus.

46. A management supporting apparatus, which is connectable via a network to a controlling terminal device having a controlling terminal displaying section provided for each machine, for acquiring operating state information concerning the operating state of the machine to control the operating state of the machine and also displaying the control situation thereon, for allowing information transaction to receive and process the operating state information, comprising:
a message information preparing section for preparing message information; and
a communicating section for transmitting the prepared message information via a network to said prespecified controlling terminal device so that the message information can be displayed on the controlling terminal displaying section of said controlling terminal device.

47. The management supporting apparatus according to claim 46, further comprising:
a machine information acquiring section for acquiring the operating state information from said controlling terminal device; and
a computing section for transmitting the operating state information acquired by the machine information acquiring section via a network to a communication terminal.

48. The management supporting apparatus according to claim 47, wherein said computing section transmits the operating state information to the communicating terminal by recognizing the operating state of the machine based on the operating state information and also by recognizing at least either start or stop of running of the machine.

49. A management supporting system, comprising:
the management supporting apparatus according to claim 46; and
a controlling terminal device which is connectable via a network to said management supporting apparatus to allow information transaction and has a controlling terminal displaying section provided for each machine, for acquiring operating state information concerning the operating state of the machine to control the operating state of the machine and also displaying the control situation thereon.

50. The management supporting system according to claim 49, further comprising server equipment which is connectible via a network to said management support apparatus to allow information transaction and sets an operation of said management supporting apparatus.

51. The management supporting system according to claim 50, wherein said server equipment is provided with a clocking section for clocking, which executes the processing for matching with the time clocked in at least one of the either said controlling terminal device or said management supporting apparatus.

52. A management supporting system, comprising the management supporting apparatus according to claim 46; and a server equipment, which is connectible via a network to said management support apparatus to allow information transaction and sets an operation of said management supporting apparatus.

53. A management supporting method, comprising:
acquiring image data displayed on said controlling terminal displaying section by using the Internet Protocol (IP) from a controlling terminal device having a controlling terminal displaying section provided for each machine, for acquiring the operating state information concerning the operating state of the machine by means of a computing section to control the operating state of the machine as well as to display the control situation thereon; and
having the acquired image data displayed on the displaying section.

54. A management supporting program which, when executed by the computing section, performs the management supporting method according to claim 53.

55. A storage medium on which the computing section has readibly recorded the management supporting program according to claim 54.

56. A management supporting method, comprising:
receiving the operating state information concerning the operating state of the machine via a network from a controlling terminal device having a controlling terminal displaying section provided for each machine, for acquiring the operating state information concerning the operating state of the machine by means of a computing section to control the operating state of the machine as well as to display the control situation thereon; and
processing the received information, wherein the prepared message information is transmitted via a network to the prespecified controlling terminal device so that the message information is displayed on the controlling terminal displaying section in the controlling terminal device.

57. A management supporting program which, when executed by the computing section, performs the management supporting method according to claim 56.

58. A storage medium on which the computing section has readibly recorded the management supporting program according to claim 57.

59. A management supporting apparatus, comprising:
a machine information acquiring section for acquiring operating state information from a controlling terminal device provided for each machine producing a product by acquiring the operating state information concerning the operating state of the machine to control the operating state of the machine;
a computing section for computing a histogram based on the operating state information acquired by this machine information acquiring section; and
an acceptability determining section for determining acceptability of the products by determining a distribution state in the histogram acquired by this computing section.

60. The management supporting apparatus according to claim 59, further comprising a distribution range setting section for setting a distribution range for the operating state information, wherein said acceptability determining section determines that the product is acceptable when the operating state information within the distribution range set by said distribution range setting section is generated in the machine.

61. The management supporting apparatus according to claim 59, further comprising a display controlling section for having the histogram computed by said computing section displayed in a graphic form on the displaying section.

62. The management supporting apparatus according to claim 61, wherein said display controlling section provides controls so that a result of determination for acceptability by said acceptability determining section is displayed with a different display format for each determination result of the product on said displaying section.

63. The management supporting apparatus according to claim 61, wherein said machine information acquiring section acquires the operating state information together with the time information concerning the date and hour when the operating state information is generated from the machine; and said display controlling section can provide controls for having a histogram within a prespecified period of time displayed in a graphic form based on the time information.

64. The management supporting apparatus according to claim 59, wherein said machine information acquiring section acquires the operating state information together with the time information concerning the date and hour when the operating state information is generated from the machine; and said computing section can compute a histogram for a prespecified period of time based on the time information.

65. The management supporting apparatus according to claim 59, further comprising a storage section for storing therein the information concerning the fact that contents of controls by said controlling terminal device has been changed based on a result of determination by said acceptability determining section as record information.

66. The management supporting apparatus according to claim 65, further comprising:
a display controlling section for having said record information displayed on the displaying section displayed with a different display format from that for the operating state of said machine.

67. The management supporting apparatus according to claim 59, wherein said machine repeats operations for manufacturing said product as one cycle, and said machine information acquiring section acquired said operating state information once for each cycle of the machine.

68. The management supporting apparatus according to claim 59 further comprising:
a production schedule setting section for setting a quantity of products to be manufactured; and
a computing section for generating an achievement ratio by computing a percentage of a quantity of said products determined as acceptable ones based on the latest operating state information acquired from the controlling terminal device against said quantity of products to be manufactured.

69. The management supporting apparatus according to claim 59, wherein said production schedule setting section can set data and hour for completion of the manufacturing work, and comprises:
a clocking for clocking date and hour; and
a display controlling section for having the achievement ratio information generated by said computing section as a percentage against the period of time from start of production until the scheduled date for completion of the production as a bar display on the displaying section.

70. The management supporting apparatus according to claim 59, wherein said machine is an injection molding machine.

71. The management supporting apparatus according to claim 59 further comprising:
a controlling terminal device provided for each machine and connected via a network to said management supporting apparatus in the state where information transaction can be carried out for acquiring the operating state information concerning the operating state of said machine to control the operating state of said machine.

72. The management supporting system according to claim 71 further comprising:
a server device connected via a network to said management supporting apparatus in the state where information transaction can be carried out for setting operations of said management supporting apparatus.

73. The management supporting system according to claim 72, wherein said server device comprising a clocking section for clocking and adjusting the time for clocking in at least one of said controlling terminal device and said management supporting apparatus.

74. A management supporting system comprising:
the management supporting apparatus according to claim 59; and
a server device connected via a network to said management supporting apparatus in the state where information transaction can be carried out for setting operations of said management supporting apparatus.

75. The management supporting system according to claim 74, wherein said server device comprises a clocking section for clocking and adjusting the time for clocking in at least one of said controlling terminal device and said management supporting apparatus.

76. A management supporting program which, when executed by the computing section, performs the management supporting method according to claim 75.

77. A management supporting method comprising:
acquiring operating information from a controlling terminal device provided for each machine manufacturing products for controlling the operating state of said machine by acquiring the operating state information concerning the operating state of said machine;
computing a histogram based on the acquired operating state information; and
determining acceptability of said products by determining a distribution state in the histogram acquired by computing.

78. A storage medium on which the computing section has readibly recorded the management supporting program according to claim 77.

79. A management supporting apparatus, comprising:
a machine information acquiring section for acquiring plurality operating state information for each cycle of manufacturing the products from a controlling terminal device provided for each machine for manufacturing the products assuming that the operation for manufacturing the products is one cycle, and acquiring plurality operating state information concerning the operating state of the machine to control the operating state of the machine; and
a correlation coefficient computing section for computing a correlation coefficient of the operating state information acquired by said machine information acquiring section, wherein said correlation coefficient computing section can compute a correlation coefficient between one side operating state information cycle and the information one or more cycles prior to the other side operating state information.

80. The management supporting apparatus according to claim 79, wherein said machine is an injection molding machine.

81. The management supporting apparatus according to claim 79, further comprising a display controlling section for providing controls to have the result computed by said correlation coefficient computing section displayed on the displaying section by switching between a numerical form display and a graphic form display.

82. The management supporting apparatus according to claim 81, wherein said display controlling section provides controls to have a correlation coefficient displayed on said displaying section with a different display format in response to the intensity of the correlation coefficient.

83. The management supporting apparatus according to claim 79, comprising a storing section for storing the contents of controls in said controlling terminal device that are changed and set anew based on the correlation coefficient computed by said correlation coefficient computing section, as history information.

84. The management supporting apparatus according to claim 83, further comprising a display controlling section for having the history information displayed on said displaying section with a different format from the operating state of the machine.

85. A management supporting system, comprising:
the management supporting apparatus according to claim 79; and
a controlling terminal device, which is connectible via a network to said management support apparatus to allow information transaction, provided for each machine for producing the product, assuming that the operation for manufacturing the products is one cycle, and acquires plurality operating state information concerning the operating state of the machine to control the operating state of the machine.

86. The management supporting system according to claim 85, further comprising a server equipment, which is connectable via a network, allowing information transaction to said management supporting apparatus and sets the operations of said management supporting apparatus.

87. The management supporting system according to claim 86, wherein said server equipment is provided with a clocking section for clocking, which executes the processing for matching with the time clocked in at least one of the either said controlling terminal device or said management supporting apparatus.

88. A management supporting system, comprising the management supporting apparatus according to claim 79; and a server equipment for setting the operations of said management supporting apparatus.

89. The management supporting system according to claim 88, wherein said server equipment is provided with a clocking section for clocking, which executes the processing for matching with the time clocked in at least one of the either said controlling terminal device or said management supporting apparatus.

90. A management supporting method, comprising:
acquiring the operating state information by a computing section from a controlling terminal device provided for each machine for producing the product, assuming that the operation for manufacturing the products is one cycle, and acquires plurality operating state information concerning the operating state of the machine to control the operating state of the machine; and
computing a correlation coefficient of the acquired operating state information so that the correlation coefficient is computable between one side operating state information cycle and the information one or more cycles prior to the other side operating state information.

91. A management supporting program which, when executed by the computing section, performs the management supporting method according to claim 90.

92. A storage medium on which the computing section has readibly recorded the management supporting program according to claim 91.

93. A management supporting apparatus, comprising:
a machine information acquiring section for acquiring operating state information together with time information relating to the date and hour when the operating state information is acquired from a controlling terminal device provided for each machine, for acquiring the operating state information concerning the operating state of the machine to control the operating state of the machine;
a displaying section capable of displaying the operating state information acquired by said machine information acquiring section;
an operating condition recognizing section for determining an operating condition of the machine based on the operating state information; and
a display controlling section for having changes of the operating condition in passage of time recognized by said operating condition recognizing section displayed with a different display format based on the time information on said displaying section.

94. The management supporting apparatus according to claim 93, wherein said machine information acquiring section can acquire the operating state information from a plurality of said controlling terminal devices; and said displaying controlling section provides controls so that each determined operating condition based on the operating state information acquired from said plurality of controlling terminal devices is displayed in a list form on said displaying section.

95. The management supporting apparatus according to claim 93, wherein said machine is a manufacturing equipment for manufacturing products; and said display controlling section provides controls so that a change in types of the manufactured products at the time corresponding to the time at a change in operating conditions with time is displayed with a different format for each type of the products together with the changes in the operating conditions with time, on said displaying section.

96. The management supporting apparatus according to claim 95, wherein said display controlling section provides controls so that a change in types of the feed stock used for manufacturing the products at the time corresponding to the time at a change in operating conditions with time is displayed with a different format for each type of the feed stock together with the changes in the operating conditions and with time and the changes in the products with time, on said displaying section.

97. The management supporting apparatus according to claim 93, wherein said machine is a manufacturing equipment for manufacturing products using feed stock; and said display controlling section provides controls so that a change in types of the feed stock at the time corresponding to the time at a change in operating conditions with time is displayed with a different format for each type of the feed stocks together with the changes in the operating conditions with time, on said displaying section.

98. The management supporting apparatus according to claim 93, wherein said display controlling section provides controls so that the information is displayed with different colors for each individual display format.

99. The management supporting apparatus according to claim 93, wherein the machine is automatically driven under control by a controlling terminal device.

100. The management supporting apparatus according to claim 93, wherein the machine is an injection molding machine.

101. The management supporting apparatus according to claim 93, further comprising an abnormality reporting section for reporting, when the operating condition recognizing section recognizes occurrence of any abnormality in the operating condition of the machine, either one of the fact that the abnormality has occurred or contents of the abnormality.

102. The management supporting apparatus according to claim 101, wherein said abnormality reporting section has either one of the fact that an abnormality has occurred or contents of the abnormality displayed on said displaying section by means of said display controlling section to report the information.

103. The management supporting apparatus according to claim 101, wherein said abnormality reporting section has either one of the fact that an abnormality has occurred or contents of the abnormality transmitted by using an electronic mail.

104. A management supporting system, comprising:
the management supporting apparatus according to claim 93; and
a controlling terminal device provided for each machine, said controlling terminal device is connectible via a network to said management supporting apparatus to allow information transaction for acquiring the operating state information concerning the operating state of the machine to control the operating state of the machine.

105. The management supporting system according to claim 104, further comprising a server equipment, which is connectible via a network to said management supporting apparatus to allow information transaction and sets operation of said management supporting apparatus.

106. The management supporting system according to claim 105, wherein said server equipment is provided with a clocking section for clocking and executes the processing for matching with the time clocked in at least one of the either said controlling terminal device or said management supporting apparatus.

107. A management supporting system, comprising:
the management supporting apparatus according to claim 93; and
a server equipment, which is connectible via a network to said management supporting apparatus to allow information transaction and sets operation of said management supporting apparatus.

108. The management supporting system according to claim 107, wherein said server equipment is provided with a clocking section for clocking and executes the processing for matching with the time clocked in at least one of the either said controlling terminal device or said management supporting apparatus.

109. A management supporting method, comprising:
acquiring operating state information by means of a computing section from a controlling terminal device provided for each machine, for acquiring the operating state information concerning the operating state of the machine together with the time information relating to the date and hour when the operating state information is acquired to control the operating state of the machine;
determining an operating condition of the machine based on the acquired operating state information; and
providing controls so that change of the determined operating condition in passage of time is displayed with a different display format for each operating condition on a displaying section based on the time information.

110. A management supporting program which, when executed by the computing section, performs the management supporting method according to claim 109.

111. A storage medium on которомwhich the computing section has readily recorded the management supporting program according to claim 110.

* * * * *